(12) United States Patent
Tsangaris et al.

(10) Patent No.: US 8,690,975 B2
(45) Date of Patent: Apr. 8, 2014

(54) GASIFICATION SYSTEM WITH PROCESSED FEEDSTOCK/CHAR CONVERSION AND GAS REFORMULATION

(75) Inventors: Andreas Tsangaris, Ottawa (CA); Marc Bacon, Stittsville (CA)

(73) Assignee: Plasco Energy Group Inc., Ontario (CA)

( * ) Notice: Subject to any disclaimer, the term of this patent is extended or adjusted under 35 U.S.C. 154(b) by 717 days.

(21) Appl. No.: 12/919,829

(22) PCT Filed: Feb. 27, 2008

(86) PCT No.: PCT/CA2008/000355
§ 371 (c)(1),
(2), (4) Date: Oct. 29, 2010

(87) PCT Pub. No.: WO2008/104058
PCT Pub. Date: Sep. 4, 2008

(65) Prior Publication Data
US 2011/0036014 A1    Feb. 17, 2011

(51) Int. Cl.
*B01J 7/00*    (2006.01)

(52) U.S. Cl.
USPC .......................................................... 48/61

(58) Field of Classification Search
None
See application file for complete search history.

(56) References Cited

U.S. PATENT DOCUMENTS

| | | |
|---|---|---|
| 1,962,958 A | 6/1934 | Jones |
| 3,622,493 A | 11/1971 | Crusco |
| 3,692,505 A | 9/1972 | Reichl |
| 3,725,020 A | 4/1973 | Slater et al. |
| 3,779,182 A | 12/1973 | Camacho |
| 3,801,469 A | 4/1974 | Essenhigh |
| 3,804,606 A | 4/1974 | Archer et al. |
| 3,991,557 A | 11/1976 | Donath |
| 4,007,786 A | 2/1977 | Schlinger |
| 4,028,068 A | 6/1977 | Kiener |

(Continued)

FOREIGN PATENT DOCUMENTS

| | | |
|---|---|---|
| CA | 2106746 C | 3/1994 |
| CA | 2343035 A1 | 3/2000 |

(Continued)

OTHER PUBLICATIONS

Dighe, S., "Westingouse Plasma Coal Gasification & Vitrification Technology" Presentation to Electric Power General Association (Oct. 16-17, 2002), Hershey, PA, U.S.A.

(Continued)

*Primary Examiner* — Imran Akram
(74) *Attorney, Agent, or Firm* — Scully, Scott, Murphy & Presser, P.C.

(57) ABSTRACT

The invention provides a system designed for the complete conversion of carbonaceous feedstock into syngas and slag. The system comprises a primary chamber for the volatilization of feedstock generating a primary chamber gas (an off-gas); a secondary chamber for the further conversion of processed feedstock to a secondary chamber gas (a syngas) and a residue; a gas-reformulating zone for processing gas generated within one or more of the chambers; and a melting chamber for vitrifying residue. The primary chamber comprises direct or indirect feedstock additive capabilities in order to adjust the carbon content of the feedstock. The system also comprises a control system for use with the gasification system to monitor and regulate the different stages of the process to ensure the efficient and complete conversion of the carbonaceous feedstock into a syngas product.

12 Claims, 66 Drawing Sheets

(56) References Cited

U.S. PATENT DOCUMENTS

| | | |
|---|---|---|
| 4,063,521 A | 12/1977 | Pech |
| 4,141,694 A | 2/1979 | Camacho |
| 4,181,504 A | 1/1980 | Camacho |
| 4,229,184 A | 10/1980 | Gregg |
| 4,272,255 A | 6/1981 | Coates |
| 4,291,636 A | 9/1981 | Bergsten et al. |
| 4,399,314 A | 8/1983 | Child |
| 4,400,179 A | 8/1983 | Marion et al. |
| 4,479,443 A | 10/1984 | Faldt et al. |
| 4,489,562 A | 12/1984 | Snyder et al. |
| 4,495,873 A | 1/1985 | Blankenship |
| 4,543,940 A | 10/1985 | Krill et al. |
| 4,644,877 A | 2/1987 | Barton |
| 4,656,956 A | 4/1987 | Flickinger et al. |
| 4,666,462 A | 5/1987 | Martin |
| 4,676,805 A | 6/1987 | Richter et al. |
| 4,701,185 A | 10/1987 | Eckstein |
| 4,749,383 A | 6/1988 | Mansfield et al. |
| 4,831,944 A | 5/1989 | Durand et al. |
| 4,838,898 A | 6/1989 | Mifflin et al. |
| 4,881,947 A | 11/1989 | Parker et al. |
| 4,900,429 A | 2/1990 | Richardson |
| 4,941,415 A | 7/1990 | Pope et al. |
| 4,960,380 A | 10/1990 | Cheetham |
| 4,989,522 A | 2/1991 | Cline et al. |
| 5,010,829 A | 4/1991 | Kulkarni |
| 5,062,372 A | 11/1991 | Ritter |
| 5,065,206 A | 11/1991 | Nishizawa et al. |
| 5,081,940 A | 1/1992 | Motomura et al. |
| 5,095,825 A | 3/1992 | Arpalahti et al. |
| 5,095,828 A | 3/1992 | Holden et al. |
| 5,101,739 A | 4/1992 | Nance et al. |
| 5,136,137 A | 8/1992 | Schlienger |
| 5,279,234 A | 1/1994 | Bender et al. |
| 5,280,757 A | 1/1994 | Carter et al. |
| 5,288,969 A | 2/1994 | Wong et al. |
| 5,295,449 A | 3/1994 | Maeda et al. |
| 5,319,176 A | 6/1994 | Alvi et al. |
| 5,361,709 A | 11/1994 | Eshleman |
| 5,410,121 A | 4/1995 | Schlienger |
| 5,417,170 A | 5/1995 | Eshleman |
| 5,477,790 A | 12/1995 | Foldyna et al. |
| 5,541,386 A | 7/1996 | Alvi et al. |
| 5,544,597 A | 8/1996 | Camacho |
| 5,579,705 A | 12/1996 | Suzuki et al. |
| 5,634,281 A | 6/1997 | Nugent |
| 5,727,903 A | 3/1998 | Borray et al. |
| 5,865,206 A | 2/1999 | Steigman et al. |
| 5,877,394 A | 3/1999 | Kujawa et al. |
| 5,908,564 A | 6/1999 | Titus et al. |
| 5,937,652 A | 8/1999 | Abdelmalek |
| 5,944,034 A | 8/1999 | McRae et al. |
| 5,958,264 A | 9/1999 | Tsantrizos et al. |
| 6,066,825 A | 5/2000 | Titus et al. |
| 6,084,139 A * | 7/2000 | Van Der Giessen et al. . 585/240 |
| 6,084,147 A | 7/2000 | Mason |
| 6,089,169 A | 7/2000 | Comiskey |
| 6,112,677 A | 9/2000 | Kuntschar et al. |
| 6,155,182 A | 12/2000 | Tsangaris et al. |
| 6,182,584 B1 | 2/2001 | Gaudio |
| 6,200,430 B1 | 3/2001 | Robert |
| 6,245,309 B1 | 6/2001 | Etievant et al. |
| 6,250,236 B1 | 6/2001 | Feizollahi |
| 6,269,286 B1 | 7/2001 | Tse et al. |
| 6,279,494 B1 | 8/2001 | Jimbo et al. |
| 6,394,042 B1 | 5/2002 | West |
| 6,485,296 B1 | 11/2002 | Bender et al. |
| 6,810,821 B2 | 11/2004 | Chan |
| 6,817,388 B2 | 11/2004 | Tsangaris et al. |
| 6,837,910 B1 | 1/2005 | Yoshikawa et al. |
| 6,863,268 B2 | 3/2005 | Zhang |
| 6,887,284 B2 | 5/2005 | Hudson |
| 6,960,234 B2 | 11/2005 | Hassett |
| 6,971,323 B2 | 12/2005 | Capote et al. |
| 7,465,843 B2 | 12/2008 | Gnedenko et al. |
| 8,128,728 B2 | 3/2012 | Tsangaris et al. |
| 8,306,665 B2 | 11/2012 | Tsangaris et al. |
| 8,372,196 B2 | 2/2013 | Nakamura et al. |
| 2001/0047614 A1 | 12/2001 | Swanepoel et al. |
| 2003/0192609 A1 | 10/2003 | Enerson |
| 2003/0209174 A1 | 11/2003 | Chan |
| 2003/0233788 A1 | 12/2003 | Lewis |
| 2004/0031424 A1 | 2/2004 | Pope |
| 2004/0060236 A1 | 4/2004 | Yoshikawa et al. |
| 2004/0170210 A1 | 9/2004 | Do et al. |
| 2004/0244289 A1 | 12/2004 | Morozumi et al. |
| 2004/0245086 A1 | 12/2004 | Steynberg et al. |
| 2004/0247509 A1 | 12/2004 | Newby |
| 2004/0251241 A1 | 12/2004 | Blutke et al. |
| 2005/0109603 A1 | 5/2005 | Graham |
| 2005/0166810 A1 | 8/2005 | Gnedenko et al. |
| 2005/0247553 A1 * | 11/2005 | Ichikawa et al. ............... 202/96 |
| 2005/0256212 A1 | 11/2005 | Norbeck et al. |
| 2005/0256592 A1 | 11/2005 | Martens |
| 2006/0042999 A1 | 3/2006 | Iqbal et al. |
| 2006/0228294 A1 | 10/2006 | Davis et al. |
| 2007/0012229 A1 | 1/2007 | Rehmat et al. |
| 2007/0214719 A1 * | 9/2007 | Yoshikawa ....................... 48/61 |
| 2007/0258869 A1 | 11/2007 | Tsangaris et al. |
| 2007/0261303 A1 | 11/2007 | Surma et al. |
| 2007/0266632 A1 | 11/2007 | Tsangaris et al. |
| 2007/0266633 A1 | 11/2007 | Tsangaris et al. |
| 2007/0266634 A1 | 11/2007 | Tsangaris et al. |
| 2007/0272131 A1 | 11/2007 | Carabin et al. |
| 2007/0284453 A1 | 12/2007 | Tsangaris et al. |
| 2007/0289216 A1 | 12/2007 | Tsangaris et al. |
| 2008/0104887 A1 | 5/2008 | Tsangaris et al. |
| 2008/0202028 A1 | 8/2008 | Tsangaris et al. |
| 2008/0209807 A1 | 9/2008 | Tsangaris et al. |
| 2008/0210089 A1 | 9/2008 | Tsangaris et al. |
| 2008/0222956 A1 | 9/2008 | Tsangaris et al. |
| 2008/0277265 A1 | 11/2008 | Tsangaris et al. |
| 2009/0020456 A1 | 1/2009 | Tsangaris et al. |
| 2010/0154304 A1 | 6/2010 | Tsangaris et al. |
| 2010/0275781 A1 | 11/2010 | Tsangaris et al. |
| 2011/0036014 A1 | 2/2011 | Tsangaris et al. |
| 2011/0062013 A1 | 3/2011 | Tsangaris et al. |
| 2011/0078952 A1 | 4/2011 | Tsangaris et al. |
| 2012/0070347 A1 | 3/2012 | Bacon et al. |

FOREIGN PATENT DOCUMENTS

| | | |
|---|---|---|
| CA | 2349608 A1 | 5/2000 |
| CA | 2332685 A1 | 9/2001 |
| CA | 2457075 A1 | 2/2003 |
| CA | 2407102 A1 | 4/2003 |
| CA | 2484472 A1 | 11/2003 |
| CA | 2424805 A1 | 10/2004 |
| CA | 2 501 841 | 9/2005 |
| CA | 2 501 841 A1 | 9/2005 |
| CA | 2501841 A1 | 9/2005 |
| CA | 2559875 A1 | 10/2005 |
| CA | 2 569 009 A1 | 12/2005 |
| CA | 2610806 A1 | 12/2006 |
| CA | 2610808 A1 | 12/2006 |
| CA | 2714911 A1 | 1/2008 |
| CA | 2716912 A1 | 9/2008 |
| CN | 1258712 A | 7/2000 |
| CN | 1382202 A | 11/2002 |
| CN | 1644661 A | 7/2005 |
| CN | 1673317 A | 9/2005 |
| CN | 1821054 A | 8/2006 |
| CN | 1961062 A | 5/2007 |
| DE | 19652770 A1 | 6/1996 |
| DE | 19916931 A1 | 10/2000 |
| DE | 10047787 A1 | 3/2002 |
| EP | 0045256 A2 | 2/1982 |
| EP | 0153235 A1 | 8/1985 |
| EP | 0330872 A2 | 9/1989 |
| EP | 0412587 A1 | 2/1991 |
| EP | 0625869 A2 | 11/1994 |
| EP | 0675324 A1 | 10/1995 |
| EP | 0837041 A1 | 4/1998 |
| EP | 1004746 A1 | 5/2000 |

(56) References Cited

FOREIGN PATENT DOCUMENTS

| | | | |
|---|---|---|---|
| EP | 1136542 | A1 | 9/2001 |
| EP | 1227141 | A2 | 7/2002 |
| EP | 1475429 | A1 | 11/2004 |
| EP | 1696177 | A1 | 8/2006 |
| EP | 1865256 | A1 | 12/2007 |
| FR | 2709980 | A1 | 3/1995 |
| GB | 191300500 | A | 10/1913 |
| GB | 683647 | | 12/1952 |
| GB | 2422602 | A | 8/2006 |
| JP | 49052465 | A | 5/1974 |
| JP | 2122109 | A | 5/1990 |
| JP | 05066004 | | 3/1993 |
| JP | 05071717 | | 3/1993 |
| JP | 07-188677 | A | 7/1995 |
| jp | 09101399 | | 4/1997 |
| JP | 09033028 | | 7/1997 |
| JP | 10002539 | | 1/1998 |
| JP | 10132230 | | 5/1998 |
| JP | 11515086 | | 12/1999 |
| JP | 2001158887 | A | 6/2001 |
| JP | 2003-227349 | A | 8/2003 |
| JP | 2003260454 | | 9/2003 |
| JP | 2005-139338 | A | 6/2005 |
| KR | 20050025290 | A | 3/2005 |
| NL | 8200417 | A | 9/1983 |
| RU | 2125082 | C1 | 1/1999 |
| WO | 94/04631 | | 3/1994 |
| WO | 01/81828 | A1 | 11/2001 |
| WO | 02/096576 | A1 | 12/2002 |
| WO | 03/018467 | A2 | 3/2003 |
| WO | 03/018721 | A1 | 3/2003 |
| WO | 20041041974 | A1 | 5/2004 |
| WO | 20041072207 | A1 | 8/2004 |
| WO | 20041072210 | A1 | 8/2004 |
| WO | 20041087840 | A1 | 10/2004 |
| WO | 20051047435 | A2 | 5/2005 |
| WO | 20051118750 | A1 | 12/2005 |
| WO | WO 2005/118750 | A1 | 12/2005 |
| WO | 20061081661 | A1 | 8/2006 |
| WO | 2006/114818 | A1 | 11/2006 |
| WO | 20061128285 | A1 | 12/2006 |
| WO | 20061128286 | A1 | 12/2006 |
| WO | 2009/009891 | A1 | 1/2009 |

OTHER PUBLICATIONS

Klein "Gasification: An alternative process for energy recovery and disposal of municipal solid wastes" Research Project Sponsored by the Earth Engineering Center (May 2002) pp. 1-50.

Chapter 5: Chemical Equilibrium, Physical Chemistry, 2nd edition; Alberty et al. John Wiley & Sons, Inc. (1996) pp. 131-168.

Chapter 6: Phase Equilibrium, Physical Chemistry, 2nd edition; Alberty et al. John Wiley & Sons, Inc. (1996) pp. 169-218.

Kerr, R. et al., "The Long Lake Project—The First Field Integration of SAGD and Upgrading" SPE/Petroleum Society of CIM/Canadian Heavy Oil Association 79072 (Nov. 4-7, 2002) pp. 1-15.

Official Action dated Oct. 23, 2012 received from the Japanese Patent Office in Japanese Patent Application No. 2009-514504, together with English-language translation.

Official Action dated Oct. 9, 2012 received from the Chinese Patent Office in Chinese Patent Application No. 200880128847.0, together with English-language translation.

International Search Report dated Jul. 3, 2008.

* cited by examiner

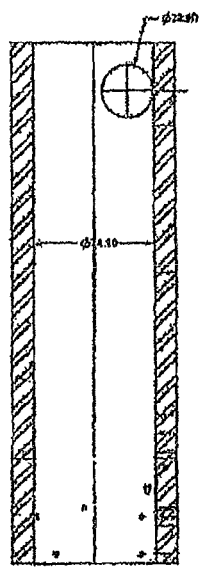
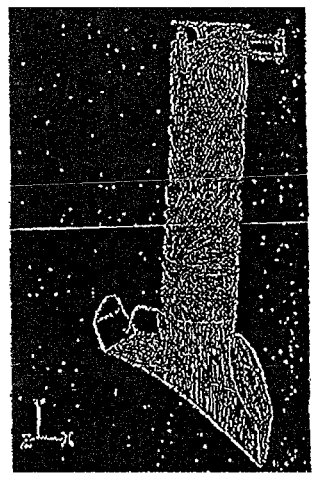
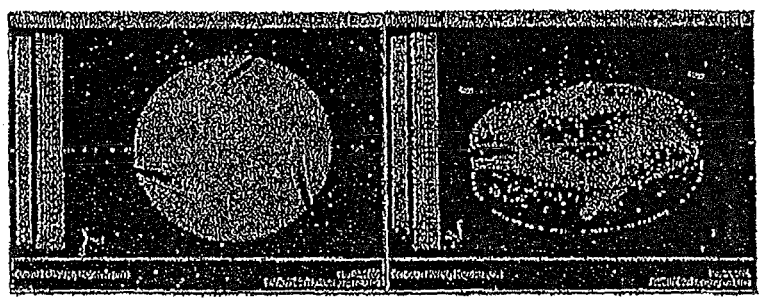
FIGURE 47

GASIFICATION SYSTEM WITH PROCESSED FEEDSTOCK/CHAR CONVERSION AND GAS REFORMULATION

FIELD OF THE INVENTION

This invention pertains to the field of gasification and in particular to a carbonaceous feedstock gasification system for the production of electricity.

BACKGROUND OF THE INVENTION

Gasification is a process that enables the production of a combustible or synthetic gas (e.g., $H_2$, CO, $CO_2$, $CH_4$) from carbon-based feedstock, referred to as carbonaceous feedstock. The gas can be used to generate electricity or as a basic raw material to produce chemicals and liquid fuels. This process enables the production of a gas that can be used for generation of electricity or as primary building blocks for manufacturers of chemicals and transportation fuels.

In particular, the gas can be used for: the combustion in a boiler for the production of steam for internal processing and/or other external purposes; for the generation of electricity through a steam turbine; the combustion directly in a gas turbine or a gas engine for the production of electricity; fuel cells; the production of methanol and other liquid fuels; as a further feedstock for the production of chemicals such as plastics and fertilizers; the extraction of both hydrogen and carbon monoxide as discrete industrial fuel gases; and other industrial heat requirements as required.

Gasification is not an incineration or combustion process. Both incineration and combustion processes operate to thermally destroy the carbonaceous feedstock with excess oxygen to produce $CO_2$, $H_2O$, $SO_2$, $NO_2$ and heat. Incineration also produces bottom ash and fly ash, which must be collected, treated, and disposed as hazardous waste in most cases. In contrast, gasification processes operate in the absence of oxygen or with a limited amount of oxygen and produce a raw gas composition comprising $H_2$, CO, $H_2S$ and $NH_2$. After clean-up, the primary gasification products are $H_2$ and CO.

In contrast to incineration, which works with excess air to fully convert the input material into energy and ash, gasification converts carbonaceous materials into energy-rich fuels by heating the carbonaceous feedstock under controlled conditions. Gasification processes deliberately limit the conversion so that combustion does not take place directly. Gasification processes operate at substoichiometric conditions with the oxygen supply controlled (generally 35 percent of the $O_2$ theoretically required for complete combustion or less), enabling gasification to convert the carbonaceous feedstock into valuable intermediates that can be further processed for materials recycling or energy recovery. Some gasification processes also use indirect heating, avoiding combustion of the carbonaceous feedstock in the gasification reactor and avoiding the dilution of the product gas with nitrogen and excess $CO_2$.

Generally, such a gasification process consists of feeding carbon-containing materials into a heated chamber (the gasification reactor) along with a controlled and limited amount of oxygen and steam. At the high operating temperature created by conditions in the gasification reactor, chemical bonds are broken by thermal energy and by partial oxidation, and inorganic mineral matter is fused or vitrified to form a molten glass-like substance called slag.

Apart from municipal solid waste, hazardous waste, etc., coal of varying grades can be used as the feedstock. This includes low grade, high sulfur coal, which is not suitable for use in coal-fired power generators due to the production of emissions having high sulfur content. Waste coal particles and silt that remain after coal has been mined, sorted and washed is also be useful for gasification. Coal can be gasified with oxygen and steam to produce so-called "synthesis gas" containing carbon monoxide, hydrogen, carbon dioxide, gaseous sulfur compounds and particulates. The gasification step is usually carried out at a temperature in the range of about 650° C. to 1200° C., either at atmospheric pressure or, more commonly, at a high pressure of from about 20 to about 100 atmospheres.

There are several different types of coal, each displaying different properties resulting from geological history. The degree of coal development is referred to as a coal's "rank." Peat is the layer of vegetable material directly underlying the growing zone of a coal-forming environment. The vegetable material shows very little alternation and contains the roots of living plants. Lignite is geologically very young (less than 40,000 years). It can be soft, fibrous and contains large amounts of moisture (typically around 70%) and has a low energy content (8-10 MJ/kg). Black coal ranges from 65-105 million years old to up to 260 million years old. These are harder, shinier, less than 3% moisture and can have energy contents up to about 24-28 MJ/kg. Anthracite contains virtually no moisture and very low volatile content, so it burns with little or no smoke. It can have energy contents up to about 32 MJ/kg.

Because coal often contains sulfur compounds, attempts have been made to provide processes for the gasification of coal to produce a clean product fuel gas wherein the sulfur is removed from the product fuel gas prior to its use, e.g., in gas turbines to generate electricity. In addition, gases from the gasification zone may be purified to remove coal dust and fly ash and also many other impurities, e.g., vaporized ash, alkali, etc.

There are a number of patents relating to different technologies for the gasification of coal for the production of synthesis gases for use in various applications, including U.S. Pat. Nos. 4,141,694; 4,181,504; 4,208,191; 4,410,336; 4,472,172; 4,606,799;. 5,331,906; 5,486,269, and 6,200,430.

Many different types of biomass are appropriate for use as feedstock in gasification processes for the production of synthesis gases. For example, biomass useful for gasification include pulp and paper waste, wood products such as shredded bark, wood chips or sawdust, sewage and sewage sludge, food waste, plant matter, rice straw, agricultural and animal waste, and cellulosic type industrial waste (e.g., construction wastes). In fact, biomass, as used in the present context, is defined to include any substances of biological origin that can be utilized as an energy source or industrial raw material. Since biomass is produced by solar energy, and by the action of air, water, soil, or similar natural substances, it can be produced infinitely, and therefore provides an unlimited source of carbon for use in gasification processes for the production of synthesis gases.

There are a number of patents relating to different technologies for the gasification of biomass for the production of synthesis gases for use in various applications, including U.S. Pat. Nos. 6,948,436, 6,987,792, 6,923,004, 6,991,769, 6,808, 543, 6,830,597, 6,680,137, 6,685,754, 6,615,748, 6,032,456, 5,425,792, and 4,699,632.

Plasma torch technology has also been employed in coal and biomass gasification processes. A plasma arc torch is created by the electrical dissociation and ionization of a working gas to establish high temperatures at the plasma arc centerline. Commercially-available plasma torches can develop suitably high flame temperatures for sustained periods at the point of application and are available in sizes from about 100 kW to over 6 MW in output power.

Plasma is a high temperature luminous gas that is at least partially ionized, and is made up of gas atoms, gas ions, and electrons. Plasma can be produced with any gas in this manner. This gives excellent control over chemical reactions in the plasma as the gas might be neutral (for example, argon, helium, neon), reductive (for example, hydrogen, methane, ammonia, carbon monoxide), or oxidative (for example, oxygen, nitrogen, carbon dioxide). In the bulk phase, a plasma is electrically neutral. Thermal plasma can be created by passing a gas through an electric arc. The electric arc will rapidly heat the gas by resistive and radiative heating to a very high temperature within microseconds of passing through the arc. A typical plasma torch consists of an elongated tube through which the working gas is passed, with an electrode centered coaxially within the tube. In one type of such torch, a high direct current voltage is applied across the gap between the end of the center electrode as anode, and an external electrode as cathode. The current flowing through the gas in the gap between the anode and the cathode causes the formation of an arc of high temperature electromagnetic wave energy that is comprised of ionized gas molecules. Any gas or mixture of gases, including air, can be passed through the plasma torch.

The gaseous product of the gasification of coal and biomass is called "synthesis gas" (or syngas), and contains carbon monoxide, hydrogen, carbon dioxide, gaseous sulfur compounds and particulates. Gasification is usually carried out at a temperature in the range of about 650° C. to 1200° C., either at atmospheric pressure or, more commonly, at a high pressure of from about 20 to about 100 atmospheres.

In high temperature gasification, the process generally involves the reaction of carbon with air, oxygen, steam, carbon dioxide, or a mixture of these gases at 1300F (700° C.) or higher to produce a gaseous product. Once a carbonaceous material is converted to a gaseous state, undesirable substances such as sulfur compounds and ash may be removed from the gas. The products of this process may include hydrocarbon gases (also called syngas), hydrocarbon liquids (oils) and processed feedstock/char (carbon black and ash), heat, and slag.

The by-products of high temperature gasification is slag, a non-leachable, non-hazardous a glass-like material which consists of the inorganic materials, which do not vaporize. In the high temperature conditions, the mineral matter melts and is removed as molten slag, which forms a glassy substance upon quenching or cooling. This material is suitable for use as construction materials. For example, the material may be crushed and incorporated into asphalt for use in roads and the like. Alternatively, the material may be utilized to replace cinder in cinder or building blocks, thereby minimizing absorption of water within the block. Further, the material may be solidified to a final form which is suitable for disposal without health risks or risks to the environment.

Chemistry of the Process

Gasification (the complete conversion of a carbonaceous feedstock to off gas and then to syngas) can proceed at high temperature or low temperature, high pressure or low pressure and in one step or where the stages are separated to some degree under conditions (temperature, process additives) in a manner that certain reactions are favored over another. It can occur in one chamber, multiple regions within one chamber or multiple chambers. As the coal proceeds through a gasification reactor, physical, chemical, and thermal processes may occur sequentially or simultaneously, depending on the reactor design and the composition of the coal.

Drying occurs as the feedstock is heated and its temperature increases, water is the first constituent to evolve.

As the temperature of the dried feedstock increases, pyrolysis takes place. During pyrolysis the coal and biomass is thermally decomposed to release tars, phenols, and light volatile hydrocarbon gases while the coal is converted to char. Processed feedstock/char comprises the residual solids consisting of organic and inorganic materials. Depending on the origin of the feedstocks, the volatiles may include $H_2O$, $H_2$, $N_2$, $O_2$, $CO_2$, $CO$, $CH_4$, $H_2S$, $NH_3$, $C_2H_6$ and very low levels of unsaturated hydrocarbons such as acetylenes, olefins, aromatics and tars. Once a carbonaceous material is converted to a gaseous state, undesirable substances such as sulfur compounds and ash may be removed from the gas.

Gasification products are the result of chemical reactions between carbon in the processed feedstock/char and steam, $CO_2$, and $H_2$ in the vessel as well as the chemical reactions between the resulting gases. The gasification reaction is driven by heat (pyrolysis). This can be fueled by adding electricity or fossil fuels (e.g., propane) to heat the reaction chamber or adding air as a reactant to drive the exothermic gasification reaction, which provides heat to the reaction. Some gasification processes also use indirect heating, avoiding combustion of the coal in the gasification reactor and avoiding the dilution of the product gas with nitrogen and excess $CO_2$.

This background information is provided for the purpose of making known information believed by the applicant to be of possible relevance to the present invention. No admission is necessarily intended, nor should be construed, that any of the preceding information constitutes prior art against the present invention.

SUMMARY OF THE INVENTION

The invention provides a system designed for the complete conversion of carbonaceous feedstock into syngas and slag. The system comprises a primary chamber for the volatilization of feedstock generating a primary chamber gas (an off-gas); a secondary chamber for the further conversion of processed feedstock to a secondary chamber gas (a syngas) and a residue; a gas-reformulating zone for processing gas generated within one or more of the chambers; and a melting chamber for vitrifying residue. The primary chamber comprises direct or indirect feedstock additive capabilities in order to adjust the carbon content of the feedstock.

The system also comprises a control system for use with the gasification system to monitor and regulate the different stages of the process to ensure the efficient and complete conversion of the carbonaceous feedstock into a syngas product. The control system also provides for the production of a syngas product having a consistent and/or specified composition. The control system comprises one or more sensing elements for monitoring and obtaining data regarding operating parameters within the system, and one or more response elements for adjusting operating conditions within the system. The sensing elements and the response elements are integrated within the system, and the response elements adjust the operating conditions within the system according to data obtained from the sensing elements.

An object of the present invention is to provide gasification system with processed feedstock/char conversion and gas reformulation. In accordance with one aspect of the invention, there is provided a multi-chamber system for converting carbonaceous feedstock to syngas and slag, comprising: one or more primary chambers for conversion of carbonaceous feedstock to a processed feedstock/char and a primary chamber gas, wherein each primary chamber comprises a feedstock inlet, a first air input means, an optional process additive input, a primary chamber gas outlet, and a processed feedstock/char outlet; one or more secondary chambers for conversion of processed feedstock/char to a residue and a secondary chamber gas, wherein each secondary chamber comprises a processed feedstock/char inlet for receiving processed feedstock/char from at least one of said primary chambers, a second air input means, an optional process additive input, a secondary chamber gas outlet, and a residue outlet; one or more gas reformulating chambers each comprising a gas reformulating zone, in fluid communication with at least one of said primary chamber and secondary chamber gas outlets for conversion of said primary chamber gas and said secondary chamber gas received therefrom to syngas, comprising an optional process additive input, a syngas outlet, and one or more sources of reformulating heat; one or more melting chambers for converting the residue from said secondary chambers to slag, wherein each said melting chamber comprises a residue inlet in communication with the residue outlet of said secondary chambers, one or more sources of melting heat, and a slag outlet; and a control system to regulate the operation of the system.

In accordance with another aspect of the invention, there is provided a multi-chamber system for converting carbonaceous feedstock to syngas and residue, comprising: one or more primary chambers for conversion of said carbonaceous feedstock to processed feedstock/char and a primary chamber gas, each comprising a feedstock inlet, a primary chamber gas outlet, a first air input means and a processed feedstock/char outlet; one or more secondary chambers for conversion of said processed feedstock/char to a residue and a secondary chamber gas, each comprising a processed feedstock/char inlet for receiving processed feedstock/char from at least one of said primary chambers, a secondary chamber gas outlet, a second air input means and a residue outlet; wherein at least one of said primary chambers comprise a gas reformulating zone in fluid communication with at least one of said primary chamber and secondary chamber gas outlets for conversion of said primary chamber gas and said secondary chamber gas received therefrom to syngas, wherein said gas reformulating zone comprises a syngas outlet and one or more sources of reformulating heat, one or more melting chambers for converting the residue from said secondary chambers to slag, wherein each said melting chamber comprises a residue inlet in communication with the residue outlet of said secondary chambers, one or more sources of melting heat, and a slag outlet; and a control system to regulate the operation of the system.

In accordance with another aspect of the invention, there is provided a multi-chamber system for converting carbonaceous feedstock to syngas and residue, comprising: one or more primary chambers for conversion of said carbonaceous feedstock to processed feedstock/char and a primary chamber gas, each comprising a feedstock inlet, a primary chamber gas outlet, a first air input means and a processed feedstock/char outlet; one or more secondary chambers for conversion of said processed feedstock/char to a residue and a secondary chamber gas, each comprising a processed feedstock/char inlet for receiving processed feedstock/char from at least one of said primary chambers via their processed feedstock/char outlets, a secondary chamber gas outlet, a second air input means and a residue outlet; wherein at least one of said secondary chambers comprise a gas reformulating zone in fluid communication with at least one of said primary chamber and secondary chamber gas outlets for conversion of said primary chamber gas and said secondary chamber gas received therefrom to syngas, wherein said gas reformulating zone comprises a syngas outlet and one or more sources of reformulating heat, one or more melting chambers for converting the residue from said secondary chambers to slag, wherein each said melting chamber comprises a residue inlet in communication with the residue outlet of said secondary chambers, one or more sources of melting heat, and a slag outlet; and a control system to regulate the operation of the system.

BRIEF DESCRIPTION OF THE FIGURES

Embodiments of the present invention will now be described, by way of example only, with reference to the attached Figures.

FIG. 47A is a cross-sectional view of the reformulating chamber of FIG. 42. 47(B) is a diagram illustrating the air-flow within a gasifier comprising the gas reformulating system of the invention including the reformulating chamber of FIG. 42. 47(C) illustrates the injection of air from the air inputs into the reformulating chamber of FIG. 42 and its effect on air-flow within.

DETAILED DESCRIPTION OF THE INVENTION

Figure 1:
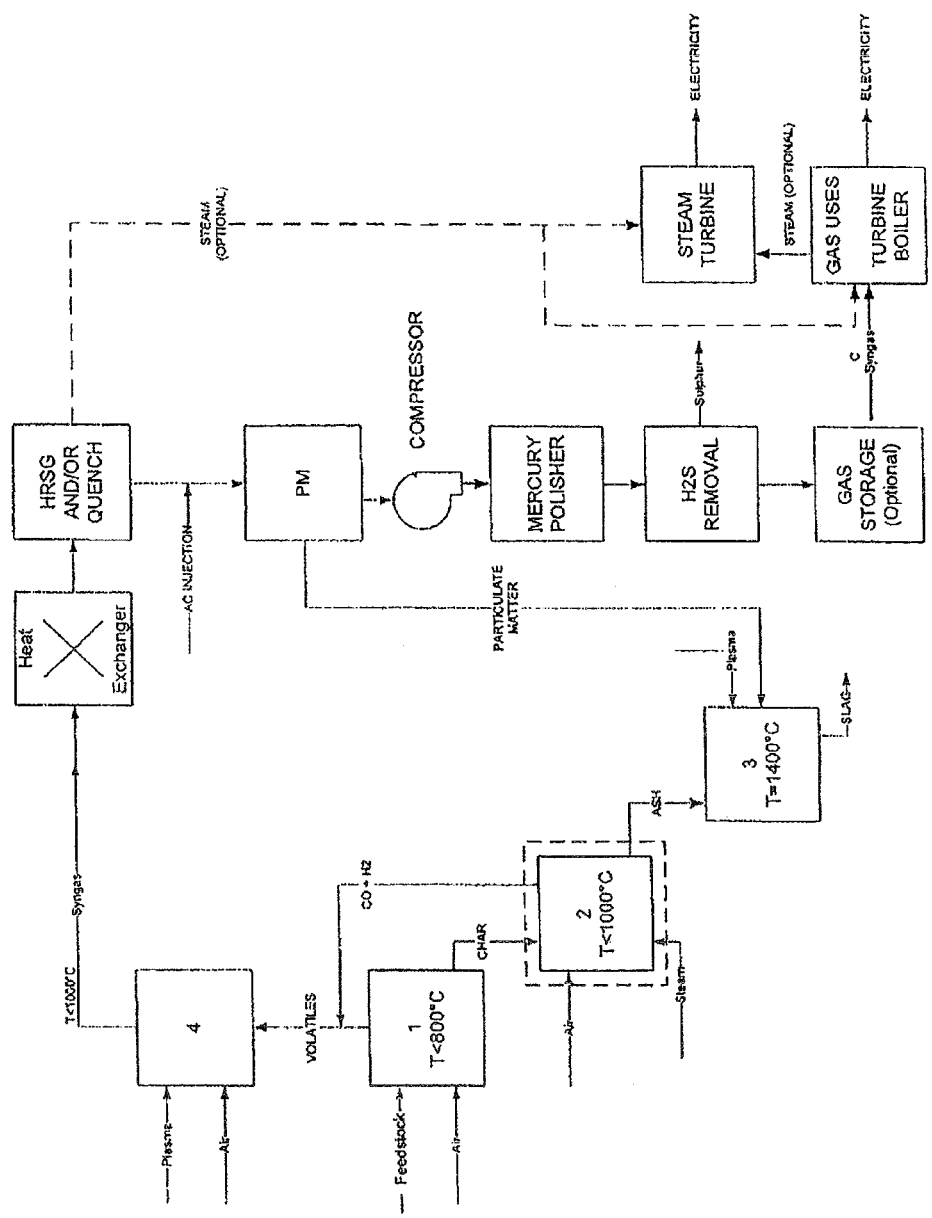
FIG. 1 is a schematic diagram depicting one embodiment of the multi-chamber carbonaceous feedstock gasification system, in accordance with one embodiment of the invention.

Unless defined otherwise, all technical and scientific terms used herein have the same meaning as commonly understood by one of ordinary skill in the art to which this invention belongs.

Definitions

For the purposes of the present invention, the term syngas (or synthesis gas) refers to the product of a gasification process, and may include carbon monoxide, hydrogen, and carbon dioxide, in addition to other gaseous components such as methane and water.

The terms "carbonaceous feedstock" and "feedstock", as used interchangeably herein, are defined to refer to carbonaceous material that can be used in the gasification process. Examples of suitable feedstock include, but are not limited to, coal, biomass, hazardous and non-hazardous waste materials, including municipal solid waste (MSW); wastes produced by industrial activity; biomedical wastes; carbonaceous material inappropriate for recycling, including non-recyclable plastics; sewage sludge; heavy oils; petroleum coke; heavy refinery residuals; refinery wastes; hydrocarbon contaminated solids; agricultural wastes; and any mixture thereof. The feedstock may be provided as a mixture of two or more of the above feedstocks in any relative proportion.

"Coal" refers to coal of any grade or rank. This can include, but is not limited to, low grade, high sulfur coal that is not suitable for use in coal-fired power generators due to the production of emissions having high sulfur content.

"Biomass" refers to any material of organic origin, including, but not limited to, pulp and paper waste, wood products such as shredded bark, wood chips or sawdust, sewage and sewage sludge, food waste, plant matter, rice straw, agricultural and animal waste, such as manure, cellulosic type industrial waste (e.g., construction waste), waste wood, fresh wood, remains from fruit, vegetable and grain processing, and grass.

"Primary feedstock" refers to the main carbonaceous feedstock that undergoes the gasification process in the present system. Where only one feedstock is being gasified, it is referred to as the primary feedstock. Where more than one feedstock is being gasified, the feedstock that constitutes the major proportion of the combined feedstocks is the primary feedstock.

"Secondary feedstock" refers to an auxiliary carbonaceous feedstock that undergoes gasification with the primary that is different from the primary feedstock. The secondary feedstock may be provided as a process additive to adjust the carbon content of the primary feedstock being gasified.

"Processed feedstock" or "processed feedstock/char" may include one or more of char, low and ultra-low volatile feedstocks with fixed carbon and ash components, the by-products of a carbonaceous feedstock gasification or pyrolysis process, products obtained from the incomplete combustion of carbonaceous feedstock, or the solids collected in gas conditioning and/or cleanup systems with the heat source inputs from plasma torch.

"Primary Chamber" refers to the chamber that receives the carbonaceous feedstock and wherein the dominant process is drying and volatilization, i.e. stage I and stage II of the gasification process.

"Secondary Chamber" refers to the chamber that receives the processed feedstock from the primary chamber and substantially completes the carbon conversion process.

"Primary chamber gas" refers to the gases produced in the primary chamber. These gases include the volatilized constituents of the feedstock, water vapour where the feedstock contained moisture, and possibly gaseous products of a small amount of carbon conversion. Also referred to as off-gas.

"Secondary chamber gas" refers to the gases produced in the secondary chamber. These gases include the products of the carbon conversion reaction, as well as any of the volatile constituents remaining in the processed feedstock/char product after the volatilization stage. Also referred to as syngas.

"Processed syngas" refers to off-gas or syngas that has be further reformulated in a Gas Reformulating zone.

"Gas Reformulating Zone" refers to a zone in which the off-gas and/or syngas are broken into their constituents and reformed into a desired product, including, for example, carbon monoxide and hydrogen. The Zone can be located within the primary, secondary or a dedicated gas reformulating chamber or a combination thereof.

"Controllable solids removal means" refers to one or more devices for removing solids from a chamber in a controllable manner. Examples of such devices include, but are not limited to, rotating arms, rotating wheels, rotating paddles, moving shelves, pusher rams, screws, conveyors, and combinations thereof.

The term "sensing element" is defined to describe any element of the system configured to sense a characteristic of a process, a process device, a process input or process output, wherein such characteristic may be represented by a characteristic value useable in monitoring, regulating and/or controlling one or more local, regional and/or global processes of the system. Sensing elements considered within the context of a gasification system may include, but are not limited to, sensors, detectors, monitors, analyzers or any combination thereof for the sensing of process, fluid and/or material temperature, pressure, flow, composition and/or other such characteristics, as well as material position and/or disposition at any given point within the system and any operating characteristic of any process device used within the system. It will be appreciated by the person of ordinary skill in the art that the above examples of sensing elements, though each relevant within the context of a gasification system, may not be specifically relevant within the context of the present disclosure, and as such, elements identified herein as sensing elements should not be limited and/or inappropriately construed in light of these examples.

The term "response element" is defined to describe any element of the system configured to respond to a sensed characteristic in order to operate a process device operatively associated therewith in accordance with one or more predetermined, computed, fixed and/or adjustable control parameters, wherein the one or more control parameters are defined to provide a desired process result. Response elements considered within the context of a gasification system may include, but are not limited to static, pre-set and/or dynamically variable drivers, power sources, and any other element configurable to impart an action, which may be mechanical, electrical, magnetic, pneumatic, hydraulic or a combination thereof, to a device based on one or more control parameters. Process devices considered within the context of a gasification system, and to which one or more response elements may be operatively coupled, may include, but are not limited to, material and/or feedstock input means, heat sources such as plasma heat sources, additive input means, various gas blowers and/or other such gas circulation devices, various gas flow and/or pressure regulators, and other process devices operable to affect any local, regional and/or global process within a gasification system. It will be appreciated by the person of ordinary skill in the art that the above examples of response elements, though each relevant within the context of a gasification system, may not be specifically relevant within the context of the present disclosure, and as such, elements identified herein as response elements should not be limited and/or inappropriately construed in light of these examples.

As used herein, the term "about" refers to a +/−10% variation from the nominal value. It is to be understood that such a variation is always included in any given value provided herein, whether or not it is specifically referred to.

Overview

The invention provides a system for the complete conversion of carbonaceous feedstock into syngas and slag. The system comprises a primary chamber for the volatilization of feedstock generating an offgas; a secondary chamber for the further conversion of processed feedstock to syngas and a solid residue; a gas-reformulating zone for processing gas generated within one or more of the chambers; and a melting chamber for vitrifying solid residue. The primary chamber comprises direct or indirect secondary feedstock additive capabilities in order to adjust the carbon content of the primary feedstock.

The system also comprises a control system for use with the gasification system to monitor and regulate the different stages of the process to ensure the efficient and complete conversion of the carbonaceous feedstock into a syngas product. The control system also provides for the production of a syngas product having a consistent and/or specified composition. The control system comprises one or more sensing elements for monitoring and obtaining data regarding operating parameters within the system, and one or more response elements for adjusting operating conditions within the system. The sensing elements and the response elements are integrated within the system, and the response elements adjust the operating conditions within the system according to data obtained from the sensing elements.

The present carbonaceous feedstock gasification system allows for the gasification process to be carried out at lower temperatures than are typically required by prior art gasification systems. The feedstock is heated in the first, primary chamber at a relatively low temperature (e.g. less than about 800° C.) with the main purpose being to remove any residual moisture and to volatilize quickly and efficiently the volatile components of the feedstock. The resulting processed feedstock product (e.g., char) is actively or passively conveyed to a secondary chamber, where it is further subjected to higher temperatures (about 1000-1200° C.), thereby achieving higher carbon conversion efficiency and complete conversion of the processed feedstock/char to a gaseous product and ash. The secondary chamber also includes means to ensure sufficient residence times for efficient and complete carbon conversion.

Feedstocks suitable for undergoing gasification in the present multi-chamber system include any carbon-containing material, including, for example, MSW, coal, biomass or mixtures thereof. The present system can be adapted or modified according to the requirements of the feedstock being gasified. For example, a gasification system that is used primarily to gasify a feedstock having a high free carbon content may require a secondary chamber having a larger size than that required for a system for gasifying a lower carbon content feedstock. Alternatively, where the system is provided primarily to gasify feedstock having high levels of volatile compounds, the chamber provided for the volatilization stage may be larger in size than that required for the volatilization of a corresponding amount of a feedstock having a lower volatile content.

The present system can also be adapted to gasify a mixture of primary and secondary feedstocks in any proportion as may be desired. The secondary feedstock functions as a process additive to adjust the carbon content of the primary feedstock in order to modulate the carbon content to maintain a consistency in the final gas output. For example, where the system gasifies a lower carbon content primary feedstock, such as biomass or MSW, a high carbon secondary feedstock, such as coal or plastics, can be provided as a high carbon process additive to increase the proportion of carbon in the feedstock. Alternatively, where a high carbon feedstock (such as coal) is the primary gasification feedstock, it is contemplated that a lower carbon secondary feedstock (such as biomass) can be provided to offset the high carbon content as may be required.

The two feedstocks may be combined prior to their introduction into the primary chamber through a common feedstock inlet, or they may each be introduced separately to the primary chamber through dedicated primary and secondary feedstock inlets.

In one embodiment, the gaseous products of the processed feedstock/char conversion stage and the volatilization stage are directed to a gas reformulating zone, where they are subjected to further heating by a heat source such as plasma, optionally in the presence of steam, to produce a common gaseous stream of a hot syngas product. In one embodiment only the offgas generated in the primary chamber is directed to a gas reformulating zone.

The hot syngas product is then subjected to a cooling step prior to further cleaning and conditioning. In one embodiment, the cooling step takes place in a heat recovery subsystem, whereby the heat from the hot syngas is optionally recovered for use in the gasification process or in downstream applications. In such an embodiment, the heat recovery subsystem can comprise a heat exchanger for transferring the sensible heat to a fluid for use elsewhere in the system. In one embodiment, the heat recovery subsystem is a syngas-to-air heat exchanger (also referred to as a recuperator) that recovers sensible heat from the hot syngas and transfers it to ambient air to provide a heated air product. In this embodiment, the heated air is optionally passed into the primary and/or secondary chambers to provide at least a portion of the heat required to drive one or more stages of the gasification process. The heat recovery subsystem optionally includes a heat recovery steam generator to generate steam, which can be used, for example, to drive a steam turbine, or as a process additive in the gasification reaction.

Once the hot syngas has undergone sufficient cooling, it is optionally passed through a gas quality conditioning subsystem (GQCS), where it is treated to remove contaminants, such as, particulate matter, heavy metals, and sulfur compounds. After conditioning, the syngas is optionally passed into a gas regulation and/or homogenization subsystem prior to use in a downstream application.

The solid residue (ash) remaining after the processed feedstock/char to gas conversion is optionally passed from the secondary chamber into a solid residue conditioning chamber, where the ash is subjected to heating by a plasma heat source for melting/vitrification, and conversion to vitrified, non-leachable slag.

FIG. 1 depicts one embodiment of a multi-chamber carbonaceous feedstock gasification system. In the present embodiment, the feedstock and heated air inputs are introduced to the primary chamber, where the feedstock undergoes drying and volatilization. The resulting char is passed into a secondary chamber, where it is subjected to further heating with heated air inputs, optionally in the presence of steam additives. The carbon in the char is converted to a gaseous product, and the residual ash is passed into a plasma heated slag chamber, where it undergoes melting and vitrification. The gaseous products of the two stages are passed into a gas reformulation chamber, where it undergoes plasma heating, optionally in the presence of process additives such as air and/or steam to produce a hot syngas product. The hot syngas is passed through a heat exchanger where the sensible heat from the syngas is removed. The cooled syngas is passed into a further cooling system, such as a heat recovery steam generator or a dry quench step. Where a heat recovery steam generator is used to cool the syngas, the resulting steam product may be used in downstream applications such as in a steam turbine for generating electricity. Activated carbon is then injected into the further cooled syngas, which then undergoes a filtration step to remove particulate matter, for example, by being passed through a baghouse filter. The particulate matter removed from the syngas product is passed into the slag chamber, where it undergoes plasma melting with the ash product of the feedstock gasification. The filtered syngas product undergoes further cleaning and conditioning steps prior to being used in downstream applications.

The system also optionally comprises a control system that monitors different operating parameters within the system, and adjusts various operating conditions of the gasification process. The control system provides for active control of the movement of the material through the different stages of the gasification process. For example, the control system allows for regulation of the amount and rate of solid material (char) removal from the primary chamber into the secondary chamber. The control system also optionally provides for regulation of the rate of solid residue (ash) removal from the bottom of the secondary chamber. The control system therefore controls, for example, the solids removal means to regulate the movement of the material within the system. Where the gasification system comprises a horizontally oriented primary chamber comprising lateral transfer units, the control system also controls the operation of the lateral transfer units to ensure that the material is moved efficiently through the primary chamber. Controlling the movement of material through the different stages of the system allows optimization of the various stages of the feedstock gasification process.

The control system also provides for control of one or more of the primary and secondary feedstock input rate, the amount and location of the heated air inputs, the power and position of the plasma heat sources, and the amount and type of process additive inputs, as may be required to ensure that the carbonaceous feedstock to syngas conversion reaction is carried out completely and efficiently. Control of the primary and secondary feedstock inputs, as well as the heated air and optional steam process additive inputs ensures that the chemical species required for conversion of the feedstock to a consistent and/or specified syngas product are available.

The present control system controls the above parameters according to information obtained by measuring parameters such as temperature, pressure and syngas composition, using sensing elements located as required throughout the system.

The present invention therefore is a multi-chamber carbonaceous feedstock gasification system that offers advantages over single stage gasification systems as are known in the art. For example, the multi-chamber system can provide for higher throughput due to fast pyrolysis and gasification of highly active matters (volatiles) in the first lower temperature stages, while also providing increased flexibility of the higher temperature secondary chamber operation mode by allowing for different designs, such as the incorporation of moving or fluidized bed chambers, for example, for the processed feedstock/char conversion step The residence time of the material at each stage of the gasification process can also be controlled, for example, to ensure complete drying/volatilization in the primary chamber, or to optimize carbon conversion in the secondary chamber. The multi-chamber system also allows for greater fuel flexibility and ease of feedstock input.

The availability of carrying out the different stages of gasification in dedicated chambers also permits the separation of the various stages such that the operating parameters for each stage are optimal for a particular stage without hindrance from the requirements, or prohibitions imposed by, neighboring stages. A multi-chamber system also provides controlled air allocation to the primary and secondary chambers, and therefore control over the operating temperature of these chambers, as well as more opportunities (entry points) for optimizing the composition of the product syngas (or cold gas efficiency) through the use of optional process additives, such as steam, air or high/low carbon secondary feedstocks.

Accordingly, the present invention therefore provides a gasification system employing a multiple chamber system, with means for controlling the residence time of the materials at the different stages of the gasification process, thereby allowing for the optimization of the conversion of the feedstock to the gaseous products and slag. Generally, the invention provides a process of converting carbonaceous feedstock to syngas which is optimized by sequentially promoting drying, volatilization and char-to-ash conversion, and by reformulating the gaseous products resulting from the gasification stages using heat such as plasma heat, to form the hot syngas product. In one embodiment, the resulting ash is converted to slag in a solid residue conditioning chamber.

As the material is moved through the different chambers through active or passive conveyance, it goes through different degrees of drying, volatization and char-to-ash conversion. Thus, the material in the gasification system essentially passes through a series of regions, each of which provides a temperature range that promotes a certain stage of the gasification process. One skilled in the art would readily appreciate that in a pile of reactant-material, all stages are occurring somewhat simultaneously and continuously; however, in a given temperature range, certain stages will be favored. It will also be readily apparent to the skilled worker that for descriptive purposes, the number of regions can be as many or as few as desired. For ease of understanding, however, three stages of the gasification process are described in more detail below.

Stage I: Drying of the Material

The first stage of the gasification process is drying, which occurs mainly between 25 and 400° C. Some volatilization and some carbon-to-ash conversion may also take place at these lower temperatures.

Stage II: Volatilization of the Material

The second stage of the gasification process is volatilization, which occurs mainly between 400 and 700° C. A small degree (the remainder) of the drying operation as well as some carbon conversion will also take place at this temperature.

Stage III: Char-to-Ash Conversion

The third stage of the gasification process is that of carbon conversion with a lesser amount (the remainder) of volatilization, which takes place at a temperature range of between 600 and 1000° C. After this stage, the major products are a solid residue (ash) and the gaseous products of carbon conversion.

Primary Chamber

The main function of the primary chamber is to dry the feedstock and to volatilize the volatile components in the carbonaceous feedstock. The primary chamber is therefore used to drive off all the moisture and volatiles from the feed stream at relatively low processing temperatures in a fast and economical manner by using low quality heat such as pre-heated air. In one embodiment, the air used in this step is pre-heated through heat exchange with sensible heat from the syngas prior to introduction to the chamber. The remaining processed feedstock/char (with the majority of moisture and volatiles removed) is subsequently directed to the secondary chamber by passive conveyance (e.g., by gravity), or by active conveyance means that allow for the controlled movement of the material to the next stage of the gasification process.

In accordance with the present invention, the primary chamber is a chamber having a feedstock inlet through which the primary feedstock to be gasified is introduced. In one embodiment the secondary additive feedstock is combined with the primary feedstock prior to its entry into the primary chamber. In one embodiment, the secondary additive feedstock is input into the primary chamber through a secondary feedstock inlet.

The primary chamber also includes heated air inlets for the introduction of the heated air required to drive the drying and volatilization stages, a first chamber gas outlet through which the gases produced in the primary chamber exit, and a residue/processed feedstock/char outlet through which the resulting residue/processed feedstock/char product is passed out of the primary chamber prior to being passed into the secondary chamber. The gases produced in the primary chamber (referred to as the first chamber gas product) include the volatilized constituents of the feedstock, water vapour where the feedstock contained moisture, and gaseous products of a small amount of carbon conversion.

The present system can also be adapted to gasify a mixture of feedstocks in any proportion as may be desired. In one embodiment, the mixture of feedstocks is a combination of primary and secondary feedstocks. In one embodiment, the secondary feedstock is provided as a process additive to adjust the carbon content of the primary feedstock being gasified. For example, a high carbon feedstock, such as coal or plastics, can be used to supplement the carbon content of a lower carbon primary feedstock such as biomass or MSW. Alternatively, a lower carbon secondary feedstock can be used to decrease the proportion of carbon in a high carbon primary feedstock if required.

In one embodiment, where primary and secondary feedstocks are being gasified, the two feedstocks are combined prior to their introduction into the primary chamber through a common feedstock inlet.

In one embodiment, where primary and secondary feedstocks are being gasified, each of the feedstocks is introduced separately to the primary chamber through dedicated primary and secondary feedstock inlets.

In one embodiment, where a mixture of two different feedstocks undergoes gasification, the two feedstocks are fed into the primary chamber in alternation.

In one embodiment, where two feedstocks are being gasified, each feedstock undergoes the initial volatilization stage separately, in respective primary chambers, and their respective processed feedstock/char products are combined in a common secondary chamber for conversion to a gaseous product and ash.

In one embodiment, the system comprises a material feeder subsystem adapted to the physical characteristics of the input feedstock in association with the feedstock inlet of the primary chamber. For example, augers, rams, feedhoppers, rotary valves, or top gravity feeds are feeder systems that can be incorporated into the system to facilitate the introduction of the feedstock.

In one embodiment of the invention, the material feeder subsystem comprises an auger which feeds directly into the primary chamber feedstock inlet to provide a granular feed.

In one embodiment of the invention, the material feeder subsystem attached to the primary chamber may consist of a rectangular feedhopper and a hydraulic assisted ram. Limit switches on the feeder control the length of the ram stroke so that the amount of feedstock fed into the chamber with each stroke can be controlled.

A pre-conditioning process for conditioning the feedstock in the feed system may also be utilized prior to being fed to the first chamber. In one embodiment, the feedstock is prepared in order to control the particle size before feeding into the primary chamber. In one embodiment, the feedstock undergoes a pre-drying step to remove excessive moisture before feeding into the primary chamber.

In accordance with the present invention, heated air inputs provide the heat required for the drying and volatilization processes. Accordingly, the heated air inlets are located throughout the chamber at locations suitable for optimum exposure of the feedstock to the heated air to ensure sufficient heating of the feedstock to dry it and volatilize the volatile constituents. In one embodiment, the heated air inlets are located in the walls of the chamber proximal to the base, to ensure that the hot air is passed into and over the pile of material for optimum exposure. In one embodiment, the heated air inlets are located in the floor of the chamber, so that the hot air is passed up into the pile of material to ensure penetration into and through the pile of material. In one embodiment, the heated air inlets are located in the walls and floor of the chamber.

In one embodiment, the heated air used to drive the processes is preheated in a heat exchanger using sensible heat recovered from the hot syngas products of the carbonaceous feedstock gasification.

In order to facilitate initial start up of the gasification system, the chamber can include access ports sized to accommodate various conventional burners, for example natural gas or propane burners, to pre-heat the chamber.

The primary chamber can be of any shape and dimension suitable for low temperature gasification processes.

In one embodiment, the chamber is a vertically oriented chamber having a feedstock inlet located near the top and a processed feedstock/char outlet located near the bottom. In such an embodiment, the feedstock enters from the top and accumulates in a pile while being heated with hot air to drive the drying and volatilization processes. As the moisture and volatiles are driven off, the feedstock is gradually converted to char. The resulting processed feedstock/char is passed, actively or passively, out through the processed feedstock/char outlet located at the bottom of the primary chamber and into the secondary chamber.

In one embodiment, the pile of feedstock is gradually converted to processed feedstock/char by action of the heated air with no mechanical mixing or active movement of the solids through the chamber, and the processed feedstock/char product is allowed to passively drop from the primary chamber to the secondary chamber through an opening between the two chambers.

In one embodiment, the bottom of the chamber gradually slopes downward toward the processed feedstock/char outlet, whereby the material is passively drawn by gravity toward the processed feedstock/char outlet.

In one embodiment, the feedstock undergoes mechanical mixing by a mechanism such as rotating paddles, rotating wheels or rotating arms, which rotate horizontally to ensure optimal exposure to the heated air. Such mixing means can also serve to actively convey the processed feedstock/char product towards the processed feedstock/char outlet in a controllable manner.

Controlling the movement of the processed feedstock/char towards the processed feedstock/char outlet and out of the primary chamber enables optimization of residence time in the chamber to ensure that moisture and volatiles are removed from the feedstock prior to being passed into the secondary chamber. The rate of movement of material out of the primary chamber and into the secondary chamber is regulated via the use of a controllable solids removal means. The solids removal means can be one of a variety of devices known in the art. Examples include, but are not limited to, screws, pusher rams, horizontal rotating paddles, horizontal rotating arms, and horizontal rotating wheels.

Figure 2:
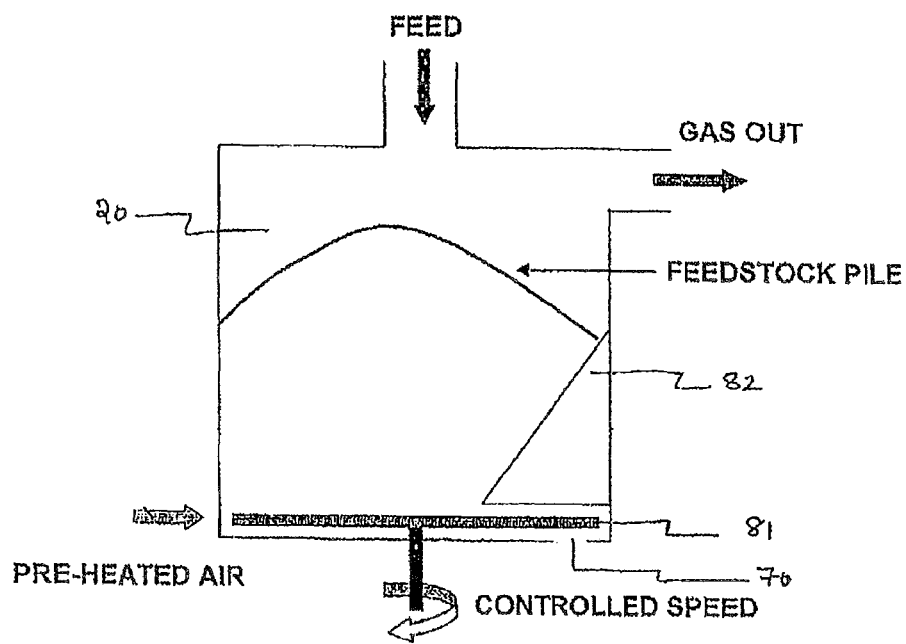
FIG. 2 depicts is a schematic diagram depicting in cross section a chamber having a rotating arm solids removal device, in accordance with one embodiment of the invention.
Figure 3:
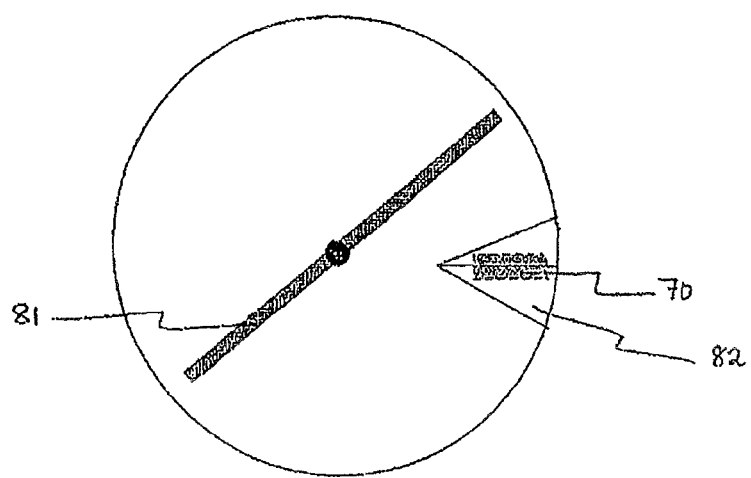
FIG. 3 is a schematic diagram depicting a top view of the rotating arm solids removal device of FIG. 2, in accordance with one embodiment of the invention.

In one embodiment, the solids removal device is a rotating paddle with thin spokes which moves the processed feedstock/char toward the processed feedstock/char outlet and out of the chamber. FIG. 2 depicts one embodiment of the invention in which the solids removal device comprises a rotating paddle 81 at the bottom of the primary chamber 20 which moves the processed feedstock/char out of the chamber 20 through a small processed feedstock/char outlet 70. To avoid the passage of partially processed feedstock/char through the processed feedstock/char outlet 70 by a direct drop, a barrier 82 is placed over the processed feedstock/char outlet 70. Limit switches may be optionally used to control the speed of the bar rotation and thus the rate of removal of residue. FIG. 3 is a top view of the rotating arm solids removal device depicted in FIG. 2, showing the relationship between the barrier 82 and the processed feedstock/processed feedstock/char outlet 70.

Figure 4:
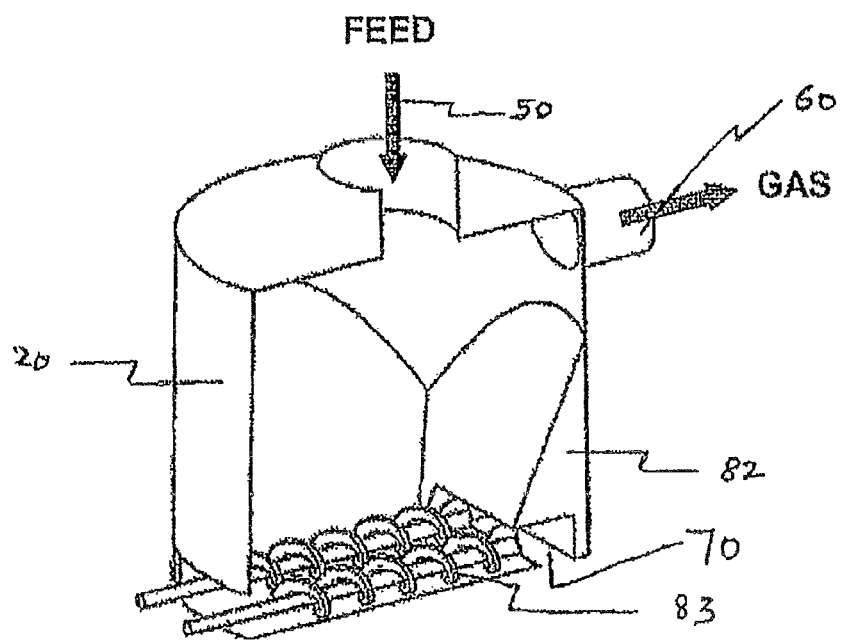
FIG. 4 is a perspective, cut away view of a chamber having an extractor screw solids removal device, in accordance with one embodiment of the invention.
Figure 5:
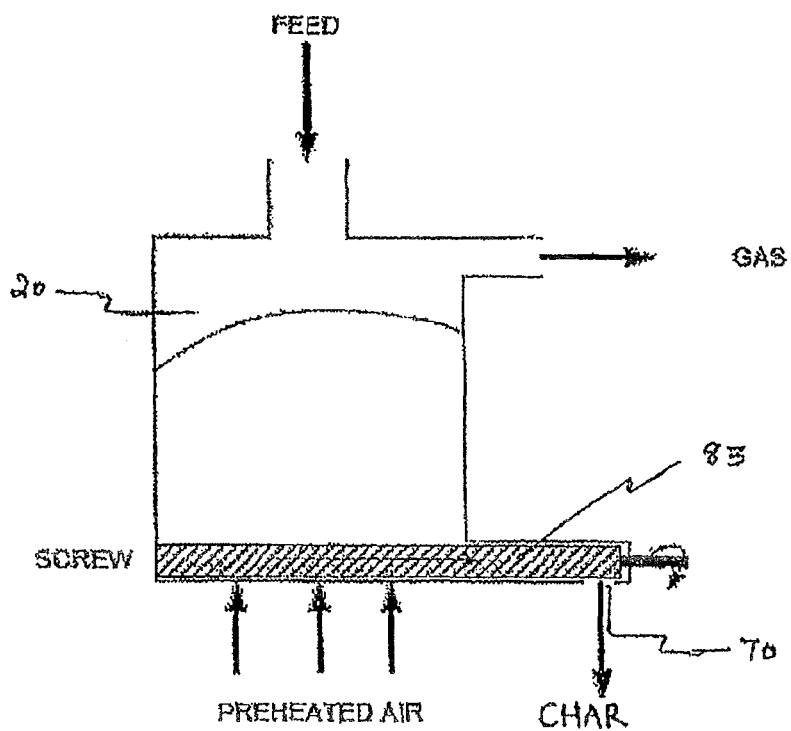
FIG. 5 shows a cross-sectional view of a variation of a chamber using an extractor screw-based solids removal device, where the solid residue outlet is moved away from the main processing chamber to avoid direct drop, in accordance with one embodiment of the present invention.

In one embodiment, the solids removal device is a set of screws which move the out of the chamber. In such an embodiment, the bottom portions of the chamber walls are optionally made to slant towards the screws at the bottom of the chamber, so that the processed feedstock/processed feedstock/char may be directed towards the screws. FIG. 4 depicts one embodiment of the invention in which the solids removal device comprises a set of extractor screws 83 at the bottom of the primary chamber 20 which moves the processed feedstock/char out of the chamber 20. Optional serration on the edge of the extractor screw flight helps in the breaking up of agglomerations that could otherwise result in jamming at the processed feedstock/char outlet 70. A barrier 82 is provided to avoid the passage of partially processed processed feedstock/char through the processed feedstock/char outlet 70 by a direct drop. A barrier is not required if the residue outlet 70 is moved away from the processing chamber 20, as for the embodiment shown in FIG. 5. Limit switches may be optionally used to control the speed of the screws and thus the rate of removal of residue.

Figure 6:
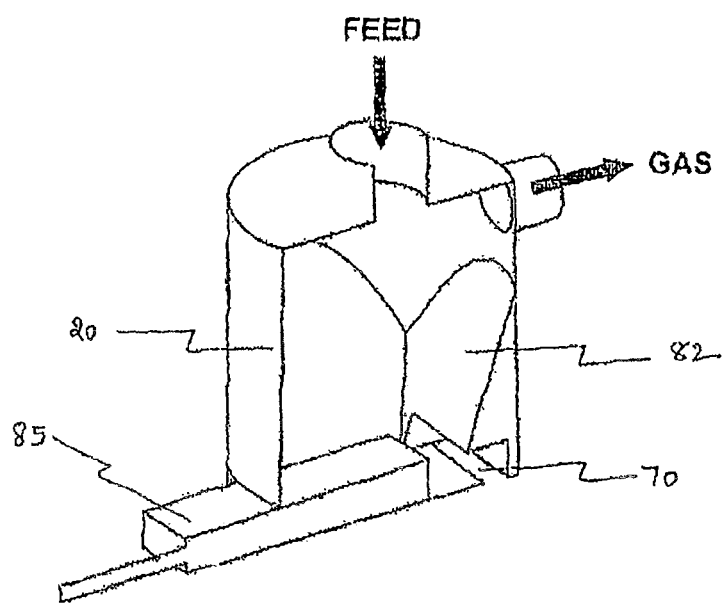
FIG. 6 is a perspective, cut away view of a chamber having a pusher ram solids removal device, in accordance with one embodiment of the present invention.
Figure 7:
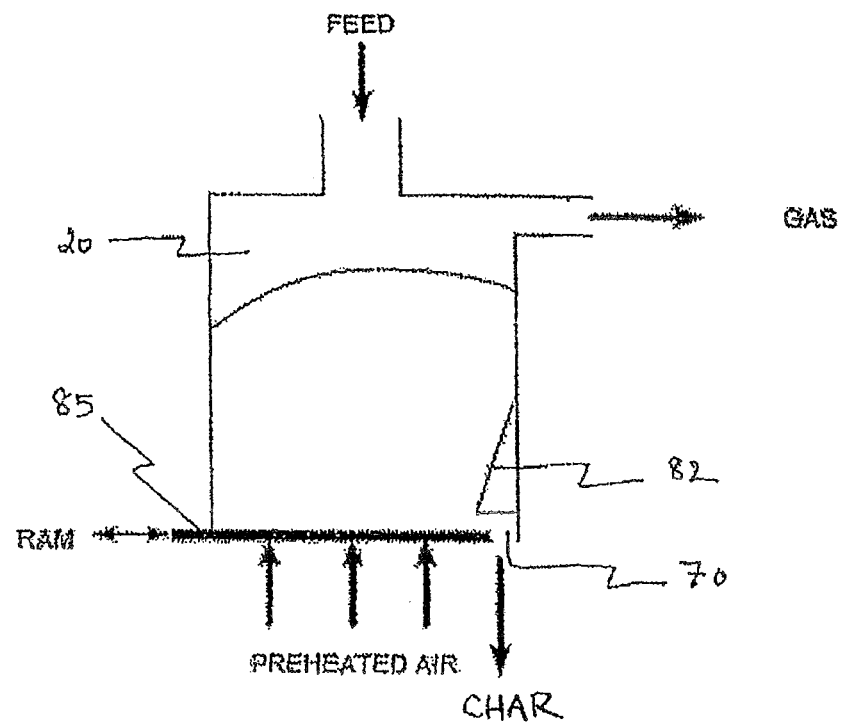
FIG. 7 is a section view of a chamber using a pusher ram-based solids removal device, in accordance with one embodiment of the invention.
Figure 8:
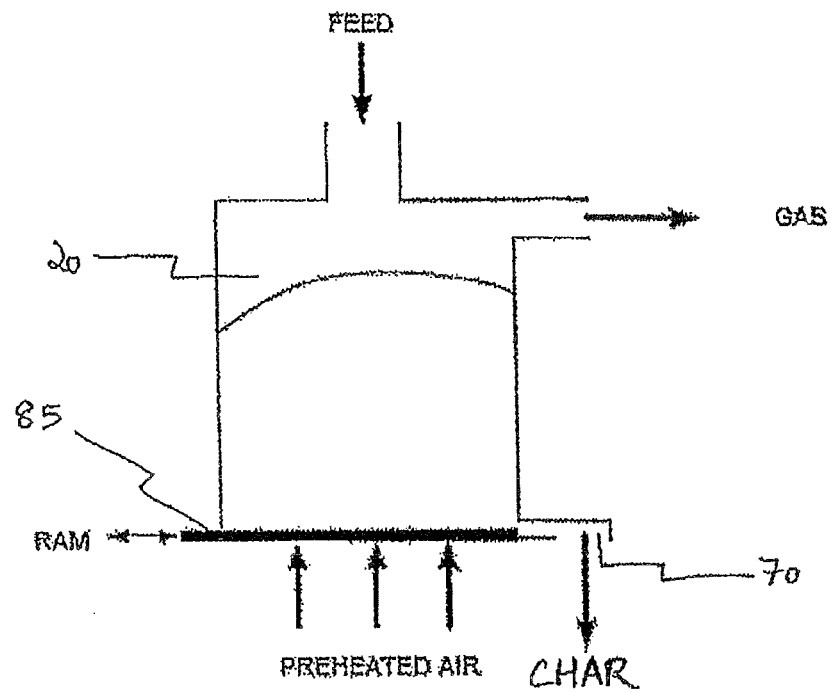
FIG. 8 shows a cross-sectional view of a variation of a chamber using pusher ram-based solids removal device, in accordance with one embodiment of the present invention.

In one embodiment, the solids removal device is a single thin ram which moves the processed feedstock/char toward the processed feedstock/char outlet and out of the chamber. In such an embodiment, the bottom portion of the side opposite to the ram is made slanting so that the processed feedstock/char may be directed towards the ram leaving space for the exit hole. FIGS. 6 and 7 depict embodiments in which the solids removal device comprises a single thin pusher ram 85 for the primary chamber 20 which moves the processed feedstock/char out of the chamber 20 through a small processed feedstock/char outlet 70. Depending on the position of the processed feedstock/char outlet 70, a barrier 82 may or may not be required as shown in FIG. 8. Limit switches may be optionally used to control the length of the pusher ram stroke and thus the amount of processed feedstock/char moved with each stroke.

In one embodiment, the primary chamber is a horizontally oriented chamber having a feedstock inlet located at one end of the chamber, and a processed feedstock/char outlet located at an opposite end of the chamber. As the feedstock progresses from one end of the horizontal primary chamber to the other, it loses its moisture and volatile fraction to form the resulting processed feedstock/char product. In such an embodiment, the chamber optionally comprises one or more means for laterally transporting solid material through the chamber from the feedstock inlet end toward the processed feedstock/char outlet end. Controlled lateral movement of material through the primary chamber via the use of one or more lateral transfer units allows for the optimization of the drying and volatilization stages of the gasification process that are carried out in the primary chamber, by controlling the residence time of the material at each stage.

In one embodiment, the lateral transfer units are one or more pusher rams in which material is predominantly pushed through the primary chamber. In one embodiment, the lateral transfer units are movable shelves/platforms on which material is predominantly moved through the chamber by sitting on top of a shelf/platform; a fraction of material may also be pushed by the leading edge of the movable shelf/platform. Controlled lateral movement by the shelf/platform-type lateral transfer units can be accomplished by varying the movement speed, the distance each lateral transfer unit moves and the sequence in which the plurality of lateral transfer units are moved in relation to each other. The one or more lateral transfer units can act in coordinated manner or individual lateral transfer units can act independently. In order to optimize control of the material movement and pile height, the individual lateral transfer units can be moved individually, at varying speeds, at varying movement distances, at varying frequency of movement.

Figure 9A:
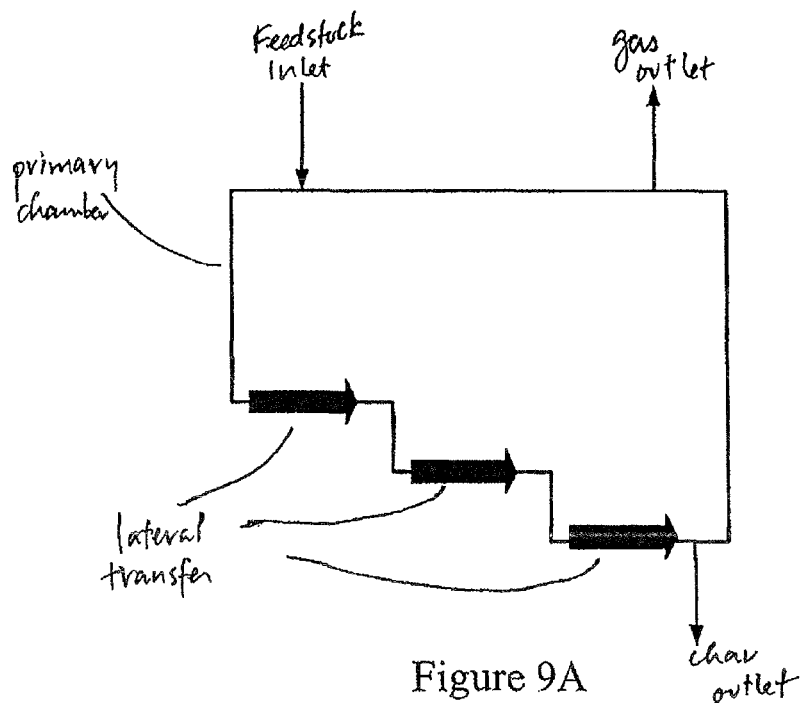
FIG. 9A is a schematic depiction of a stepped floor horizontal primary chamber and FIG. 9B is a schematic depiction of a sloped floor horizontal primary chamber.
Figure 9B:
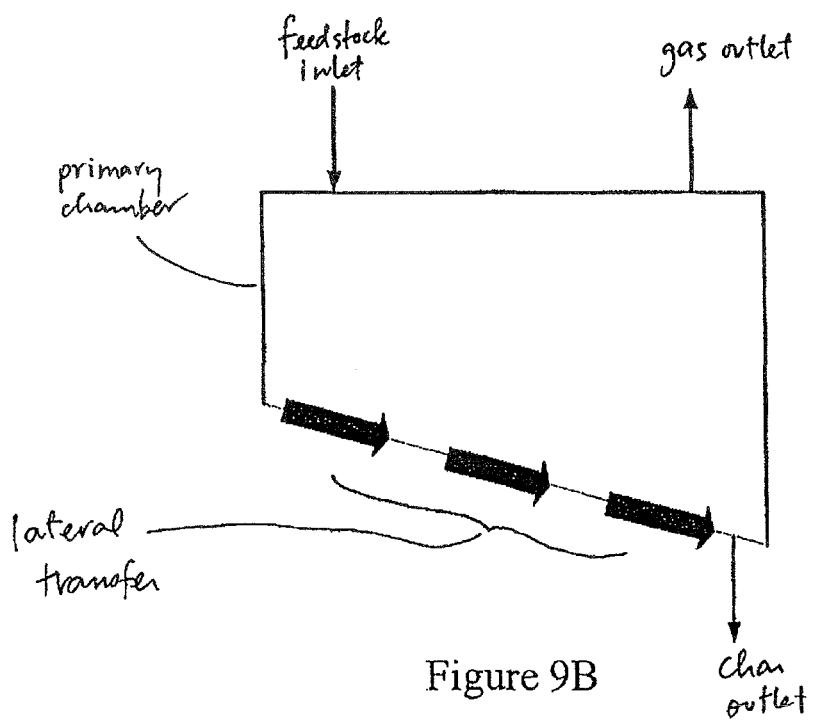

FIG. 9A is a schematic depiction of a stepped floor horizontal primary chamber with arrows indicating the lateral movement of solids through the chamber. FIG. 9B is a schematic depiction of a sloped floor horizontal primary chamber with arrows indicating the lateral movement of solids through the chamber.

In one embodiment, the lateral transfer unit is a screw mechanism located along the bottom of the primary chamber, whereby the material is transferred laterally by rotation of one or more screws toward the processed feedstock/char outlet. Controlled lateral movement by the screw-type lateral transfer units can be accomplished by varying the screw rotation speed.

A worker skilled in the art would readily appreciate that the lateral transfer units, for example, the screws or rams, in addition to conveying the feedstock through the primary chamber, can also be configured to convey the processed feedstock/char product out of the processed feedstock/char outlet.

Secondary Chamber

The secondary chamber is used to effect conversion of the processed feedstock/char received from the primary chamber to a second chamber gas product and ash. The processed feedstock/char is subjected to a higher temperature in the secondary chamber than that used in the primary chamber. For example, temperatures as high as 1000° C. (or even higher) may be employed, depending on the material's ash fusion temperature.

In one embodiment, the secondary chamber comprises a processed feedstock/char inlet proximal to the top of the secondary chamber through which processed feedstock/char from the primary chamber is received, one or more heated air inlets, a gas outlet, a solid residue (i.e., ash) outlet, one or more optional process additive (e.g., steam) inlets, and optionally means for controlling the residence time of the processed feedstock/char in the secondary chamber. In one embodiment, the one or more air inlets are located proximal to the bottom of the chamber.

The gases produced in the secondary chamber, referred to as the second chamber gas product, comprises the products of the carbon conversion reaction, as well as what amount of the volatile constituents remained in the processed feedstock/char product after the volatilization stage.

In one embodiment, the secondary chamber is a vertically oriented chamber. Examples of vertically oriented chambers known to be suitable for use in the present system include, but are not limited to, moving bed gasifiers, fixed bed gasifiers, entrained flow gasifiers and fluidized bed gasifiers. In those embodiments that employ heated air to convert the processed feedstock/char to gaseous products and ash, the gasifiers comprise heated air inlets located to provide optimal exposure of the processed feedstock/char to the heated air inputs and to ensure full coverage of heated air into the processing zone.

The secondary chamber optionally comprises a mechanical mixing means for ensuring efficient exposure of the processed feedstock/char to heated air and any process additives as may be required to convert the processed feedstock/char to ash and the desired gaseous products. The mechanical mixing means can also prevent gas channeling and keep the material from agglomerating.

Receiving the processed feedstock/char into the secondary chamber at the highest possible temperature results in the most efficient process, producing the maximum CO and $H_2$ and the minimum $CO_2$ and $H_2O$. The processing temperature is selected to he as high as possible to further maximize the yield of CO and $H_2$, while still maintaining the processed feedstock/char at a temperature below its fusion temperature. In one embodiment, the processed feedstock/char is received directly from the primary chamber, thereby minimizing heat loss during the transfer.

As in the primary chamber, the processed feedstock/char is heated, at least in part, by heated air introduced through heated air inlets. In one embodiment, the air is preheated through heat exchange with sensible heat from the hot syngas product. The heated air inlets are strategically located in and around the chamber to ensure full coverage of heated air into the processing zone.

The heat required for the processed feedstock/char conversion process is also provided, in part, by partial oxidation of the char. The heated air inputs, in addition to providing sensible heat, also supply the oxygen required to convert carbon to gaseous CO and some $CO_2$. The reaction of carbon with $O_2$, whether resulting in the formation of CO or $CO_2$, is exothermic. This exothermic reaction therefore also serves to provide a proportion of the heat required for the char-to-ash conversion. The char-to-ash conversion is therefore, in part, self-driving, but such reactions may also result in a non steady-state reaction resulting in an uncontrolled increase in temperature (e.g. approaching ash fusion temperature), which may result in undesired slagging in the secondary chamber. In one embodiment, the amount of heated air input into the secondary chamber is controlled to avoid such uncontrolled increases in temperature.

In one embodiment, steam additives are provided to the secondary chamber in order to convert the maximum of carbon to chemical heat while avoiding raising the processing temperature to levels detrimental to the main objective of this chamber (i.e., conversion of processed feedstock/char to gaseous products and ash). Accordingly, the secondary chamber can also optionally comprise process additive (steam) inlets to allow input of additional process additives to facilitate efficient conversion of the carbon in the processed feedstock/char into product gases. In one embodiment, the secondary chamber includes a plurality of steam inlets strategically located to direct steam into high temperature regions.

The type and quantity of the process additives are therefore selected to optimize the conversion of processed feedstock/char to a second chamber gas product and ash, while minimizing operating costs and maintaining adherence to regulatory authority emission limits. Steam input ensures sufficient free oxygen and hydrogen to maximize the conversion of the processed feedstock/char into the second chamber gas product having a heating value and ash. Air input assists in processing chemistry balancing to maximize carbon conversion to a fuel gas (minimize free carbon) and to maintain the optimum processing temperatures while minimizing the cost of input heat. The quantity of both additives is established and controlled as identified by the outputs for the feedstock being processed. The amount of air injection is established to ensure a maximum trade-off for relatively high cost of input heat while ensuring the overall process does not approach any of the undesirable process characteristics associated with incineration, and while meeting and bettering the emission standards of the local area.

In one embodiment, heated air and steam inlets may comprise high temperature resistance atomizing nozzles, as are commercially available.

In one embodiment, the heated air inlets are located proximal to the floor of the secondary chamber.

As with the primary chamber, in order to facilitate initial start up of the gasifier, the chamber can include access ports sized to accommodate various conventional burners, for example, natural gas or propane burners, to pre-heat the chamber.

Figure 10:
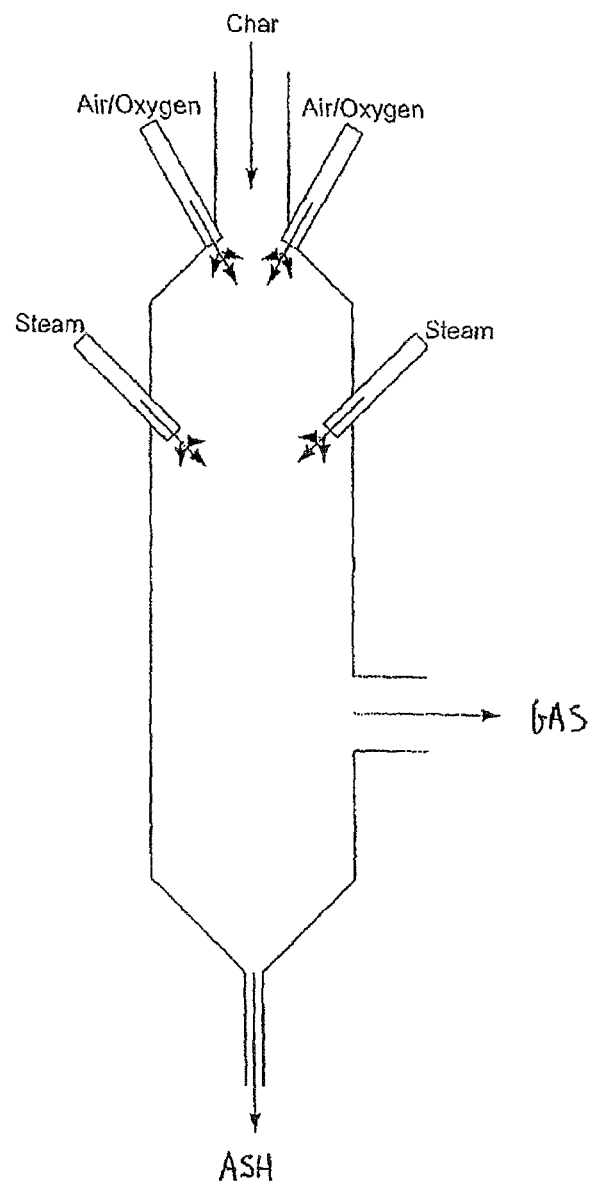
FIG. 10 is a schematic diagram of an entrained flow conversion chamber, in accordance with one embodiment of the invention.

In one embodiment of the invention using an entrained flow secondary chamber 22, with reference to FIG. 10, the heated air (and optional steam) inputs travel in a co-current flow relative to the processed feedstock/char inputs. Here, the processed feedstock/char is at least partially suspended by the movement of the additives, thereby promoting a more distributed contact between the input and the char. The reaction occurs as the reactant material moves downward, driven by gravity, in the direction of travel of additives. The second chamber gas product exits through a gas outlet, and the resulting solid residue (ash) exits at the bottom through the solid residue outlet.

Figure 11:
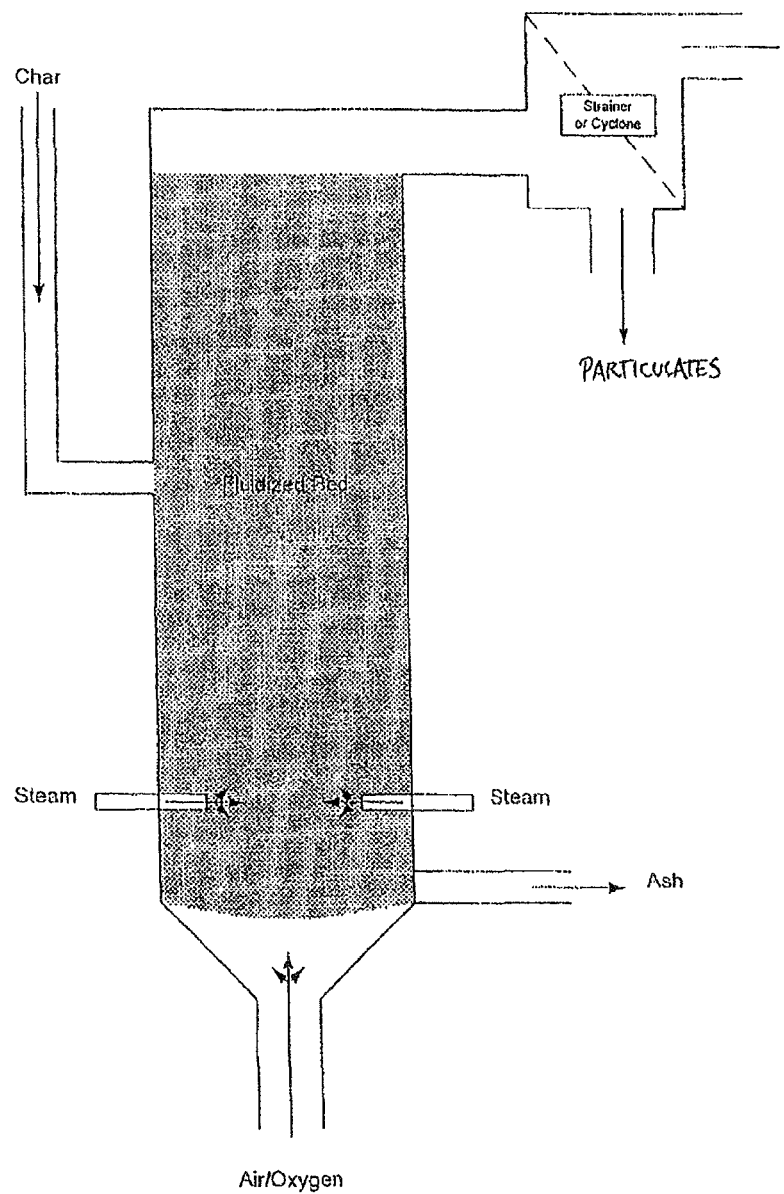
FIG. 11 is a schematic diagram of a fluidized bed conversion chamber, in accordance with one embodiment of the invention.

In one embodiment of the invention using a fluidized bed secondary chamber 24, with reference to FIG. 11, the processed feedstock/char is suspended in the upward moving additives. In fluidized beds, the additives enter the secondary chamber at velocities that greatly overcome any gravitational force, and the processed feedstock/char bed moves in a much more turbulent manner thereby causing a more homogeneous reaction region and behaving in a fashion similar to that of a turbulent fluid even though the processed feedstock/char may in fact be solid. The heated air and steam additives enter the secondary chamber from the bottom and pass counter-current to the char. The resulting solid residue (ash) exits through the solid residue outlet and the second chamber gas product leaves the secondary chamber through the gas outlet at the top.

Figure 12:
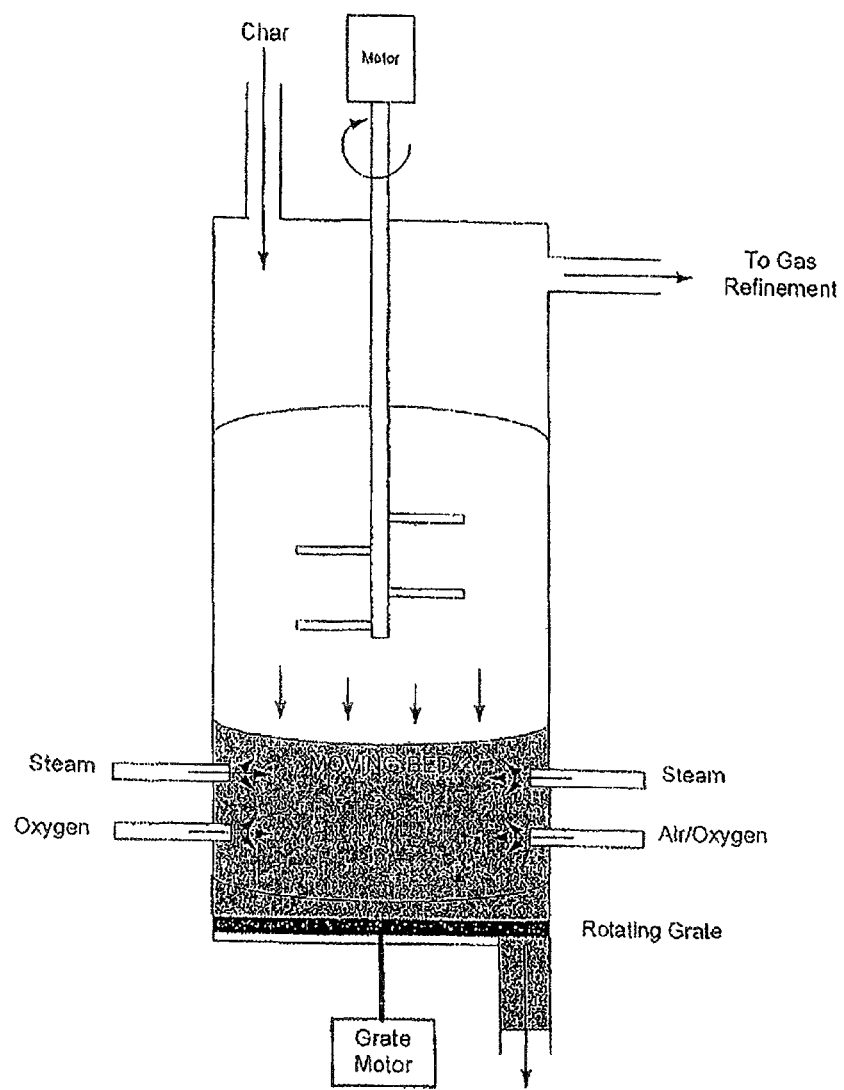
FIG. 12 is a schematic diagram of a moving bed conversion chamber, in accordance with one embodiment of the invention.
Figure 13A:
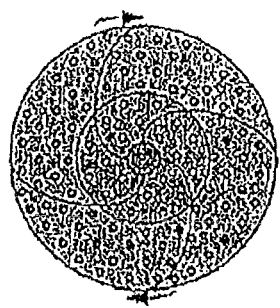
FIGS. 13A and 13B depict embodiments of rotating grates that can be used in a moving bed conversion chamber, in accordance with different embodiments of the present invention.
Figure 13B:
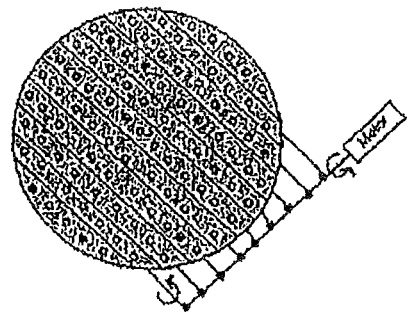

In one embodiment of the invention using a moving-bed secondary chamber 26, with reference to FIG. 12, the chamber 26 comprises a feedstock input proximal to the top of the secondary chamber, a plurality of heated air inlets, a gas outlet, a solid residue outlet and an actively controlled rotating grate at the base of the secondary chamber. Process additive inlets are also optionally provided for addition of steam into the secondary chamber. Also, mixing mechanisms 27 may be used to promote enhanced interaction between the additives and the processed feedstock/char within the processing chamber. The resulting solid residue (ash) exits through the solid residue outlet and the second chamber gas product leaves the secondary chamber through the gas outlet at the top. FIGS. 13A and 13B depict embodiments of rotating grates that can be used in a moving-bed secondary chamber, in accordance with different embodiments of the present invention.

Figure 14:
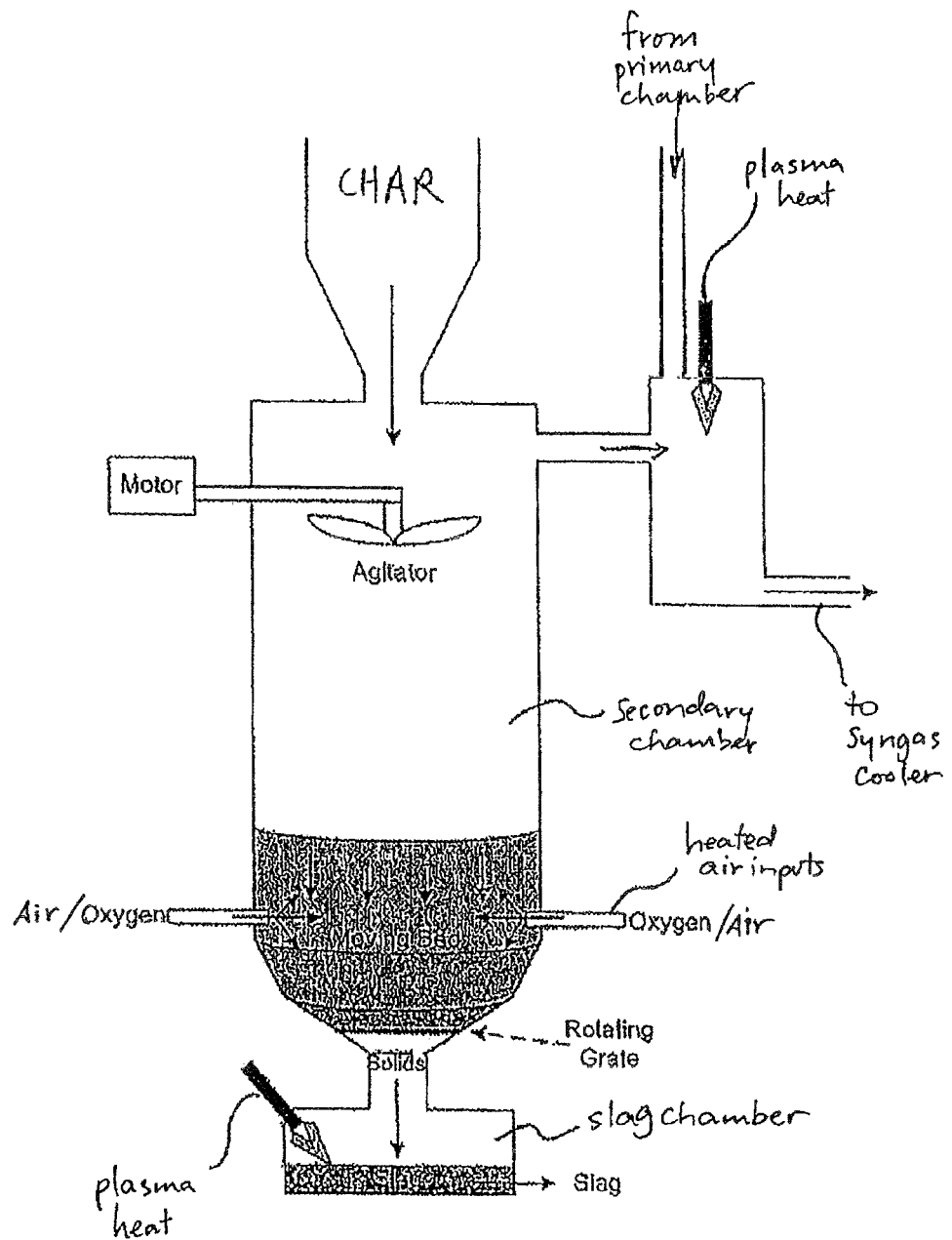
FIG. 14 is a schematic diagram of a moving bed conversion chamber in relation to a solid residue conditioning chamber and a gas reformulation chamber, in accordance with one embodiment of the invention.

FIG. 14 schematically depicts one embodiment of a moving bed conversion chamber in relation to a solid residue conditioning chamber and a gas reformulation chamber. In the illustrated embodiment, the conversion chamber comprises a processed feedstock/char input, heated air inlets, an agitator with externally mounted motor assembly, a solid residue outlet in communication with a plasma heated solid residue conditioning chamber, and a second chamber gas product outlet in communication with a plasma gas reformulation chamber. The gas reformulation chamber also receives a first chamber gas product from the volatilization chamber and converts the combined gas products to a syngas using plasma heat. The char conversion chamber comprises a rotating grate to regulate the flow of material from the carbon conversion zone to the solid residue conditioning chamber. Residual solid material enters the solid residue conditioning chamber and is heated with a plasma heat source to vitrify and blend the solid residue.

In one embodiment of the invention, the secondary chamber is a fixed-bed chamber. In fixed-bed systems, the processed feedstock/char enters the chamber from the top and rests on a surface through which the heated air inputs and optional steam (or other additives) are introduced. The gas inputs pass through the processed feedstock/char bed from the bottom in a counter-current fashion. The resulting solid residue (ash) exits through the solid residue outlet and the second chamber gas product leaves the secondary chamber through the gas outlet at the top.

In accordance with the present invention, the secondary chamber is optionally provided with means for controlling the residence time of the processed feedstock/char in the secondary chamber. Controlling the residence time of the processed feedstock/char in the secondary chamber ensures that sufficient time is provided for optimal mixing of the char, heated air and optional steam, thereby providing for the maximum conversion of processed feedstock/char to the second chamber gas product and ash.

In one embodiment, the means for controlling the residence time of the processed feedstock/char in a fixed-bed secondary chamber is provided by any mechanism suitable for controllably conveying solids out of the chamber. In such an embodiment, once the processed feedstock/char has been in the chamber for a residence time sufficient for conversion to the second chamber gas product and ash, the ash product is actively conveyed out of the chamber. Such mechanisms include, but are not limited to, any of the controllable solids removal means that may be employed to actively convey the processed feedstock/char product out of the primary chamber. Accordingly, the means for controlling the residence time of the processed feedstock/char in the secondary chamber can comprise screws, pusher rams, horizontal rotating paddles, horizontal rotating arms, or horizontal rotating wheels. In one embodiment, the means for controlling the residence time of the processed feedstock/char in the secondary chamber is any of the devices used for solids removal as depicted in any of FIGS. 2 to 9.

Figure 15:
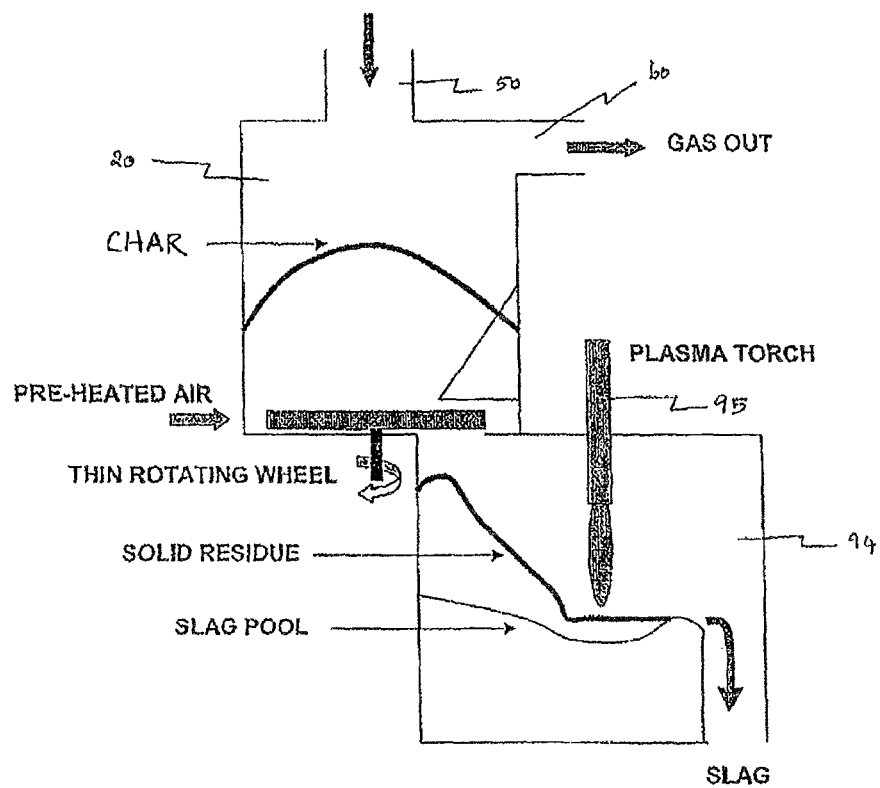
FIG. 15 is a cross-sectional schematic of a cascade of a fixed-bed char conversion chamber relative to a plasma heated residue conditioning chamber.

FIG. 15 depicts one embodiment of a fixed-bed secondary chamber comprising a rotating wheel solids removal device and the relationship of the secondary chamber to a solid residue conditioning chamber.

In one embodiment, the ash product is removed in a continuous manner at a rate appropriate to ensure that a sufficient residence time for carbon conversion is achieved. In one embodiment, the ash product is removed on an intermittent basis, once a sufficient residence time for carbon conversion has been achieved.

In one embodiment, the means for controlling the residence time of the processed feedstock/char in the secondary chamber is provided by any mechanism which impedes the progress of the processed feedstock/char out of the chamber, thereby retaining solids in the chamber for a residence time sufficient to ensure conversion of the processed feedstock/char to the second chamber gas product and ash. In one embodiment, as the processed feedstock/char gradually converts to ash, the ash product passively progresses out of the secondary chamber. Accordingly, the means for controlling the residence time of the processed feedstock/char in the secondary chamber can comprise an impedance mechanism upon or in which the processed feedstock/char is retained for a sufficient time to ensure processed feedstock/char conversion prior to the ash product being passed out of the secondary chamber. The impedance mechanism limits or regulates the movement of material out of the secondary chamber by either partially or intermittently occluding solid residue outlet or by forming a reservoir in which the processed feedstock/char temporarily accumulates.

The impedance mechanism is mounted at the bottom of the secondary chamber and can be of any physical barrier of suitable shape or design, including but not limited to dome shaped, pyramidal shaped, grates, moving grates, brick grate, plurality of ceramic balls, plurality of tubes etc. The shape and size of the impedance mechanism may in part be dictated by shape and orientation of the chamber.

Figure 16A:
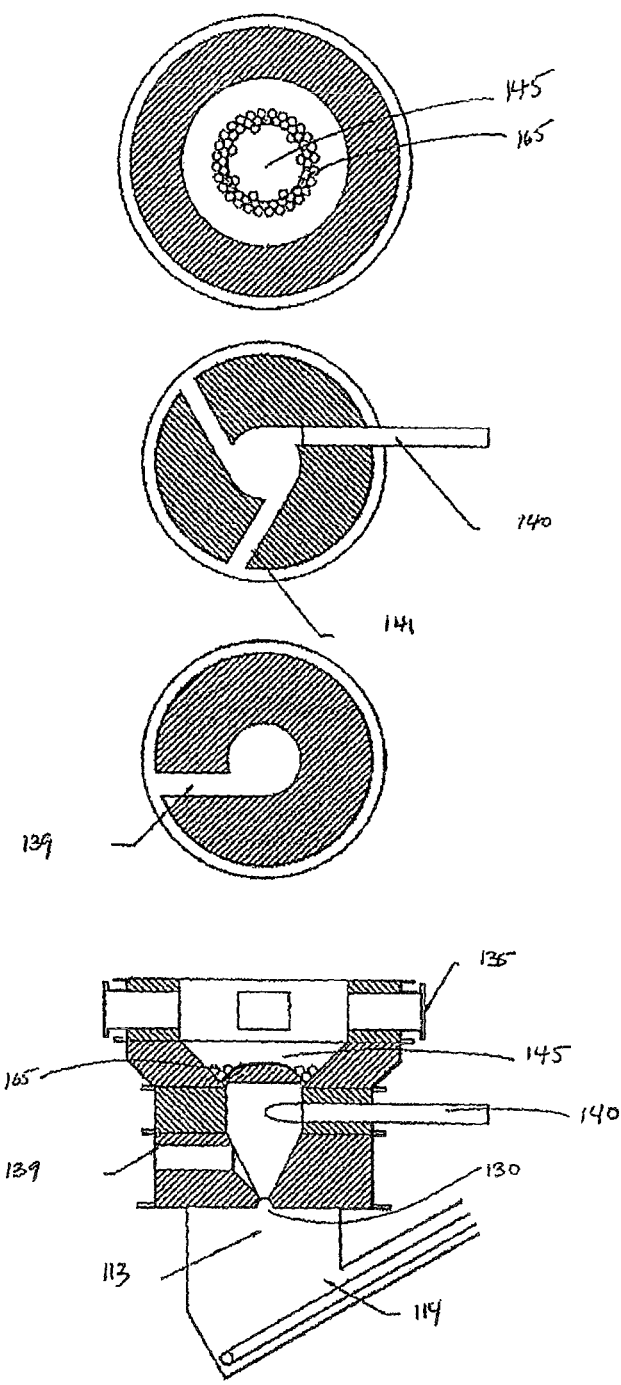
FIGS. 16A-F depict various impedance mechanisms for use in a fixed-bed char conversion chamber, in accordance with embodiments of the invention.

Referring to FIGS. 16A to F, which detail various alternative, non-limiting impedance mechanisms. In one embodiment as illustrated in FIG. 16A, the impedance mechanism is a solid refractory dome (145) mounted by wedge-shaped mounting bricks (150) at the bottom of the secondary chamber. The solid refractory dome is sized such that there is a gap (155) between the outside edge of the dome and the inner wall of the chamber. Optionally, the refractory dome further comprises a plurality of holes (not shown).

Figure 16B:
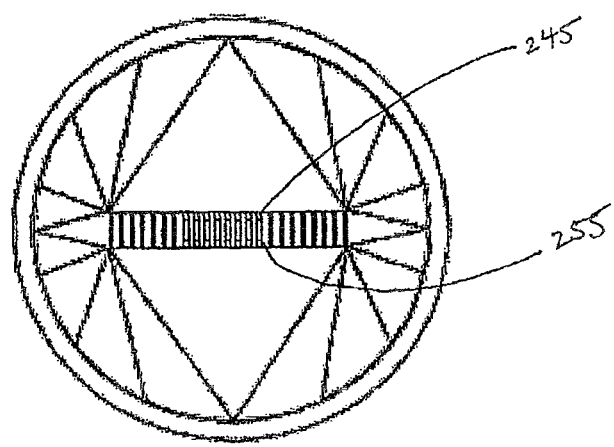

Referring to FIG. 16B the impedance mechanism comprises a solid refractory brick grate. The refractory brick grate (245) is provided with gaps (255) between the individual bricks to allow for communication between the carbon conversion chamber and the solid residue conditioning chamber.

Figure 16C:
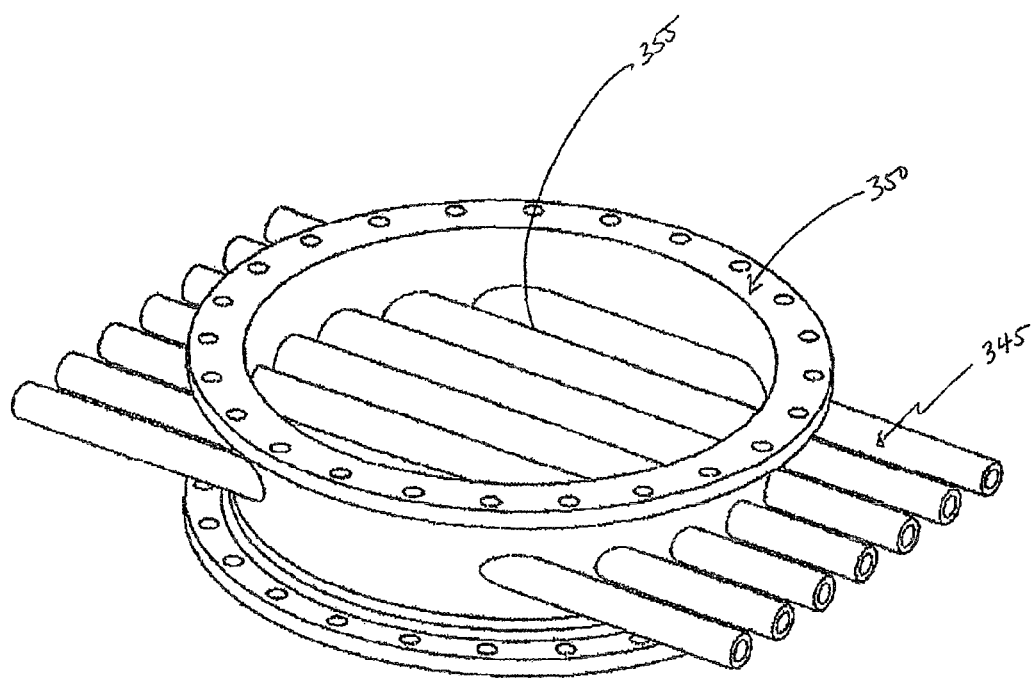

Referring to FIG. 16C, the impedance mechanism comprises a grate structure manufactured from refractory-lined tubes (345) mounted within a mounting ring (350), which is mounted at the bottom of the secondary chamber.

Figure 16D:
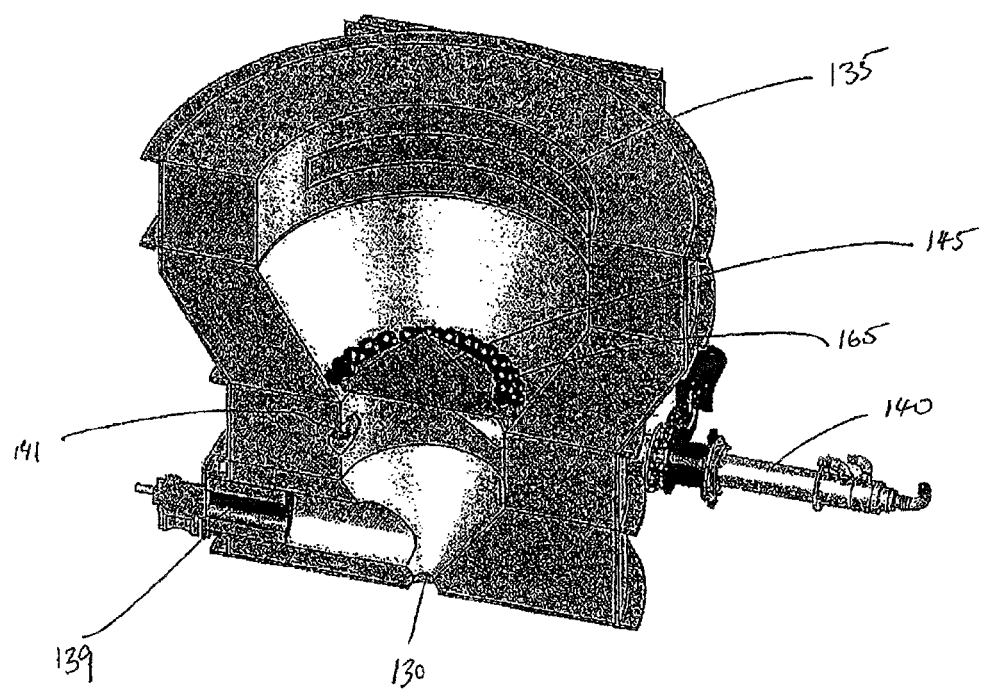

In one embodiment as illustrated in FIG. 16D, the impedance mechanism is a solid refractory pyramid (145) mounted by mounting bricks at the bottom of the secondary chamber.

Figure 16E:
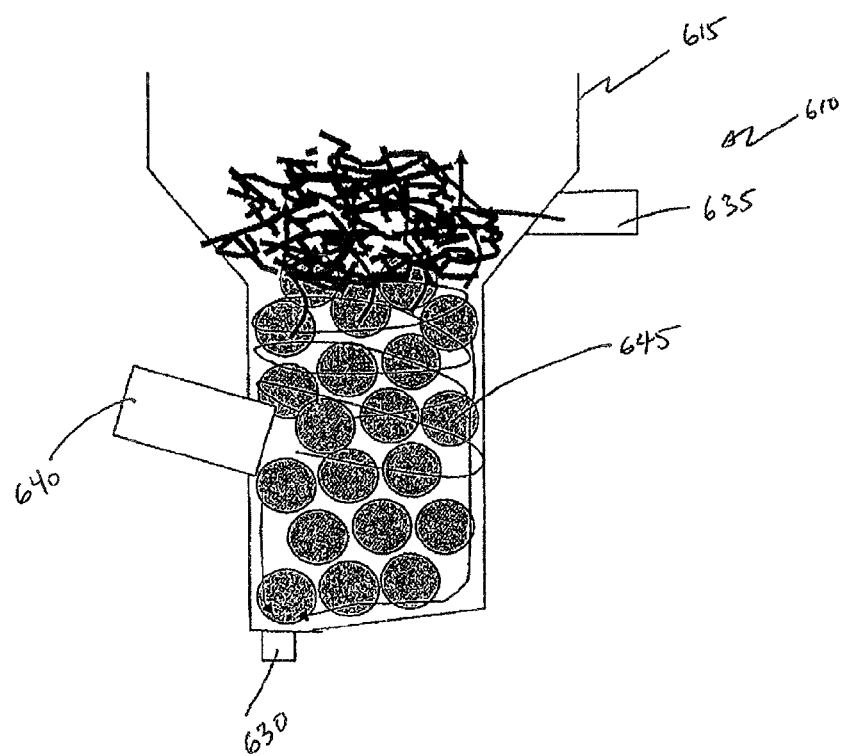

Referring to FIG. 16E, the impedance mechanism comprises a plurality of ceramic balls.

Figure 16F:
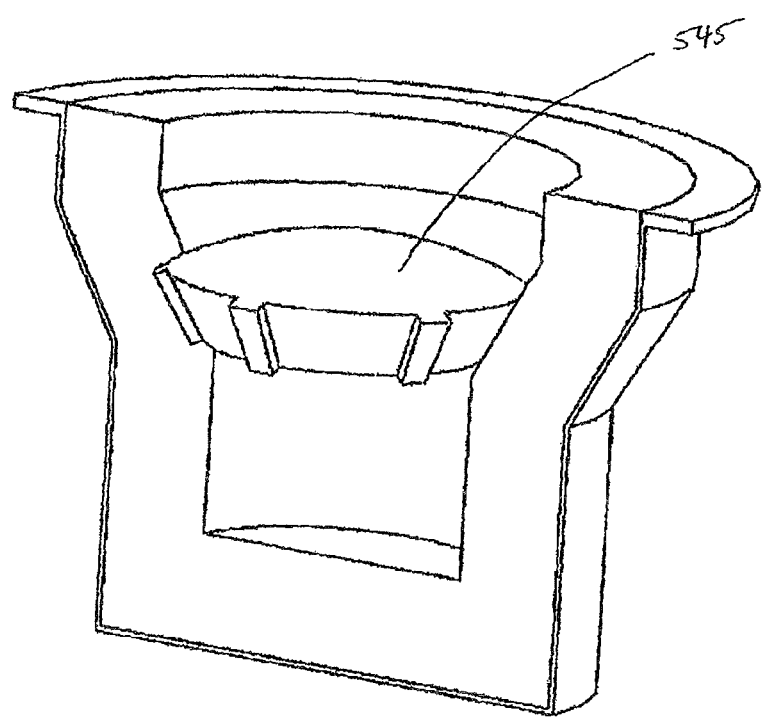

Referring to FIG. 16F, the impedance mechanism comprises a domed cogwheel.

The impedance mechanism and any associated mounting elements must be able to effectively operate in the harsh conditions of the secondary chamber and in particular must be able to operate at high temperatures. Accordingly, the impedance mechanism is constructed of materials designed to withstand high temperature. Optionally, the impedance mechanism may be refractory-coated or manufactured from solid refractory.

Both of the volatilization and secondary chambers are refractory lined chambers with an internal volume sized to accommodate the appropriate amount of material for the required solids residence time. The refractory materials employed are conventional refractory materials which are well-known to those skilled in the art and which are suitable for use for a high temperature (e.g. up to about 1000° C.), un-pressurized reaction. Examples of such refractory material include high temperature fired ceramics, i.e., aluminum oxide, aluminum nitride, aluminum silicate boron nitride, zirconium phosphate, glass ceramics and high alumina brick containing principally, silica, alumina and titania.

The ash product of the processed feedstock/char conversion step, whether removed actively or passively from the secondary chamber, is subsequently passed into the melting chamber. The melting chamber can either be a separate chamber or a zonal expansion of the secondary chamber.

In embodiments in which the melting chamber is a zonal expansion of the secondary chamber, the secondary chamber comprises a carbon conversion zone, an inter-zonal region or inter-zone contiguous with the melting chamber. The carbon conversion zone is adapted to i) input the processed feedstock to be conditioned, ii) input heated air to convert unreacted carbon in the processed feedstock to a syngas having a heating value and substantially carbon-free solid residue, iii) input optional process additives such as steam and/or carbon rich gas, iv) output the syngas and the solid residue. The inter-zonal region or inter-zone is designed to segregate the carbon conversion zone and the melting chamber and to regulate the flow of material there between and may optionally provide for the initial melting of the solid residue into slag by affecting the transfer of plasma heat to the solid residue. Accordingly, the secondary chamber and the melting chamber are housed within a single refractory-lined, generally vertically-oriented chamber comprising a processed feedstock inlet, heated air inlets, a gas outlet, a slag outlet, and a plasma heat source and optionally one or more process additive inlets.

The Melting Chamber

The main function of melting chamber is to receive the solid residue (i.e., ash) from the secondary chamber and to raise the temperature of the solid residue to the level required to melt, blend, and chemically react the solids to form a dense, silicometallic, vitreous material. In this chamber, a heat source such as plasma is used to achieve the high processing temperature required to vitrify the solid residue (around 1400-1500° C. depending on the ash properties) and blend it adequately to homogenize it before releasing it from the chamber, where it cools to form a dense, non-leachable, silicometallic solid.

Accordingly, the system of the present invention optionally comprises a melting chamber having a solid residue inlet, one or more heat sources, optional air input means, and a slag outlet. There are a number of heat sources that can be used to melt the solid residue.

Plasma systems appropriate for melting may be based on a variety of technologies, including but not limited to, microwave plasma, inductively coupled plasma, electric arc plasma and thermal plasma. In one embodiment, heat is provided by a plasma system comprising plasma torch systems. Plasma torch systems known in the art include but are not limited to transferred arc torch (TAT) and non-transferred arc torch (NTAT) systems. Both TAT and NTAT systems need positive and negative points for operation. In NTAT systems, both points are metallic while in TAT systems, the points depend on the "workpiece". As very high temperatures are typically achieved, effective cooling techniques, such as for example rapid water cooling, is required for operation. Torch systems can be designed to work in alternating current (AC) mode, both single and multi-phase, and direct current (DC) mode.

In one embodiment of the invention utilizing NTAT systems, two magnetic field coils can be used to rotate the arcs. A worker skilled in the art will readily understand that the operation of the torch systems can be varied by adjusting the position of the magnetic coils and the materials used as electrodes for the plasma torch systems. Materials that can be used for the electrodes in these torch systems include but are not limited to steel, tungsten, graphite, thoriated tungsten, copper and alloys of copper with Zr, Cr or Ag.

A worker skilled in the art will understand that the choice of carrier gas for a plasma torch system impacts the reaction chemistry within the melter. For example, the carrier gas can be reducing, oxidizing or inert. Typical carrier gases for torch systems include but are not limited to air, nitrogen, helium, argon, oxygen, carbon monoxide, hydrogen and methane.

A worker skilled in the art will understand that the choice of a particular plasma torch system for melting will depend on a variety of factors including but not limited to: electrical to thermal efficiency; heat transfer to the 'working material'; electrode life; electrode cost; ease of electrode replacement; temperature profile; plasma gas enthalpy; simplicity of design and manufacture of support systems such as power supplies and control systems; operator qualification requirement; requirement on type of carrier gas; need for de-ionized water; reliability; capital and operating costs; ability to be moved within the melting vessel; and ability to be inserted close to the working material within the vessel.

In one embodiment of the invention, the source of heat for residue melting is Joule heating elements. Joule heating refers to the generation of heat in a conductor by the passage of an electric current within, due to the interaction between the moving charged particles and the atomic ions within the conductor. The heat produced within is proportional to the electrical resistance of the wire multiplied by the square of the current.

In one embodiment of the invention, the source of heat for residue melting is one or more gas burner systems.

A gas burner generates a flame using a gaseous fuel such as acetylene, natural gas or propane. Optionally, an air inlet may be used as appropriate with some gas burners, to mix the fuel gas with air to obtain complete combustion. For example, acetylene is commonly used in combination with oxygen. A worker skilled in the art will know that the selection of appropriate gas for the gas burner will depend on various factors including for example, the desired flame temperature.

The molten slag may periodically or continuously be exhausted from the solid residue chamber and is thereafter cooled to form a solid slag material. Such slag material may be intended for landfill disposal. Alternatively, the molten slag can be poured into containers to form ingots, bricks tiles or similar construction material. The solid product may further be broken into aggregates for conventional uses.

In one embodiment, the solid residue processed in the solid residue conditioning chamber includes solids transferred from a downstream process, for example, solids retrieved from a baghouse filter in a downstream gas conditioning process.

The solid residue conditioning chamber is designed to ensure that the residence time is sufficient to ensure that the solid residue is brought up to an adequate temperature to melt and homogenize the solid residue.

The type of heat source used, as well as its position and orientation, are additional factors to be considered in the design of the solid residue conditioning chamber. The heat source must meet the required temperature for heating the solid residue to required levels to melt and homogenize the solid residue while allowing the resulting molten solid residue to flow out of the chamber.

The melting chamber wall is lined with refractory material that can be one, or a combination of, conventional refractory materials known in the art which are suitable for use in a chamber for extremely high temperature (e.g., a temperature of about 1100° C. to 1800° C.) non-pressurized reactions. Examples of such refractory materials include, but are not limited to, high temperature fired ceramics (such as aluminum oxide, aluminum nitride, aluminum silicate, boron nitride, zirconium phosphate), glass ceramics and high alumina brick containing principally, silica, alumina and titania.

Gas Reformulating Zone

The main function of the gas reformulating zone is to reformulate the first chamber gas product and the second chamber gas product into syngas. Depending on the system design, the gas reformulating zone can be located at the top of the primary chamber, within the top of the secondary chamber or within its own chamber.

Accordingly, the gas reformulating zone receives the first chamber gas product (off gas) from the primary chamber, and in some embodiments, as well as the second chamber gas product from the secondary chamber, and applies heat such as plasma heat, to convert these gases efficiently and completely into the syngas product. The gas reformulating zone will also remove or decompose any contaminants (e.g., tars, fine particulates) present in the raw gaseous products, thereby alleviating the burden on downstream gas quality conditioning processes. If adjustments to the chemical composition of the syngas are required, the system provides for the addition of process additives, such as air or steam, through process additive inlets to provide the necessary molecular species for recombination into a syngas having a desired composition.

In accordance with the present invention, the gas reformulating zone is therefore provided in fluid communication with the gas outlets of the primary chamber and optionally the secondary chamber, and comprises one or more sources of heat (e.g., plasma heat or hydrogen burner heat) sources, one or more optional process additive inlets, and a syngas outlet. The one or more process additive inlets are provided for the optional injection of air/oxygen and/or steam into the reformulating zone. The syngas produced in the plasma reformulating step exits the chamber through the syngas outlet.

In one embodiment, the gas reformulating zone is located within or within a chamber that is contiguous with the primary chamber, i.e., there is no conduit separating the two chambers. In such an embodiment, the gas reformulation step and the volatilization step take place in separate zones within a single chamber. It is understood that, in such an embodiment, the second chamber gas product from the secondary chamber is introduced to this single chamber through a dedicated second chamber gas inlet.

In order for the reformulating reaction to occur, the gas reformulating chamber must be heated to a sufficiently high temperature. In one embodiment of the present invention, the temperature is about 800° C. to about 1200° C. In another embodiment of the present invention, the temperature is about 950° C. to about 1050° C. In another embodiment the temperature is about 1000° C. to 1200° C. In one embodiment, the operating temperature inside the reformulating chamber is around 1000° C. The temperature of the syngas exiting the chamber will range from about 400° C. to over 1000° C. The temperature of the syngas may be reduced by a heat exchange system used to recover heat and cool the syngas, as will be discussed later.

In one embodiment, only the gas from the primary chamber passes into the gas reformulating zone.

In one embodiment, the gas reformulating zone is located within its own chamber and the primary chamber gas product and the secondary chamber gas product are combined prior to their introduction into the gas reformulating zone, and therefore enter the reformulating chamber through a common inlet. In one embodiment, the primary chamber gas product and the secondary chamber gas product are not combined prior to their introduction into the gas reformulating chamber, and therefore the separate incoming streams enter the reformulating chamber through separate inlets.

The gas reformulating chamber is generally a refractory lined chamber with a sufficient internal volume to accommodate the residence time required for the conversion reaction to take place. The gas reformulating chamber may be any shape so long as it allows for the appropriate residence time to enable sufficient chemical conversion of the gases and optional process additives into syngas. For example, the gas reformulating chamber may be a straight tubular or venturi shaped structure. The gas reformulating chamber may be disposed in a variety of positions so long as appropriate mixing of the gases and optional process additives and residence time is maintained.

The one or more inlets for delivering the first chamber gas product and the second chamber gas product to the reformulating chamber can be incorporated in a manner to allow concurrent, countercurrent, radial, tangential, or other feed flow directions. The gases entering the plasma heated gas reformulating chamber are optionally blended by gas mixing means. The chamber can include one or more chambers, can be vertically or horizontally oriented, and can have internal components, such as baffles, to promote back mixing and turbulence. Baffles induce mixing of the gases by creating turbulence. Baffle arrangements are known in the art and include but are not limited to bridge wall baffles and choke ring baffle arrangements. In one embodiment, the mixing means may include one or more air jets at or near the inlet(s) which inject a small amount of air into the gases, thereby creating a swirling motion or turbulence in the gas stream to mix the gases.

The gas reformulating heat can be provided by a number of sources such as a type of plasma heat generating system or a hydrogen burner.

Plasma systems appropriate for gas reformulation may be based on a variety of technologies, including but not limited to, microwave plasma, inductively coupled plasma, electric arc plasma and thermal plasma. The plasma heat sources may be selected from non-transferred arc AC and DC plasma torches, transferred arc AC and DC plasma torches and the electrodeless high-frequency induction plasma heating devices. A variety of gases have been used with plasma torches including but not limited to air, $O_2$, $N_2$, Ar, $CH_4$, $C_2H_2$ and $C_3H_6$. A worker skilled in the art could readily determine the type of plasma heat sources that may be used in the gas reformulating chamber of the present invention.

In one embodiment of the invention, the reformulating heat is provided by a plasma system comprising plasma torch systems. Plasma torch systems known in the art include but are not limited to transferred arc torch (TAT) and non-transferred arc torch (NTAT) systems. Both TAT and NTAT systems need positive and negative points for operation. In NTAT systems, both points are metallic while in TAT systems, the points depend on the "workpiece". As very high temperatures are typically achieved, effective cooling techniques, such as for example rapid water cooling, is required for operation. Torch systems can be designed to work in alternating current (AC) mode, both single and multi-phase, and direct current (DC) mode.

In one embodiment of the invention utilizing NTAT systems, two magnetic field coils was used to rotate the arcs. A worker skilled in the art will readily understand that the operation of the torch systems can be varied by adjusting the position of the magnetic coils and the materials used as electrodes for the plasma torch systems. Materials that can be used for the electrodes in these torch systems include but are not limited to steel, tungsten, graphite, thoriated tungsten, copper and alloys of copper with Zr, Cr or Ag.

A worker skilled in the art will understand that the choice of carrier gas for a plasma torch system impacts the reaction chemistry within the gas reformulation zone. For example, the carrier gas can be reducing, oxidizing or inert. Typical carrier gases for torch systems include but are not limited to air, nitrogen, helium, argon, oxygen, carbon monoxide, hydrogen and methane.

A worker skilled in the art will understand that the choice of a particular plasma torch system for gas reformulation will depend on a variety of factors including but not limited to: electrical to thermal efficiency; heat transfer to the 'working material'; electrode life; electrode cost; ease of electrode replacement; temperature profile; plasma gas enthalpy; simplicity of design and manufacture of support systems such as power supplies and control systems; operator qualification requirement; requirement on type of carrier gas; need for de-ionized water; reliability; capital and operating costs; ability to be moved within the gas reformulation chamber; and ability to be inserted close to the working material within the gas reformulation chamber.

In one embodiment of the invention, the reformulating heat is provided by a hydrogen burner. In one embodiment of the invention, the reformulating heat is provided by a combination of one or more hydrogen burners and one or more plasma systems.

In one embodiment of the invention, a hydrogen burner is used to react oxygen and hydrogen to produce ultra-high temperature steam (>1200° C.). This steam can be applied to the off-gas to decompose tars and increase its heating value. This technique has similar energy efficiency as a plasma torch. However, poor combustion can lead to $O_2$ reacting with the off-gas producing low temperature $H_2O$ & $CO_2$. Hence, as described later, this technique is better used to produce the additives to the lowermost processing region of the gasifier, than to the off-gas stream itself.

In one embodiment a hydrogen burner is utilized to produce high temperature steam which is subsequently mixed and distributed with the heated gaseous flow. The high temperature steam can conceivably be generated in a two stage process where, at the first stage, the input flow of water is decomposed into hydrogen and oxygen in the electrolyser and, at the second stage, the oxygen and hydrogen produced are combusted in the hydrogen burner generating high temperature steam (temperature up to 2500-3000° C.). Due to the high temperature of the steam generated it contains a large amount of highly reactive free radicals which promote the carbon conversion process partially favoured in the final processing region of the gasifier.

Multiple ports can be included to mount more than one source of plasma heat, with options for axial, radial, tangential or other promoted flow direction for the plasma gas, with plasma torches providing upward or downward gas flow.

The wall of the chamber can be lined with refractory material and/or a water jacket can encapsulate the reactor for cooling and/or generation of steam. Multiple walls may be included, along with a cooling mechanism for heat recovery, and the system may also include heat exchangers for high pressure/high temperature steam production, or other heat recovery capability.

The Heat Recovery Subsystem

The heat recovery subsystem facilitates the efficient recovery of sensible heat from the hot syngas product to heat air for use in the gasification process.

Figure 17:
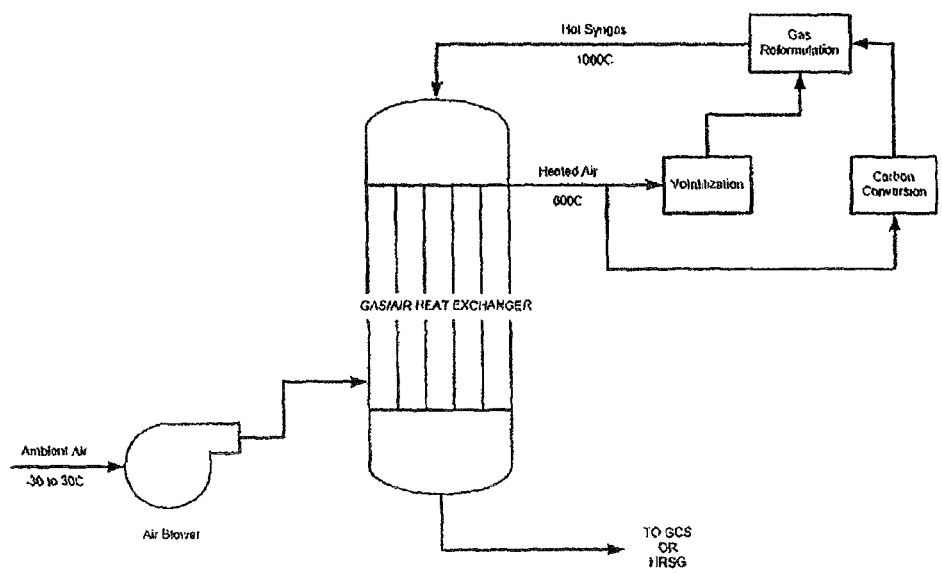
FIG. 17 is a schematic diagram depicting the recovery of heat from the syngas produced in the gas refining chamber using the heat recovery subsystem according to one embodiment of the instant invention.

FIG. 17 is a schematic diagram depicting the recovery of heat from the syngas produced in the gas reformulating chamber using the heat recovery subsystem of the instant invention. In this embodiment, the heat recovery subsystem is a syngas-to-air heat exchanger, wherein the heat from the syngas produced in the plasma gas reformulation chamber is used to heat ambient air, thereby providing heated air and cooled syngas. This heated air can be passed into the volatilization and/or secondary chambers and thus used to drive the gasification process. The cooled syngas is ready for subsequent gas conditioning steps and sensible heat is recovered and transferred as heated air to various stages in the gasification process.

Different classes of heat exchangers may be used in the present system, including shell and tube heat exchangers, both of straight, single-pass design and of U-tube, multiple pass design, as well as plate-type heat exchangers. The selection of appropriate heat exchangers is within the knowledge of the skilled worker.

The heat recovery subsystem employs a conduit system through which the syngas is transported to the heat exchanging means for recovery of the syngas sensible heat. The conduit system will optionally employ one or more regulators and/or blowers, located throughout the system to provide a means for managing the flow rate of the syngas product.

In one embodiment, the heat recovery subsystem employs a conduit system for transferring the heated air to the primary chamber and/or the secondary chamber, where it is introduced to the respective chambers via air inlets. In one embodiment, the system comprises means for controlling the relative amounts of heated air that is distributed to the primary chamber and the secondary chamber, to ensure that sufficient heated air is provided to carry out the volatilization and processed feedstock/char conversion stages, respectively. Accordingly, the air conduit system optionally employs one or more regulators, flow meters and/or blowers, located as required throughout the system to provide a means for controlling the flow rate and/or distribution of the heated air. The heated air conduits also optionally comprise means for diverting the heated air, for example, to venting outlets or to optional additional heat exchange systems.

The heat recovery subsystem optionally recovers further sensible heat from the hot syngas using a heat exchanging means to transfer the heat from the syngas to water, thereby producing steam and yet further cooled syngas. The further sensible heat is recovered from the syngas through a second heat exchange means, for example, a heat recovery steam generator or waste heat boiler, which uses the recovered heat to generate steam. The steam can be used as a process steam additive during the gasification process to ensure sufficient free oxygen and hydrogen to maximize the conversion of the feedstock into the syngas product. The steam produced may also be used to drive rotating process equipment, for example, the air blowers, as well as syngas blowers.

In one embodiment, the heat recovery subsystem comprises a heat recovery steam generator (HRSG) located downstream from the syngas-to-air heat exchanger. In such an embodiment, the HRSG is a shell and tube heat exchanger designed such that the syngas flows vertically through the tubes and water is boiled on the shell side.

Gas Quality Conditioning System (GQCS)

Having undergone a cooling step, the syngas is ready for subsequent gas conditioning steps in a gas quality conditioning subsystem (GQCS). The GQCS serves to remove particulate matter and other impurities, such as acid gases (HCl, $H_2S$), and/or heavy metals, from the syngas. The presence and sequence of processing steps required is determined by the composition of the synthesis gas and the contaminants present therein. The composition of the synthesis gas and the type of contaminants present is determined in part by the composition of the feedstock undergoing gasification. For example, if high sulfur coal is the primary feedstock, the syngas product will contain high amounts of sulfur that must be removed prior to use of the syngas product in downstream applications. Once the synthesis gas is cleaned and conditioned, the output gas is then optionally stored or directed to the required downstream application.

Optional Downstream Elements

The syngas produced using the gasification system of the present invention is suitable for use in downstream applications, such as for the production of electricity. Accordingly, the present system optionally includes any downstream elements as may be required for such applications. In one embodiment, the system includes a gas homogenization subsystem. This gas homogenization subsystem comprises a gas homogenization chamber for receiving the syngas produced from the gasification system and allowing mixing of the syngas to attenuate any fluctuations in the chemical composition of the syngas in the homogenization chamber. Fluctuations in other gas characteristics, such as pressure, temperature and flow rate, will also be reduced during mixing of the syngas. The gas homogenization chamber is designed to receive syngas from a gasification process and retain the gas for a residence time sufficient for mixing of the gas to achieve a volume of gas with a consistent and/or specified chemical composition.

In one embodiment, the system includes a gas storage system for storing cleaned and conditioned syngas prior to its utilization in electricity generating systems.

Downstream applications for the product syngas include uses for the production of electricity, for example, in a gas turbine or a gas engine. The syngas may also be combusted to generate steam in a boiler, and the steam used to generate electricity in a steam turbine.

The Control System

The system of the present invention comprises a control system for use with the gasification system to monitor and regulate the different stages of the process to ensure the efficient and complete conversion of the carbonaceous feedstock into a syngas product. The control system also optionally provides for the production of a syngas product having a consistent and/or specified composition.

The control system comprises one or more sensing elements for real-time monitoring of operating parameters of the system; and one or more response elements for adjusting operating conditions within the system to optimize the conversion reaction, wherein the sensing elements and the response elements are integrated within the system, and wherein the response elements adjust the operating conditions within the system according to the data obtained from the sensing elements.

In one embodiment of the present invention, a control system may be provided to control one or more processes implemented in, and/or by, the various systems and/or subsystems disclosed herein, and/or provide control of one or more process devices contemplated herein for affecting such processes. In general, the control system may operatively control various local and/or regional processes related to a given system, subsystem or component thereof, and/or related to one or more global processes implemented within a system, such as a gasification system, within or in cooperation with which the various embodiments of the present invention may be operated, and thereby adjusts various control parameters thereof adapted to affect these processes for a defined result. Various sensing elements and response elements may therefore be distributed throughout the controlled system(s), or in relation to one or more components thereof, and used to acquire various process, reactant and/or product characteristics, compare these characteristics to suitable ranges of such characteristics conducive to achieving the desired result, and respond by implementing changes in one or more of the ongoing processes via one or more controllable process devices.

The control system generally comprises, for example, one or more sensing elements for sensing one or more characteristics related to the system(s), processe(s) implemented therein, input(s) provided therefor, and/or output(s) generated thereby. One or more computing platforms are communicatively linked to these sensing elements for accessing a characteristic value representative of the sensed characteristic(s), and configured to compare the characteristic value(s) with a predetermined range of such values defined to characterise these characteristics as suitable for selected operational and/or downstream results, and compute one or more process control parameters conducive to maintaining the characteristic value with this predetermined range. A plurality of response elements may thus be operatively linked to one or more process devices operable to affect the system, process, input and/or output and thereby adjust the sensed characteristic, and communicatively linked to the computing platform(s) for accessing the computed process control parameter(s) and operating the process device(s) in accordance therewith.

In one embodiment, the control system provides a feedback, feedforward and/or predictive control of various systems, processes, inputs and/or outputs related to the conversion of carbonaceous feedstock into a gas, so to promote an efficiency of one or more processes implemented in relation thereto. For instance, various process characteristics may be evaluated and controllably adjusted to influence these processes, which may include, but are not limited to, the heating value and/or composition of the feedstock, the characteristics of the product gas (e.g. heating value, temperature, pressure, flow, composition, carbon content, etc.), the degree of variation allowed for such characteristics, and the cost of the inputs versus the value of the outputs. Continuous and/or real-time adjustments to various control parameters, which may include, but are not limited to, heat source power, additive feed rate(s) (e.g. oxygen, oxidants, steam, etc.), feedstock feed rate(s) (e.g. one or more distinct and/or mixed feeds), gas and/or system pressure/flow regulators (e.g. blowers, relief and/or control valves, flares, etc.), and the like, can be executed in a manner whereby one or more process-related characteristics are assessed and optimized according to design and/or downstream specifications.

Alternatively, or in addition thereto, the control system may be configured to monitor operation of the various components of a given system for assuring proper operation, and optionally, for ensuring that the process(es) implemented thereby are within regulatory standards, when such standards apply.

In accordance with one embodiment, the control system may further be used in monitoring and controlling the total energetic impact of a given system. For instance, a a given system may be operated such that an energetic impact thereof is reduced, or again minimized, for example, by optimising one or more of the processes implemented thereby, or again by increasing the recuperation of energy (e.g. waste heat) generated by these processes. Alternatively, or in addition thereto, the control system may be configured to adjust a composition and/or other characteristics (e.g. temperature, pressure, flow, etc.) of a product gas generated via the controlled process(es) such that such characteristics are not only suitable for downstream use, but also substantially optimised for efficient and/or optimal use. For example, in an embodiment where the product gas is used for driving a gas engine of a given type for the production of electricity, the characteristics of the product gas may be adjusted such that these characteristics are best matched to optimal input characteristics for such engines.

In one embodiment, the control system may be configured to adjust a given process such that limitations or performance guidelines with regards to reactant and/or product residence times in various components, or with respect to various processes of the overall process are met and/or optimised for. For example, an upstream process rate may be controlled so to substantially match one or more subsequent downstream processes.

In addition, the control system may, in various embodiments, be adapted for the sequential and/or simultaneous control of various aspects of a given process in a continuous and/or real time manner.

In general, the control system may comprise any type of control system architecture suitable for the application at hand. For example, the control system may comprise a substantially centralized control system, a distributed control system, or a combination thereof. A centralized control system will generally comprise a central controller configured to communicate with various local and/or remote sensing devices and response elements configured to respectively sense various characteristics relevant to the controlled process, and respond thereto via one or more controllable process devices adapted to directly or indirectly affect the controlled process. Using a centralized architecture, most computations are implemented centrally via a centralized processor or processors, such that most of the necessary hardware and/or software for implementing control of the process is located in a same location.

A distributed control system will generally comprise two or more distributed controllers which may each communicate with respective sensing and response elements for monitoring local and/or regional characteristics, and respond thereto via local and/or regional process devices configured to affect a local process or sub-process. Communication may also take place between distributed controllers via various network configurations, wherein a characteristics sensed via a first controller may be communicated to a second controller for response thereat, wherein such distal response may have an impact on the characteristic sensed at the first location. For example, a characteristic of a downstream product gas may be sensed by a downstream monitoring device, and adjusted by adjusting a control parameter associated with the converter that is controlled by an upstream controller. In a distributed architecture, control hardware and/or software is also distributed between controllers, wherein a same but modularly configured control scheme may be implemented on each controller, or various cooperative modular control schemes may be implemented on respective controllers.

Alternatively, the control system may be subdivided into separate yet communicatively linked local, regional and/or global control subsystems. Such an architecture could allow a given process, or series of interrelated processes to take place and be controlled locally with minimal interaction with other local control subsystems. A global master control system could then communicate with each respective local control subsystems to direct necessary adjustments to local processes for a global result.

The control system of the present invention may use any of the above architectures, or any other architecture commonly known in the art, which are considered to be within the general scope and nature of the present disclosure. For instance, processes controlled and implemented within the context of the present invention may be controlled in a dedicated local environment, with optional external communication to any central and/or remote control system used for related upstream or downstream processes, when applicable. Alternatively, the control system may comprise a sub-component of a regional an/or global control system designed to cooperatively control a regional and/or global process. For instance, a modular control system may be designed such that control modules interactively control various sub-components of a system, while providing for inter-modular communications as needed for regional and/or global control.

The control system generally comprises one or more central, networked and/or distributed processors, one or more inputs for receiving current sensed characteristics from the various sensing elements, and one or more outputs for communicating new or updated control parameters to the various response elements. The one or more computing platforms of the control system may also comprise one or more local and/or remote computer readable media (e.g. ROM, RAM, removable media, local and/or network access media, etc.) for storing therein various predetermined and/or readjusted control parameters, set or preferred system and process characteristic operating ranges, system monitoring and control software, operational data, and the like. Optionally, the computing platforms may also have access, either directly or via various data storage devices, to process simulation data and/or system parameter optimization and modeling means. Also, the computing platforms may be equipped with one or more optional graphical user interfaces and input peripherals for providing managerial access to the control system (system upgrades, maintenance, modification, adaptation to new system modules and/or equipment, etc.), as well as various optional output peripherals for communicating data and information with external sources (e.g. modem, network connection, printer, etc.).

The processing system and any one of the sub-processing systems can comprise exclusively hardware or any combination of hardware and software. Any of the sub-processing systems can comprise any combination of none or more proportional (P), integral (I) or differential (D) controllers, for example, a P-controller, an I-controller, a PI-controller, a PD controller, a PID controller etc. It will be apparent to a person skilled in the art that the ideal choice of combinations of P, I, and D controllers depends on the dynamics and delay time of the part of the reaction process of the gasification system and the range of operating conditions that the combination is intended to control, and the dynamics and delay time of the combination controller. It will be apparent to a person skilled in the art that these combinations can be implemented in an analog hardwired form which can continuously monitor, via sensing elements, the value of a characteristic and compare it with a specified value to influence a respective control element to make an adequate adjustment, via response elements, to reduce the difference between the observed and the specified value. It will further be apparent to a person skilled in the art that the combinations can be implemented in a mixed digital hardware software environment. Relevant effects of the additionally discretionary sampling, data acquisition, and digital processing are well known to a person skilled in the art. P, I, D combination control can be implemented in feed forward and feedback control schemes.

In corrective, or feedback, control the value of a control parameter or control variable, monitored via an appropriate sensing element, is compared to a specified value or range. A control signal is determined based on the deviation between the two values and provided to a control element in order to reduce the deviation. It will be appreciated that a conventional feedback or responsive control system may further be adapted to comprise an adaptive and/or predictive component, wherein response to a given condition may be tailored in accordance with modeled and/or previously monitored reactions to provide a reactive response to a sensed characteristic while limiting potential overshoots in compensatory action. For instance, acquired and/or historical data provided for a given system configuration may be used cooperatively to adjust a response to a system and/or process characteristic being sensed to be within a given range from an optimal value for which previous responses have been monitored and adjusted to provide a desired result. Such adaptive and/or predictive control schemes are well known in the art, and as such, are not considered to depart from the general scope and nature of the present disclosure.

Control Elements

Sensing elements contemplated within the present context can include, but are not limited to, means for monitoring operational parameters such as gas flow, temperature and pressure at various locations within the system, as well as means for analyzing the chemical composition of the syngas product.

The data obtained from the sensing elements is used to determine if any adjustments to the conditions and operating parameters within the gasification system are required to optimize the efficiency of the gasification process and the composition of the product syngas. Ongoing adjustments to the reactants (for example, rate and amounts of primary and secondary feedstock addition, input of heated air and/or steam), as well as to certain operating conditions, such as temperature and pressure within various components within the system, enable this process to be conducted under conditions that enable the efficient and consistent production of the syngas.

The control system can be designed and configured with the objective of optimizing the efficiency of the gasification process and to mitigate environmental impacts caused by the gasification process. The control system can also be designed to operate the gasification system under continuous operating conditions.

The following operational parameters may be intermittently or continuously monitored by the sensing elements, and the data obtained are used to determine whether the system is operating within the optimal set point, and whether, for example, there needs to be more power delivered by the torches, more air or steam injected into the system, or if the feedstock input rate needs to be adjusted.

Temperature

In one embodiment of the invention, the control system comprises means to monitor the temperature at sites located throughout the system as required for example, inside the volatilization, processed feedstock/char conversion, or gas reformulating chambers. The means for monitoring the temperature may be thermocouples or optical thermometers installed at locations in the system as required.

Means for monitoring the temperature of the hot syngas product may also be located at the syngas outlet of the plasma gas reformulating chamber. In one embodiment, where a subsystem for recovering the sensible heat in the hot syngas produced by the plasma gas reformulating process is employed (such as a heat exchanger or similar technology), means for monitoring the temperature at points in the heat recovery subsystem may be incorporated. For example, the temperature may be monitored at the coolant fluid inlet and outlet, as well as at the syngas inlet and outlet.

System Pressure

In one embodiment of the invention, the control system comprises means to monitor the pressure at locations throughout the gasification system. These pressure monitoring means may include pressure sensors such as pressure transducers, pressure transmitters or pressure taps located anywhere in the system, for example, on a vertical wall of the secondary chamber or at location within the heat exchanger subsystem.

In one embodiment, the pressure in the different components in the system is monitored. In this manner, a pressure drop or differential from one component to another can be monitored to rapidly pinpoint developing problems during processing.

Gas Flow Rate

In one embodiment of the invention, the control system comprises means to monitor the rate of gas flow at sites located throughout the system. Fluctuations in the gas flow may be the result of non-homogeneous conditions (e.g. torch malfunction or interruptions in the material feed), therefore if fluctuations in gas flow persist, the system may be shut down until the problem is solved.

Gas Composition

In one embodiment of the invention, the control system comprises means to monitor the composition of the syngas product. The gases produced during the gasification process can be sampled and analyzed using methods well known to the skilled technician.

In one embodiment, the syngas composition is monitored by means of a gas monitor, which is used to determine the chemical composition of the syngas, for example, the hydrogen, carbon monoxide and carbon dioxide content of the synthesis gas. In one embodiment, the chemical composition of the syngas product is monitored through gas chromatography (GC) analysis. Sample points for these analyses can be located throughout the system. In one embodiment, the gas composition is monitored using a Fourier Transform Infrared (FTIR) Analyser, which measures the infrared spectrum of the gas.

Although high temperature gas analysis means exist, one skilled in the art can appreciate that it may be required to cool the gas prior to analyzing its composition, depending upon the type of system used for gas analysis.

Response Elements

Response elements contemplated within the present context can include, but are not limited to, various control elements operatively coupled to process-related devices configured to affect a given process by adjustment of a given control parameter related thereto. For instance, process devices operable within the present context via one or more response elements, may include, but are not limited to, means for adjusting various operational parameters such as the rate of addition of the primary and secondary feedstock, air and/or steam inputs, as well as operating conditions, such as power to the torch and torch position.

Plasma Heat Source

The present gasification system uses the controllability of plasma heat to drive the gas reformulating process and, where a solid residue conditioning subsystem is employed, to ensure the complete melting and vitrification of ash to slag.

In one embodiment, the control system comprises means to adjust the power of the torch or other sources of plasma heat. In order to manage the energetics and/or temperature of the reaction, the plasma torch power may be adjusted to maintain a constant reformulating temperature despite any fluctuations in the composition of the gases being reformulated or fluctuations in the steam and air input rates.

In one embodiment, the control system manages and regulates the power rating of the plasma heat source relative to the measured parameters such as the rate at which the first chamber gas product and second chamber gas product are introduced into the gas reformulating chamber, as well as the temperature of the chamber as determined by temperature sensors at strategic locations throughout the system. The power rating of the plasma heat source, must be sufficient to compensate for loss of heat in the chamber and to reformulate the gases to syngas efficiently.

In those embodiments where a solid residue conditioning subsystem is employed, the control system optionally comprises means to adjust the power and/or the position of the plasma heat source. For example, when the temperature of the melt is too low, the control system may command an increase in the power rating of the plasma heat source; conversely, when the temperature of the chamber is too high, the control system may command a drop in the power rating of the plasma heat source.

In one embodiment, the power of the torch is maintained at a level that is proportional to the rate of the solid residue addition, i.e., an increase in the solid residue feed rate results in an increase in the torch power. The torch power can also be adjusted to react to changes in the characteristics and composition of the residue, for example, with respect to its melting properties such as temperature, specific heat capacity, or heat of fusion.

In one embodiment, the position of the plasma heat source is adjustable to ensure complete coverage of the melt pool, and the elimination of areas of incompletely reacted materials.

The Rate of Carbonaceous Feedstock Addition

In one embodiment of the invention, the control system comprises means to adjust the supply rate of carbonaceous feedstock to the primary chamber to ensure that the feedstock is input at a rate that does not exceed the drying and volatilization capacity of the primary chamber at a given heated air input rate. This ensures that the volatile fraction is fully removed before the processed feedstock/char is passed to the secondary chamber. The feedstock may be added in a continuous manner, for example, by using a rotating screw or auger mechanism, or it can be added in a discontinuous fashion, for example, periodically and in discrete portions.

In one embodiment, a secondary feedstock is provided as a process additive to adjust the carbon content of the feedstock being gasified. In such an embodiment, the control system provides a means for adjusting the secondary and primary feedstock input rates to ensure the optimum carbon content of feedstock to provide control over the final syngas composition.

The Rate of Solids Movement

The control system also comprises means to control the movement of solids through the different stages of the gasification process. In one embodiment, the control system comprises means to adjust the rate of processed feedstock/char transfer out of the primary chamber and into the secondary chamber. In such an embodiment, the rate of transfer of the processed feedstock/char product is controlled to ensure complete volatilization of the volatile fraction of the feedstock, while also preventing accumulation of processed feedstock/char in the primary chamber after the volatilization is complete.

In one embodiment, the control system comprises means to adjust the rate of ash transfer out of the secondary chamber, thereby providing controlling the residence time of the processed feedstock/char in the secondary chamber.

The transfer rates are adjusted as required to ensure acceptable control over the volatilization or processed feedstock/char conversion steps, thereby preventing the conveyance of incompletely volatilized or unconverted materials out of their respective chambers.

The solids may be passed from the respective chambers in a continuous or discontinuous manner, using any of the solids removal means previously discussed. In one embodiment where the feedstock/processed feedstock/char input means comprises a series of pusher rams, the control system may employ limit switches or other means of travel control such as computer controlled variable speed motor drives to control the length, speed and/or frequency of the ram stroke so that the amount of material fed into the respective chamber with each stroke can be controlled. In one embodiment where the input means comprises one or more screw conveyors, the rate of addition of the material to the respective chamber may be controlled by adjusting the conveyor speed via drive motor variable frequency drives.

In one embodiment, where a horizontal primary chamber is employed, the control system optionally comprises means to control the movement of one or more lateral transfer units in the primary chamber, thereby controlling the movement of material through the chamber to optimize the drying and volatilization stages by controlling the residence time of the material at each stage.

Addition of Heated Air Inputs

In one embodiment of the invention, the control system comprises means to adjust the rate and/or amounts of heated air inputs into the volatilization and secondary chambers.

Addition of Process Additive Inputs

In one embodiment of the invention, the control system comprises means to adjust the steam and/or air process additive inputs into the plasma gas reformulating chamber, in order to ensure that the volatiles and gaseous products of the processed feedstock/char conversion are completely converted to a useful gas product by the plasma gas reformulating step. In one embodiment of the invention, the control system comprises means to adjust the steam and/or air process additive inputs into the secondary chamber, to ensure that the levels of oxygen and hydrogen required for the carbon conversion reaction are present are required to optimize the chemical composition of the syngas product. In one embodiment, the determination of the amounts and types of process additives required is based on data obtained from monitoring and analyzing the composition of the syngas.

Modularity of the System

Modular plants are facilities where each function block is made of pre-built components, which allows for the components to be built in a factory setting and then sent out to the facility site for plant assembly. These components (or modules) include all the equipment and controls to be functional and are tested before leaving the factory. Modules are often built with a steel frame and generally incorporate a variety of possible sections, such as: Gasifier Block, Gas Conditioning System Block, Power Block, etc. Once on-site, these modules only need to be connected to other modules and the control system to be ready for plant commissioning. This design allows for shorter construction time and economic savings due to reduced on-site construction costs.

There are different types of modular plants set-ups. Larger modular plants incorporate a "backbone" piping design where most of the piping is bundled together to allow for smaller footprint. Modules can also be placed in series or parallel in an operation standpoint. Here similar tasked equipment can share the load or successively provide processing to the product stream.

One application of modular design in this technology is that it allows more options in the gasification of multiple feedstocks. This technology can allow for multiple gasification lines to be used in a single high-capacity facility. This would allow the option of having each gasification system co-process feedstocks together or separately; the configuration can be optimized depending on the feedstocks.

If an expansion is required due to increasing loads, a modular design allows this technology to replace or add modules to the plant to increase its capacity, rather than building a second plant. Modules and modular plants can be relocated to other sites where they can be quickly integrated into a new location.

Function Block Combinations

It is possible to combine the functions of different gasification trains (series of equipment) so that common functions can be carried out in function blocks that take in gases or material from more than one stream. The following diagrams demonstrate this concept as applied to carbonaceous feedstock gasification.

In the following embodiments, there are two trains shown, although this set-up of combined functions between trains can occur for any number of trains and for any feedstock per train (even if one train has a combined feedstock). Once a stream has been combined, one may still choose parallel handling equipment downstream; the parallel streams do not need to be of the same size even if handling the same gases.

For FIGS. 18 to 21, GQCS refers to the gas conditioning system mentioned above and the numbers represent the following systems: 1) primary chamber, 2) secondary chamber, 3) melting chamber, and 4) gas reformulating chamber.

FIGS. 18 to 21 depict different embodiments of the present gasification system that fall within the scope of the present invention. In particular, FIGS. 18 to 21 describe embodiments of the gasification system in which the separate primary feedstock and secondary feedstock inputs are carried through to the final syngas product.

Figure 18:
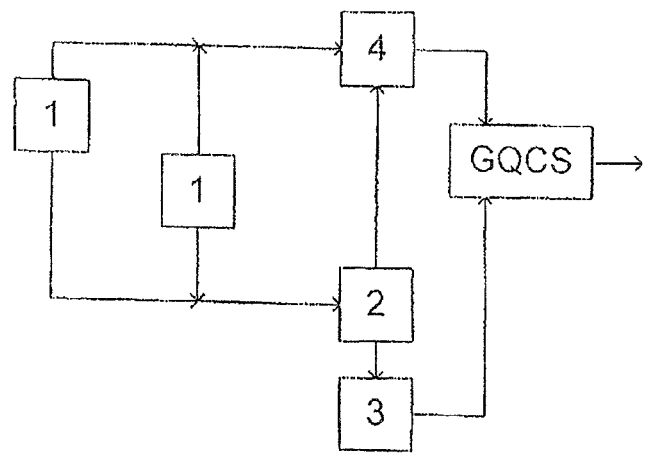
FIGS. 18 to 21 depict different combinations of the different function block processes of a facility for gasifying two feedstocks, wherein "1" depicts function block 1 (a volatilization chamber), "2" depicts function block 2 (a char conversion chamber), "3" depicts function block 3 (a solid residue conditioning chamber, and "4" depicts a function block 4 (a gas reformulating system).

The embodiment shown in FIG. 18 depicts one embodiment in which the primary feedstock and secondary feedstock are each volatilized in separate primary chambers, and the resulting processed feedstock/char from each primary chamber is combined in a common secondary chamber. The first chamber gas products from each of the primary chambers and the second chamber gas product from the secondary chamber are combined in a common gas reformulating chamber.

Figure 20:
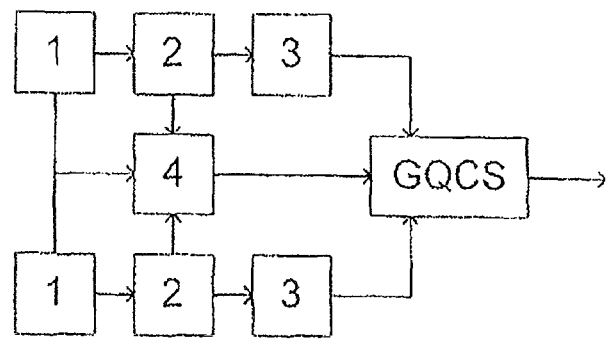

The embodiment shown in FIG. 20 depicts one embodiment in which the primary feedstock and secondary feedstock are each volatilized in separate primary chambers, and the resulting processed feedstock/char from each primary chamber is passed into a separate solid residue conditioning chamber. The first chamber gas product from each of the primary chambers and the second chamber gas product from the processed feedstock/char chambers are combined in a common gas reformulating chamber.

Figure 19:
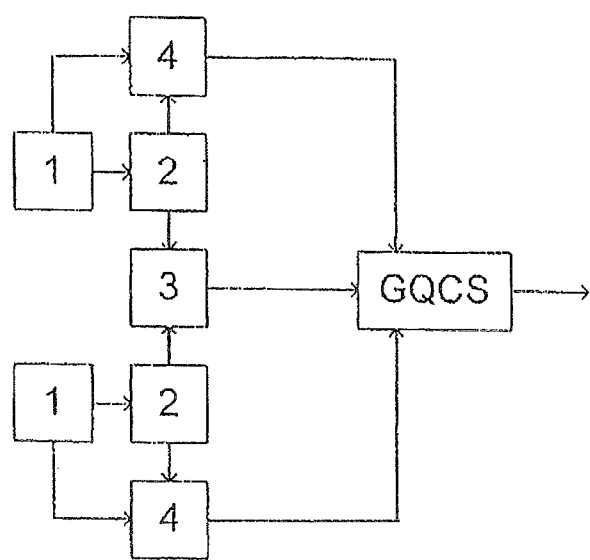

The embodiment shown in FIG. 19 depicts one embodiment in which the primary feedstock and secondary feedstock are each volatilized in separate primary chambers, and the resulting processed feedstock/char from each primary chamber is passed into respective secondary chamber. The first chamber gas product and second chamber gas product from each of the primary and secondary feedstock gasification streams are reformulated in separate gas reformulating chambers.

Figure 21:
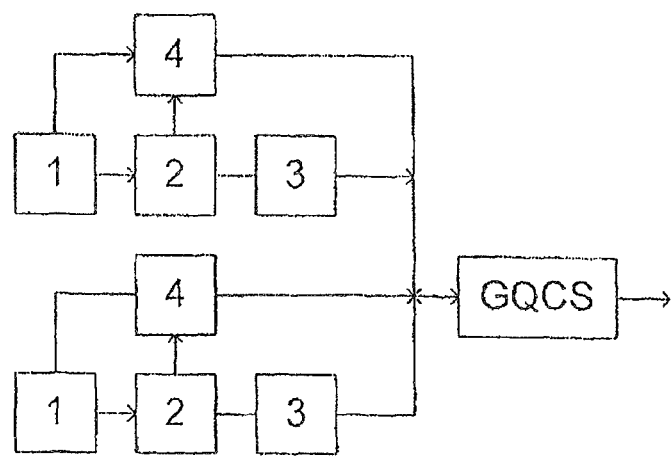

The embodiment shown in FIG. 21 depicts one embodiment in which the primary feedstock gasification stream and the secondary feedstock gasification stream are carried separately through the volatilization, processed feedstock/char gasification, solid residue conditioning, and gas reformulating steps, wherein the syngas products are combined only prior to the gas quality conditioning step.

The foregoing embodiments of the invention are exemplary and can be varied in many ways. Such present or future variations are not to be regarded as a departure from the spirit and scope of the invention, and all such modifications as would be obvious to one skilled in the art are intended to be included within the scope of the following claims.

The disclosure of all patents, publications, including published patent applications, and database entries referenced in this specification are specifically incorporated by reference in their entirety to the same extent as if each such individual patent, publication, and database entry were specifically and individually indicated to be incorporated by reference.

EXAMPLE 1

It will be understood that this example is intended to describe an illustrative embodiment of a gasification facility amenable to manufacture using the method and system described above. The example is not intended to limit the scope of the invention in any way.

In this example, with reference to FIGS. 22 to 61, details of one embodiment of a gasification facility, including various options, are provided. This example presents details for each subsystem of the facility and demonstrates how they work together to function as an integrated system for the conversion of municipal solid waste (MSW) into electricity. One skilled in the art can appreciate, however, that each subsystem on its own can be considered a system. The subsystems comprising this embodiment are: a Municipal Solid Waste Handling System; a Plastics Handling System; a Gasifier System; a Two-Zone Carbon Converter; a Gas Reformulating System; a Heat Recycling System; a Gas Conditioning System; a Gas Homogenization System and a Control System.

Figure 22:
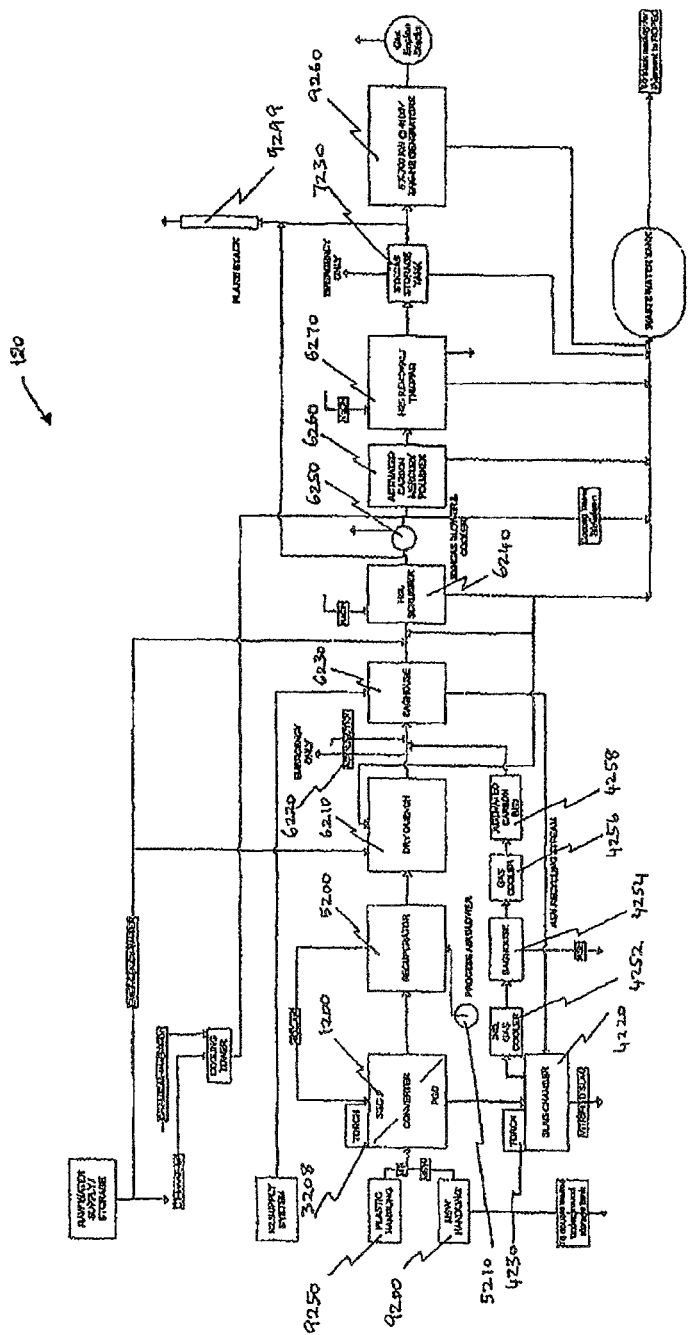
FIG. 22 depicts an overview process flow diagram of a low-temperature gasification facility incorporating an exemplary gas conditioning system according to one embodiment of the invention, integrated with downstream gas engines.

FIG. 22 shows a functional block diagram overview of the entire system 120 designed primarily for the conversion of MSW to syngas, with the associated use of reformulated, conditioned, and homogenized syngas in gas engines 9260 for the generation of electricity.

Municipal Solid Waste (MSW) Handling System

The initial MSW handling system 9200 is designed to take into account: (a) storage capability for supply of four days; (b) avoidance of long holding periods and excess decomposition of MSW; (c) prevention of debris being blown around; (d) control of odour; (e) access and turning space for garbage trucks to unload; (f) minimization of driving distance and amount of turning required by the loader 9218 transporting MSW from the MSW stockpile 9202 to the MSW shredding system 9220; (g) avoidance of operational interference between loader 9218 and garbage trucks; (h) possibility of additional gasification streams to allow for plant expansion; (i) minimum intrusion by trucks into the facility, especially into hazardous areas; (j) safe operation with minimum personnel; (k) indication for the loader operator of the fill levels in the conveyor input hoppers 9221; (l) shredding the as-received waste to a particle size suitable for processing; and (m) remote controllability of MSW flow rate into the processor and independent control of the plastics feed rate rate (described below).

The MSW handling system 9200 comprises a MSW storage building 9210, a loader 9218, a MSW shredding system 9220, a magnetic separator 9230 and a feed conveyor 9240. A separate system 9250 is also designed for storing, shredding, stockpiling and feeding a high carbon material (non-recyclable plastics in this example), the feed-rate of which is used as an additive in the gasification process. All storage and handling of MSW until it is fed into the gasification system 120 is confined in MSW storage building 9210 to contain debris and odor.

A first-in-first-out (FIFO) scheduling approach is used to minimize excessive decomposition of the MSW. FIFO is enabled by having access for trucks and loaders 9218 at both ends of the MSW storage building 9210. MSW is unloaded from the trucks at one end of the building while the material is being transferred by the loader 9218 at the other end of the MSW storage building 9210, thus also allowing the loader 9218 to operate safely and without interference by the trucks. When the loader 9218 has removed the material back to the approximate mid point 9203 of the MSW stockpile 9202 i.e. the 'old' material has all been used, the operations are then changed to the opposite ends of the MSW storage building 9210.

To minimize the size of MSW storage building 9210, space for maneuvering the garbage trucks is outside the MSW storage building 9210. This also minimizes the size of door 9212 required as it needs only to allow a truck to reverse straight in, thus providing the best control of the escape of debris and odor. Only one door 9212 needs to be open at any time and then only when trucks are actually unloading. Receipt of MSW will normally take place during one period per day so that a door 9212 will only be open for about one hour per day.

Figure 23:
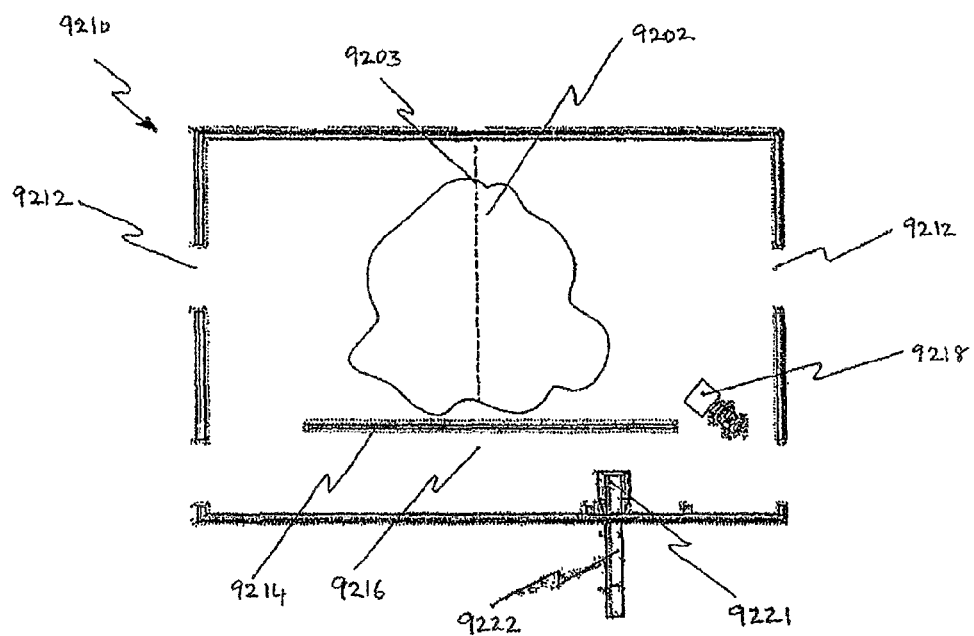
FIG. 23 shows the layout of the storage building for the municipal solid waste.
Figure 24:
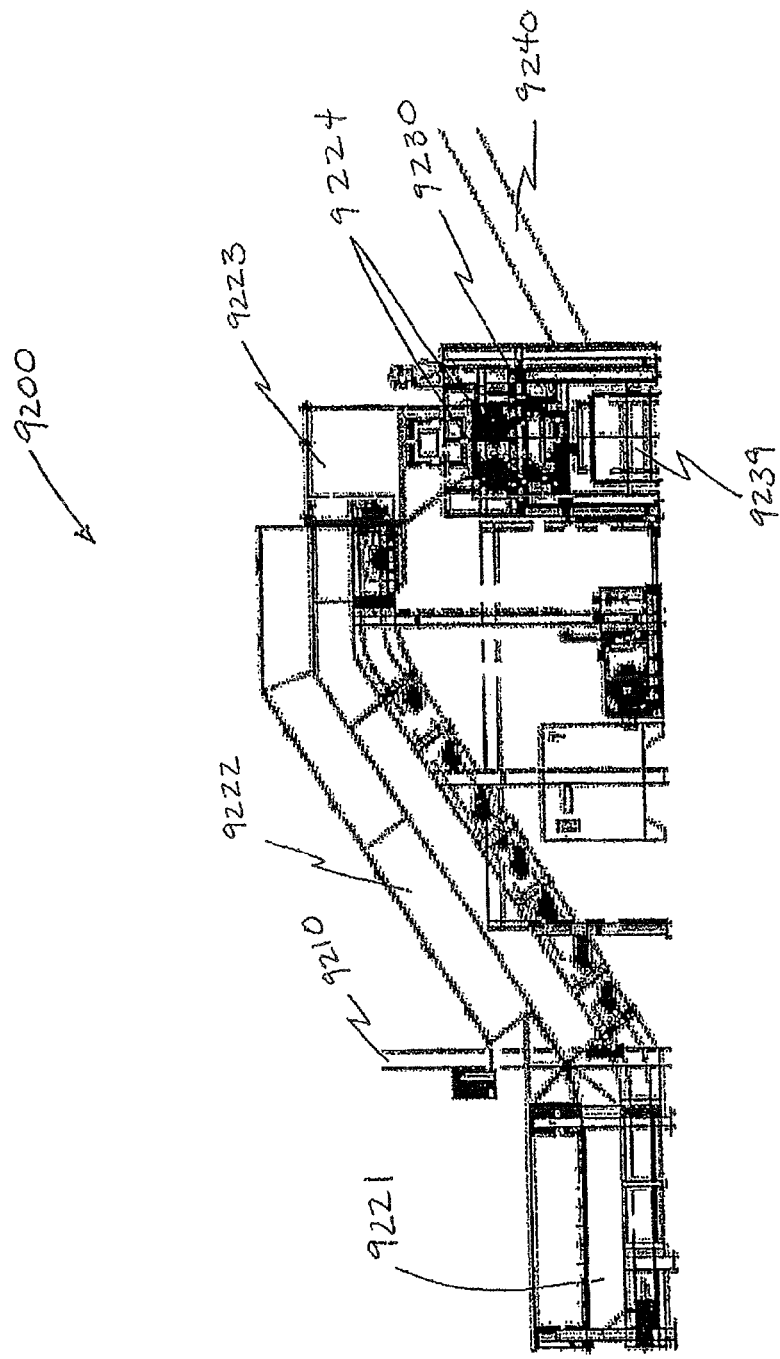
FIGS. 24 shows the view of the waste handling system.
Figure 25:
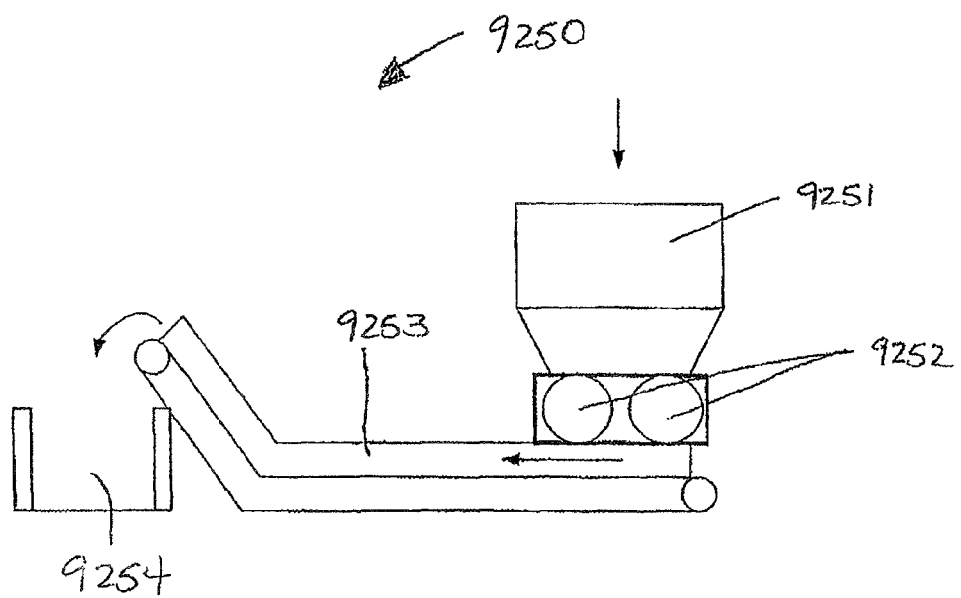
FIG. 25 shows a schematic of the plastics handling system.
Figure 26:
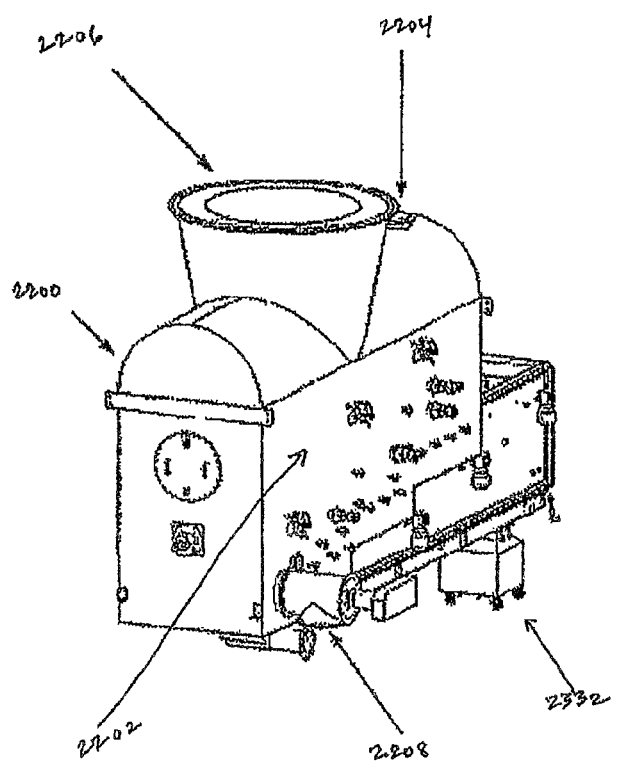
FIG. 26 is a perspective view of one embodiment of the gasifier, detailing the feedstock input, gas outlet, residue outlet, carrier-ram enclosure and access ports.

FIG. 23 shows a layout of the MSW storage building 9210. The MSW storage building 9210 has a bunker wall 9214 to separate the MSW stockpile 9202 from the aisle 9216 where the loader 9218 must drive to access the input conveyor 9222 leading to the MSW shredding system 9220. The bunker wall 9214 stops short of the ends of the MSW storage building 9210 to allow the loader 9218 to travel from the MSW stockpile 9202 to the input conveyor 9222 without leaving the MSW storage building 9210. Thus, the doors 9212 at one end of the MSW storage building 9210 can be kept closed at all times while the other end is open only when trucks are unloading or when a loader (described below) for transferring material from the stockpile to the shredding system needs to exit to move plastic.

By having the MSW storage building 9210 located adjacent and parallel to the road 9204 and allowing for truck maneuvering at both ends of the MSW storage building 9210, both space requirements and truck movements within the facility is reduced. The space layout design allows a truck to drive into the facility, reverse into the MSW storage building 9210, dump its load and drive directly back onto the road 9204. At no times do they get near any of the process equipment or personnel. The two road entrance concept also avoids the need for an additional roadway within the facility to enable the trucks to access both ends of the MSW storage building 9210.

A mechanized, bucket-based loader 9218 is used to transfer material from the stockpile to the shredding system. A skid steer loader design is used due to its compact size, maneuverability, ease of operation etc. A standard commercially available skid steer has adequate capacity to feed the MSW, clean up the stockpile floor after the trucks have unloaded and also handle the waste plastics system shredder and process feed.

The input conveyor 9222 transports the MSW from inside the MSW storage building 9210 upwards and drops it into the MSW shredding system 9220. The feed hopper 9221 for this conveyor 9222 is located entirely inside the MSW storage building 9210 to prevent debris being blown around outdoors. The conveyor 9222 has a deep trough which, combined with the capacity of the feed hopper 9221 holds sufficient material for one hour of operation. The portion of the trough outside the MSW storage building 9210 is covered to control escape of debris and odor. The conveyor 9222 is controlled remotely by the process controller to match process demands. Mirrors are provided to allow the loader operator to see the level of MSW in the hopper 9221 from either side. Detectors provided in the trough alert the process controller that material is absent.

The MSW shredding system 9220 consists of an input hopper 9223, a shredder 9224 and a pick conveyor and is followed by a magnetic pick-up conveyor. The shredder 9224 ensures that the as-received MSW is suitable for processing, by breaking any bags and cutting the larger pieces of waste into a size able to be processed. As the received MSW may include materials too large and hard for the shredder 9224 to handle, thus causing the shredder to jam, the shredder 9224 is equipped to automatically stop when a jam is sensed, automatically reverse to clear the jam and then restart. If a jam is still detected the shredder 9224 will shut-down and send a warning signal to the controller.

The shredded waste is dropped onto a belt conveyor to be transported under a magnetic pick-up system and then to be dropped into the feed hopper 9239 of a screw conveyor 9240 which will feed the waste into the primary chamber 2200. To avoid inadvertent feeding of excessive amounts of ferrous metals through the primary chamber 2200, a magnetic pick-up system 9230 is located above the pick conveyor, which attracts ferrous metals that may be present in the shredded waste. A non-magnetic belt runs across the direction of the pick conveyor, between the magnet and the waste so that ferrous metals attracted to the magnet get moved laterally away from the waste stream. The ferrous metal is later removed from the magnet and dropped onto a pile for disposal.

The MSW feed system consists of a feed hopper 9239 and screw conveyor 9240 to transport shredded waste from the MSW shredder system 9220 to the chamber 2202. Shredded waste is dropped from the MSW shredder system 9220 into the feed hopper 9239, which provides a buffer of material ready to feed into the processor. The hopper has high and low level indicators which are used to control flow from the shredding system into the hopper. The conveyor 9240 is under the control of the process controller to match waste feed rate to meet process demands. The use of a screw conveyor 9240 with integral feed hopper 9239 also provides gas sealing for the processor. The feed hopper 9239 is connected to the MSW shredder system with covers to control debris and odor. The screw conveyor 9240 has an additional entry to accept shredded plastic.

Plastics Handling System

The gasification system 120 provides for the addition of plastics as a process additive. The plastics are handled separately from the MSW, before being fed to the primary chamber 2200. The plastics handling system 9250 is designed to provide storage for as-received bales of plastic, shred it, place it into a stockpile 9254 and feed it under independent control into the processor. The plastics handling system 9250 comprises a plastics storage building 9255 storage facility, a shredder 9252 with input hopper 9251, a take-away conveyor 9253 and a stockpile 9254, all located in a common building 9255 to control debris. A feed conveyor 9240 moves the shredded plastic into the processor.

The plastics storage building 9255 has the capacity to store two truck loads of plastic bales. It is closed on three sides and opens on one side, thus providing containment of the material with access for stacking and removing bales. The building also provides protection for the shredder 9252 and debris control and protection for the shredded material.

The shredder facilitates the plastic material meeting the process requirements. As-received plastic is loaded into the feed hopper 9251 of the shredder 9252 with a loader. The shredded material drops onto a take-away conveyor 9253 that transports it up and drops it into a stockpile 9254.

The shredded plastic is picked up by a loader and dropped into the input hopper of the feed conveyor. As the conveyor is outdoors, the hopper incorporates an integral roof and upwardly extended walls to minimize escape of plastic during filling of the hopper. The conveyor trough is sealed to the trough of the MSW conveyor such that the plastic is introduced into the primary chamber 2200 via the MSW conveyor to reduce openings into the primary chamber 2200. The conveyor is a screw conveyor with the hopper sealed to it to provide gas sealing when it contains material. Detectors are located in the hopper to indicate high and low levels and a mirror is provided for the skid steer operator to monitor fill level. Motion of this conveyor is under the control of the process controller.

Converter

The converter 1200 comprises a primary chamber 2200, a secondary chamber, and a Gas Reformulating System (GRS) 3200. The secondary chamber is directly connected to a slag chamber (RCC). The MSW and plastics are fed into the primary chamber 2200 and the resulting gas is sent to the GRS 3200 where it is reformulated. Any resulting residue from the secondary chamber is sent to the slag chamber 4200.

The primary chamber 2200 is designed to take into account the requirements to: (a) provide a sealed, insulated space for primary processing of the waste; (b) introduce hot air and steam in a controlled and distributed manner throughout the primary chamber 2200; (c) enable control of the height and movement of the waste pile through the primary chamber 2200; (d) provide instrumentation for controlling the gasification process; (e) transfer the gas to the GRS 3200; (f) remove residue for further processing by the secondary chamber; and (g) provide access to the interior for inspection and maintenance.

Referring to FIGS. 26 to 29, the primary chamber 2200 comprises a horizontally oriented refractory-lined chamber 2202 having a feedstock input 2204, inputs for hot air used for heating the chamber, input for steam which serves as a process additive, a gas outlet 2206 to which the GRS is directly coupled, a char outlet 2208 and various service 2220 and access 2222 ports. The primary chamber 2202 is built as a steel weldment having a stepped floor with a plurality of floor steps 2212, 2214, 2216. A system comprising carrier rams 2228, 2230, 2232 is used to facilitate the lateral movement of the material through the primary chamber 2200. Provision is also made for installation of instrumentation, such as thermocouples, material height detectors, pressure sensors and viewports.

Figure 30:
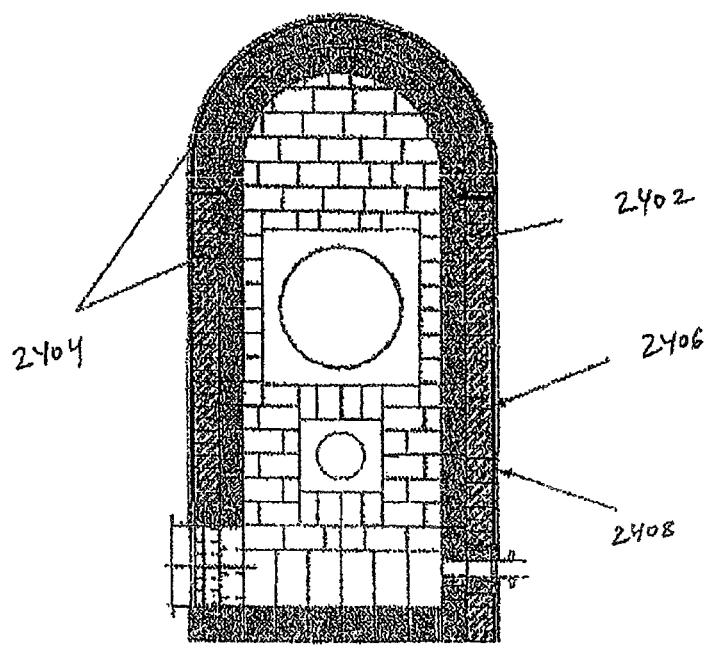
FIG. 30 is a sectional view of the gasifier of FIGS. 26 and 28 detailing the refractory.

The refractory lining of the chamber 2202 protects it from high temperatures, corrosive gases and also minimizes the unnecessary loss of heat from the process. Referring to FIG. 30, the refractory is a multilayer design with a high density chromia layer 2402 on the inside, a middle high density alumina layer 2404 and an outer very low density insulboard material 2406. The refractory lines the metal shell 2408 of the chamber. The chamber 2402 is further lined with a membrane to further protect it from the corrosive gases.

Each step 2212, 2214, 2216 of the stepped floor of chamber 2402 has a perforated floor 2270 through which heated air is introduced. The air hole size is selected such that it creates a restriction and thus a pressure drop across each hole sufficient to prevent waste materials from entering the holes. The holes are tapered outwards towards the upper face to preclude particles becoming stuck in a hole.

The conditions at the three individual steps are designed for different degrees of drying, volatilization and carbon conversion. The feedstock is introduced into the primary chamber 2202, onto the first stage via the feedstock input 2204. The targeted temperature range for this stage (as measured at the bottom of the material pile) lies between 300 and 900° C. Stage II is designed to have a bottom temperature range between 400 and 950° C. Stage III is designed to have a temperature range between 600 and 1000° C.

Figure 27:
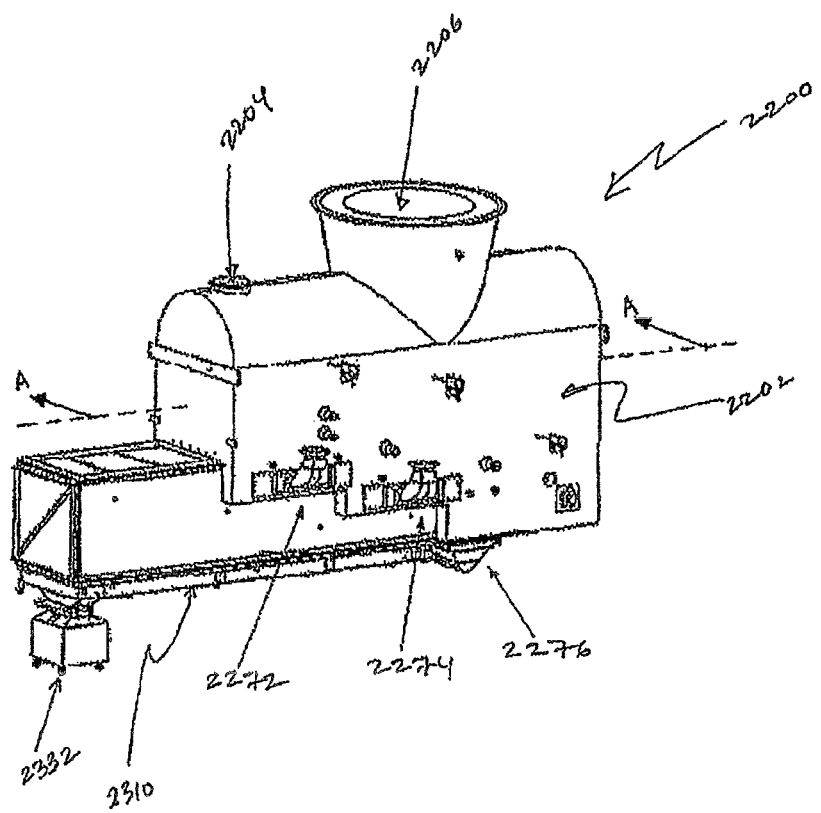
FIG. 27 is a side view of the gasifier illustrated in FIG. 26 detailing the air boxes, residue can and dust collector.
Figure 28:
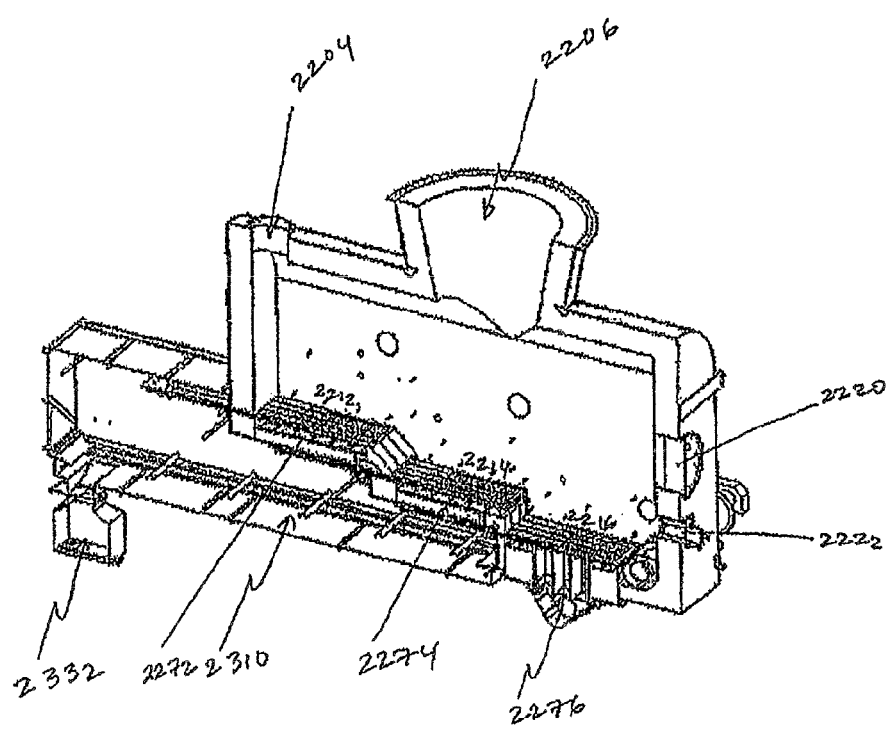
FIG. 28 is a central longitudinal cross-sectional view through the gasifier illustrated in FIGS. 26 and 27, detailing the feedstock input, gas outlet, residue outlet, lateral transfer means, thermocouples and access ports.
Figure 29:
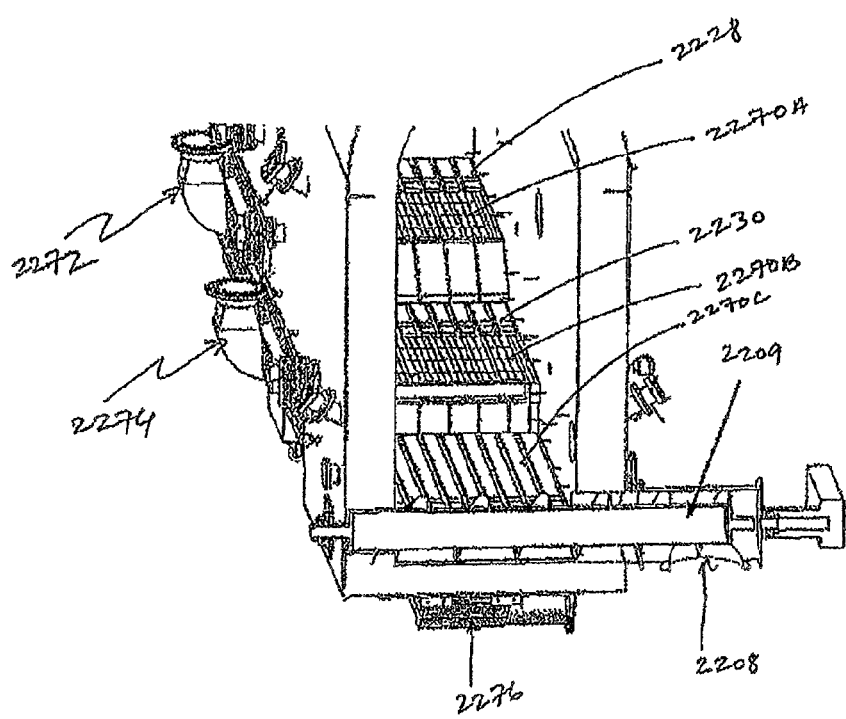
FIG. 29 illustrates a blown up cross sectional view detailing the air boxes, carrier-ram fingers, residue extractor screw and serrated edge of step C.

The three steps 2212, 2214 & 2216 of the stepped-floor, that separate the primary chamber 2202 into three stages of processing have their own independently controllable air feed mechanism. The independence is achieved by using separate airboxes 2272, 2274, and 2276 which form the perforated floor 2270 at each stage. The system of carrier rams 2228, 2230 & 2232 used for movement of material in the primary chamber 2202 prevents access from below steps 1 & 2, 2212 & 2214. Thus for these stages, the airboxes 2272 & 2274 are inserted from the side. The third stage airbox 2276 is however inserted from below, as shown in FIGS. 27 & 28.

Figure 31:
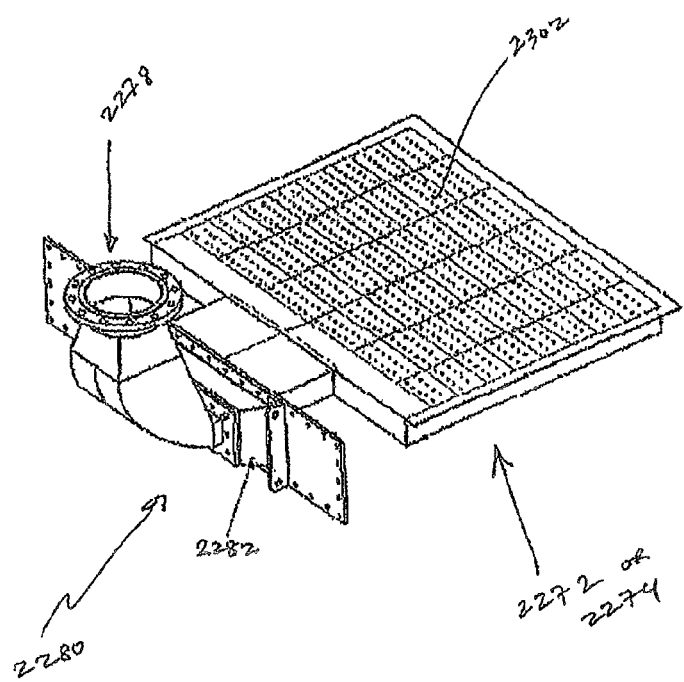
FIG. 31 details the air box assembly of Step A and B of the gasifier illustrated in FIGS. 26 to 30.
Figure 32:
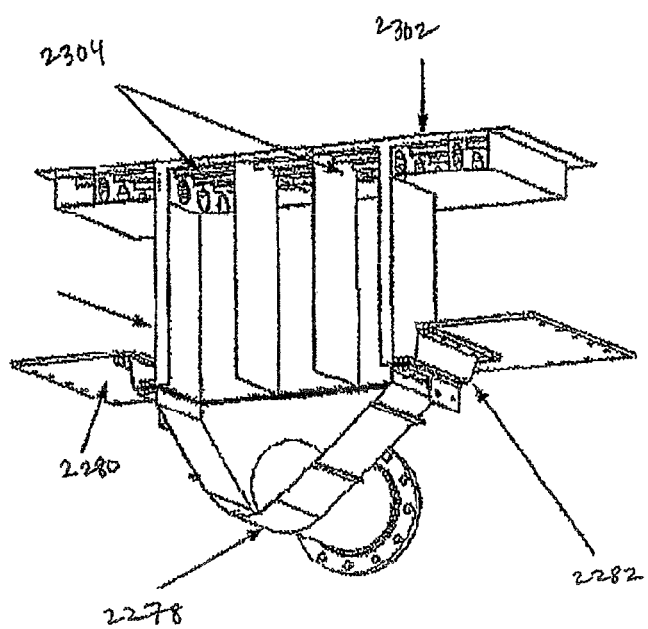
FIG. 32 illustrates a cross sectional view of the Step C air box of the gasifier illustrated in FIGS. 26 to 30.

The perforated top plate 2302 of the airboxes 2272, 2274, 2276, in this design and referring to FIGS. 31 & 32, is a relatively thin sheet, with stiffening ribs or structural support members 2304 to prevent bending or buckling. To minimize stress on the flat front and bottom sheets of the boxes, perforated webs are attached between both sheets. To allow for thermal expansion in the boxes they are attached only at one edge and are free to expand at the other three edges.

Figure 33:
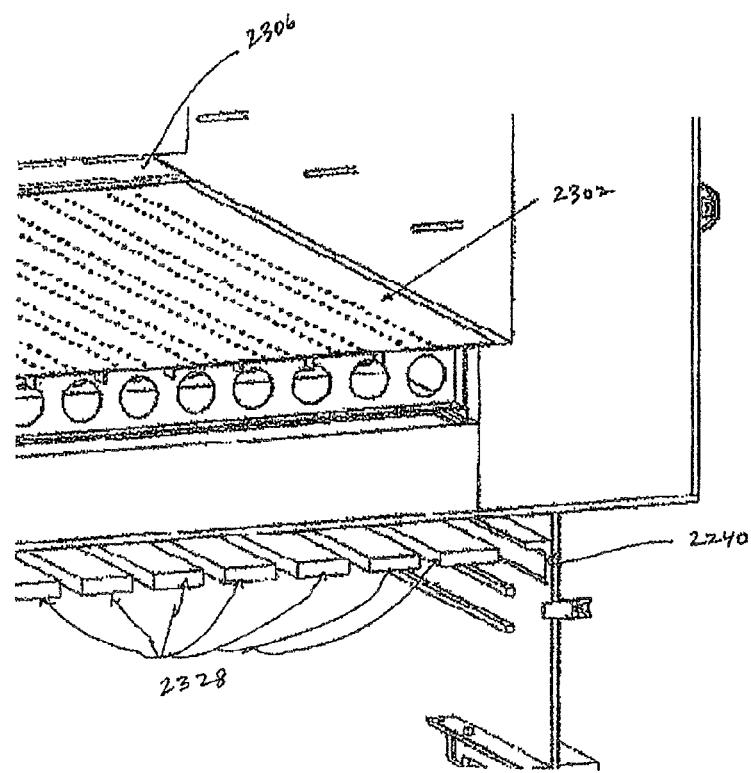
FIG. 33 illustrates a cross sectional view of the gasifier of FIGS. 26 to 30 detailing an air box.

As shown in FIG. 31, the fixed edge of the Step 1 & 2 airboxes 2272 and 2274 is also the connection point of the input air piping 2278. Thus, the connection flange 2280 will be at high temperature and must be sealed to the cool wall of the primary chamber 2200. A shroud is used, as shown in FIG. 31, to achieve this without creating stress and without using a complex expansion joint. The hot air box 2272 and pipe 2278 are attached to one end of the shroud 2282 and the other end of the shroud 2282 is connected to the cool primary chamber 2200. As a temperature gradient will occur across the length of the shroud 2282, there is little or no stress at either connection. The other advantage of this arrangement is that it positions the airbox rigidly in the required position without causing stress. The space between the shroud 2282 and the internal duct of the air box 2272 is filled with insulation to retain heat and to ensure the temperature gradient occurs across the shroud. When the airbox is in its operating location in the primary chamber 2202, the top plate opposite to the air connection is extended beyond the airbox to rest on a shelf of refractory. This provides support to the airbox during operation and also acts as a seal to prevent material from falling below the airbox. It also allows free movement to allow for expansion of the airbox, as shown in FIG. 33.

The downstream edge of the airbox is also dealt with in the same way. The upstream edge of the airbox is sealed with a resilient sheet sealing 2306 between the carrier ram and the top plate of the airbox 2302.

The airbox is connected to the hot air supply piping using a horizontal flange. Therefore, only the flange has to be disconnected to remove an airbox.

The third stage airbox 2276 is inserted from below and also uses the shroud concept for sealing and locating the box to the primary chamber 2200.

Sealing against dust falling around the edges of the third stage airbox 2276 is achieved by having it set underneath a refractory ledge at the edge of the second stage 2214. The sides can be sealed by flexible seals protruding from below recesses in the sides of the refractory. These seals sit on the top face of the box, sealing between the walls and the box. The downstream edge of the air box is dust sealed to the side of an extractor trough using a flexible seal. The box is reinforced with stiffeners and perforated webs between the flat faces of the air boxes to permit the use of thin sheet metal for the boxes.

The hot air pipe connection is vertical to permit removal of the third stage airbox 2276 after disconnecting the pipe connection.

Figure 37:
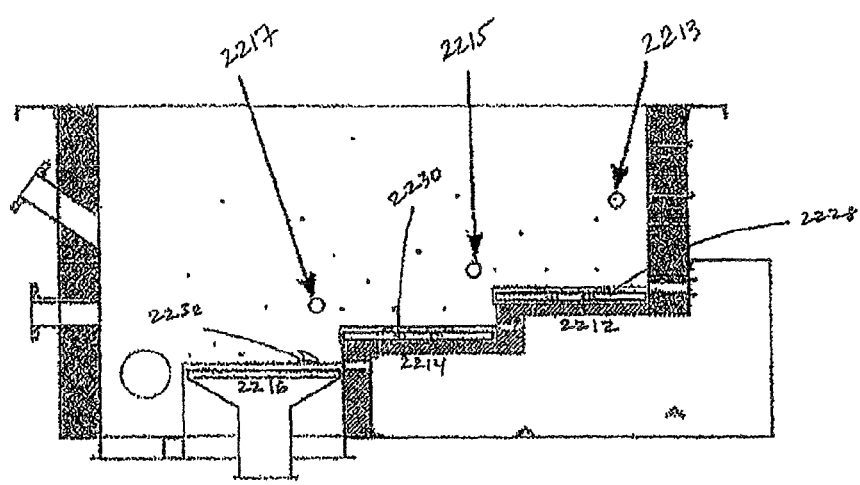
FIG. 37 is an illustration detailing the level switch locations in one embodiment of the invention.
Figure 38:
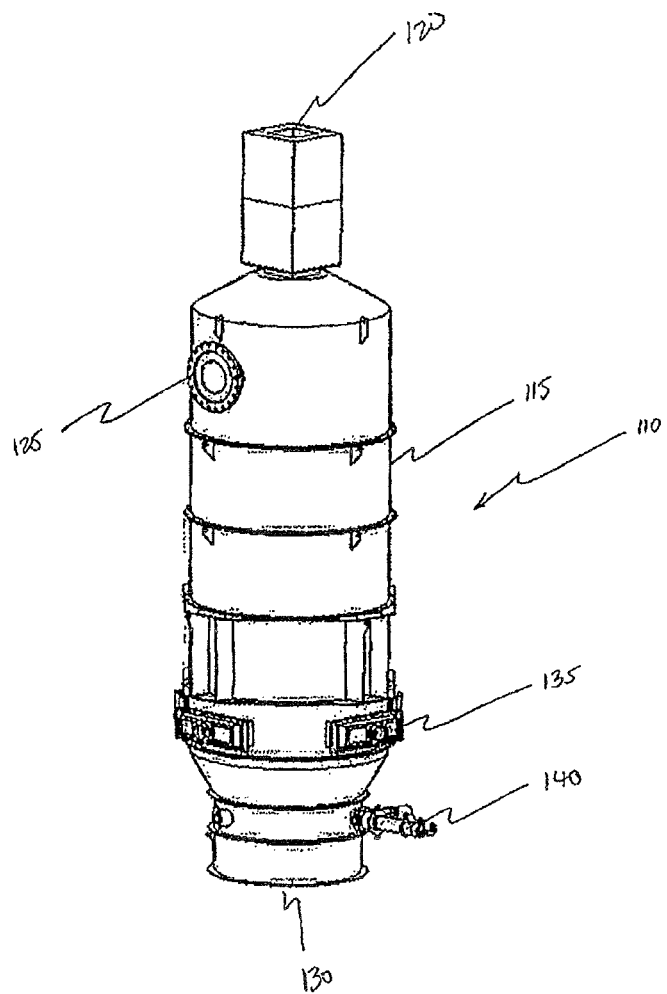
FIG. 38 is a perspective view of one embodiment of the multi-zone carbon converter detailing processed feedstock inputs and various ports.
Figure 39:
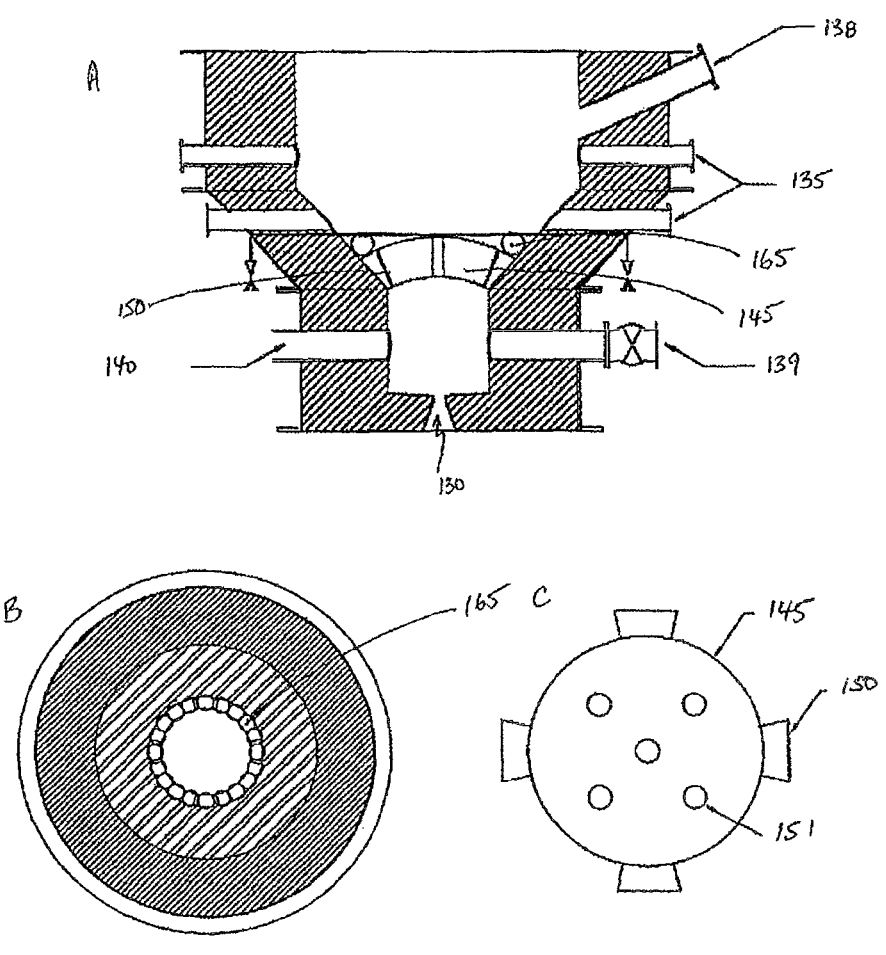
FIG. 39(A) is a partial longitudinal-section view of one embodiment of the multi-zone carbon converter detailing various ports for process air, a start-up burner port, a port for gas from a hot gas generator, slag outlet and impediment. 39(B) is a cross-sectional view of the embodiment illustrated in 39(A) at level A-A. 39(C) is a top view of the impediment and supporting wedges.

Referring to FIG. 37, a series of a system of carrier rams 2228, 2230, 2232 is used to ensure that the MSW is moved laterally along the primary chamber 2200 for appropriate processing in each of the three steps 2212, 2214 & 2216, and that the spent residue is moved to the residue outlet 2208. Each of the three stage floors is serviced by its own carrier ram. The carrier rams control both the height of the pile at each stage as well as the total residence time in the primary chamber. Each carrier ram is capable of movement over the full or partial length of that step, at variable speeds. Thus, the stage can also be completely cleared if required.

Each carrier ram comprises an externally mounted guide portion, a carrier ram having optional guide portion engagement members, externally mounted drive system and an externally mounted control system. The carrier ram design comprises multiple fingers that allow the air-box air-hole pattern to be arranged such that operation of the carrier rams does not interfere with the air passing through the air-holes.

In the multiple finger carrier ram design, the carrier ram is a structure in which fingers are attached to the body of the carrier ram, with individual fingers being of different widths depending on location. The gap between the fingers in the multiple finger carrier ram design is selected to avoid particles of reactant material from bridging. The individual fingers are about 2 to about 3 inches wide, about 0.5 to about 1 inch thick with a gap between about 0.5 to about 2 inches wide.

The air box airhole pattern is arranged such that operation of the carrier rams does not interfere with the air passing through the airholes. For example, the pattern of the airholes can be such that when heated they are between the fingers (in the gaps) and are in arrow pattern with an offset to each other. Alternatively, the airhole pattern can also be hybrid where some holes are not covered and others are covered, such that even distribution of air is maximized (ie. areas of floor with no air input at all are minimized). In choosing the pattern of the airholes, factors to consider include avoiding high velocity which would fluidize the bed, avoiding holes too close to the chamber walls and ends so that channeling of air along refractory wall is avoided, and ensuring spacing between holes was no more than approximately the nominal feed particle size (2") to ensure acceptable kinetics.

A multi-finger carrier ram can have independent flexibility built-in so that the tip of each finger can more closely comply with any undulations in the air-box top face. This compliance has been provided by attaching the fingers to the carrier ram main carriage using shoulder bolts, which do not tighten on the finger. This concept also permits easy replacement of a finger.

The end of the carrier ram finger is bent down to ensure that the tip contacts the top of the air in the event that the relative locations of the carrier ram and airbox changes (for example, due to expansions). This features also lessens any detrimental effect on the process due to air holes being covered by the carrier ram, the air will continue to flow through the gap between the carrier ram and the airbox.

Referring to FIG. 33, the guide portion comprises a pair of generally horizontal, generally parallel elongated tracks 2240 mounted on a frame. Each of the tracks has a substantially L-shaped cross-section. The moving element comprises a carrier ram body 2326 and one or more elongated, substantially rectangular carrier ram fingers 2328 sized to slide through corresponding sealable opening in the chamber wall.

The carrier ram fingers are constructed of material suitable for use at high temperature. Such materials are well-known to those skilled in the art and can include stainless steel, mild steel, or mild steel partially protected or fully protected with refractory. Optionally, specific individual carrier ram fingers or all carrier ram fingers can be partially or fully covered with refractory. Optionally, cooling can be provided within the carrier ram fingers by fluid (air or water) circulated inside the carrier ram fingers from outside the chamber 2202.

Figure 34:
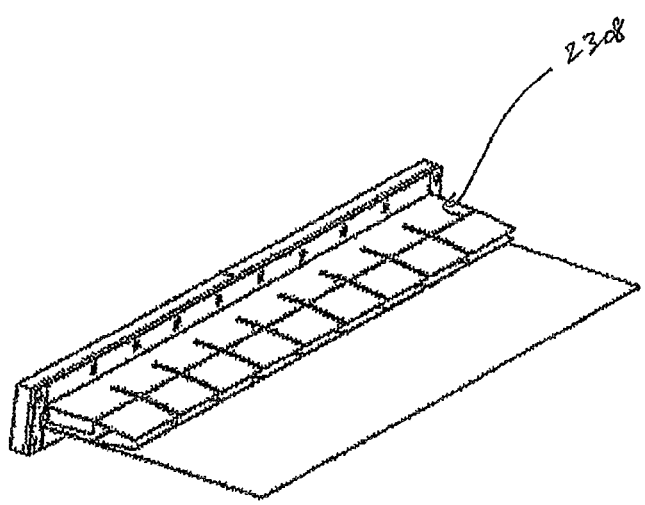
FIG. 34 details the dust seal of the multi-finger carrier-ram of the gasifier illustrated in FIGS. 26 to 30.

The carrier ram fingers are adapted to sealingly engage the chamber wall to avoid uncontrolled air from entering the primary chamber 2200, which would interfere with the process or could create an explosive atmosphere. It is also necessary to avoid escape of hazardous toxic and flammable gas from the primary chamber 2202, and excessive escape of debris. Gas escape to atmosphere is prevented by containing the carrier ram mechanisms in a sealed box. This box has a nitrogen purge facility to prevent formation of an explosive gas mixture within the box. Debris sealing and limited gas sealing is provided for each finger of the carrier ram, using a flexible strip 2308 pressing against each surface of each finger of the carrier rams, as shown in FIG. 34. Alternatively, the seal can be a packing gland seal providing gas and debris sealing for each finger.

The design of this sealing provides a good gas and debris seal for each carrier ram finger while tolerating vertical and lateral movements of the carrier ram. The seals at the sides of the fingers were the greatest challenge as they must be compliant to the vertical and lateral motions of the carrier ram while remaining in close contact with the carrier ram and the seals of the upper and lower surfaces of the carrier ram. Leakage of debris can be monitored by means of windows in the sealed box and a dust removal facility is provided if the debris build-up becomes excessive. This removal can be accomplished without breaking the seal integrity of the carrier ram box, as shown in FIG. 35.

Figure 35:
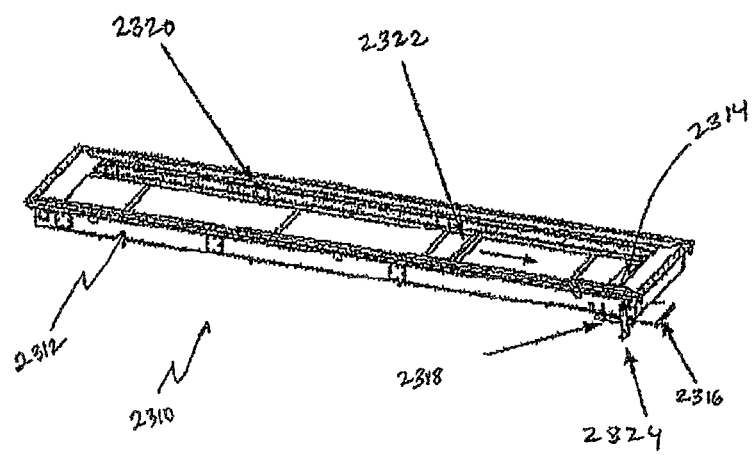
FIG. 35 showing the dust removal system of one embodiment of the gasifier illustrated in FIGS. 26 to 30 detailing the dust pusher, dust can attachment, shutter, operator handle and chain mechanism.

Referring to FIG. 35, the dust removal facility 2310 comprises a metal tray 2312 having a dust outlet 2314 equipped with a shutter 2316 and attachment site 2318 for a dust can 2332, and a manual-operated, chain 2320 driven dust pusher 2322. Dust is pushed to the dust outlet 2314 by the pusher 2322 when the operator handle 2324 is used.

Figure 36:
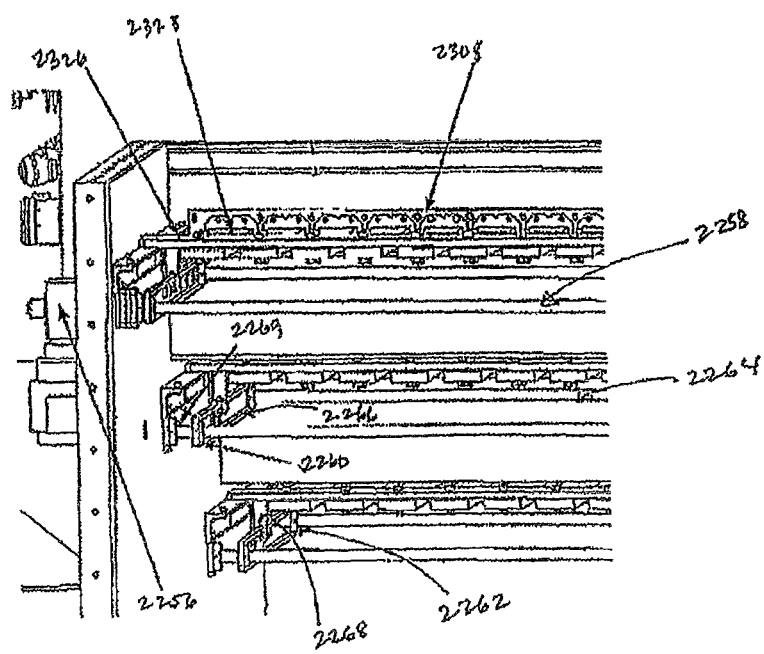
FIG. 36 details the carrier-ram enclosure of the gasifier illustrated in FIGS. 26 to 30 detailing the carrier-ram structure.

Referring to FIG. 36, power for moving the carrier rams 2228, 2230 & 2232 is provided by electric motors which drive the carrier ram via a gearbox and roller chain system. Briefly, the power to propel the carrier rams along the tracks is supplied by an externally mounted electric variable speed motor 2256 which drives a motor output shaft 2258 selectably in the forward or reverse direction allowing for extension and retraction of the carrier ram at a controlled rate. Position sensor 2269 transmits the carrier ram position information to the control system. Optionally, the motor may further comprise a gear box. Two driver sprocket gears 2260 are mounted on the motor output shaft. The driver sprockets 2260 and corresponding driven sprockets 2262 mounted on an axle 2264 operatively mesh with chain members 2266 which are secured by brackets 2268 to the elongated rectangular block 2244.

The motors are controlled by the overall system control means which can command start and stop position, speed of movement and frequency of movement. Each carrier ram can be controlled independently. Roller chain is used for this implementation as it provides high strength and tolerates a severe duty environment. The use of two chains per carrier ram provides a means of keeping the carrier rams angularly aligned without the need for precision guides. There is a tendency for the material on top of the carrier ram to be pulled back when the carrier ram is withdrawn. This can be dealt with by sequencing the carrier rams where the lowest carrier ram 2232 is extended first; the middle carrier ram 2230 is then extended which pushes material down onto the lowest carrier ram 2232 filling the void created by that carrier rams movement; the lowest carrier ram 2232 is then retracted; the upper carrier ram 2228 is then extended filling the void at the back of the middle carrier ram 2230; the middle carrier ram 2230 is then retracted; new material dropping from the feed port fills any void on the top carrier ram 2228 and the top carrier ram 2228 is retracted. All these motions are controlled automatically and independently by the system control means in response to system instrumentation data.

Referring to FIGS. 36 & 37, a staggered carrier ram sequence control strategy was implemented to facilitate movement of the carrier rams, as summarized below:

- carrier ram C 2232 move fixed distance (with adjustable setpoint), creating a pocket at the start of step C 2216.
- carrier ram B 2230 follows as soon as carrier ram C 2232 passes a trigger distance (trigger distance has adjustable setpoint) carrier ram B pushes/carries material to immediately fill the pocket at the start of step C 2230. Feedback control is to stroke as far as necessary to block level switch C 2217, or minimum setpoint distance if already blocked, or maximum setpoint distance if blocking does not occur. At the same time as carrier ram B 2230 is filling the pocket at the start of Step C 2216, it is creating a pocket at the start of Step B 2230.
- carrier ram A 2228 follows as soon as carrier ram B 2228 passes a trigger distance carrier ram A 2228 pushes/carries material to immediately fill the pocket at the start of Step B 2214. Feedback control is to stroke as far necessary to block level switch B 2215, or minimum setpoint distance if already blocked, or maximum setpoint distance if blocking does not occur. At the same time as carrier ram A 2228 is filling the pocket at the start of Step B 2214, it is also creating a pocket at the start of Step A 2212. This typically triggers the feeder to run and fill the primary chamber 2200 until level switch A 2213 is blocked again.
- All carrier rams reverse to home position simultaneously.

Access is provided to the primary chamber 2200 using a manhole at one end. During operation, this is closed using a sealable refractory lined cover. Further access is also possible by removing the third stage air-box 2276.

The char remaining after this stage must be removed from the primary chamber 2200 and passed to the secondary chamber. As the material is processed and moved in the primary chamber 2200, the heat generated within the pile can cause melting, which will result in agglomeration of the solids. Agglomerated solids have been shown to cause jamming in drop port type exits. In order to ensure that any agglomerations do not create jamming at the exit from the primary chamber 2200, a screw conveyor 2209 is used to extract the char from the primary chamber 2200.

The carrier ram motion pushes the char into the extractor screw 2209 which pushes the char out of the chamber 2202 and feed it into a conveyor system. Rotation of the extractor screw 2209 breaks up agglomerations before the char is fed into the conveyor system. This breaking up action is enhanced by having serrations on the edge of the extractor screw flights.

For implementing process control, various parameters have to be monitored within the primary chamber 2202. For example, the temperature needs to be monitored at different points along each stage and at various heights at each stage. This is achieved using thermocouples, which tend to need replacement during operation. In order to accomplish this without shutting down the process, each thermocouple is inserted into the primary chamber 2202 via a sealed end tube which is then sealed to the vessel shell. This design allows the use of flexible wire thermocouples which are procured to be longer than the sealing tube so that the junction (the temperature sensing point) of the thermocouple is pressed against the end of the sealed tube to assure accurate and quick response to temperature change. The sealed tube is sealed to the primary chamber 2202 and mechanically held in place by means of a compression gland, which can also accommodate protrusion adjustment into the chamber 2202. For temperature measurements within the MSW pile, the sealed tube can result in the pile being held back when its movement is needed. To avoid this problem the end of the sealed tube is fitted with a deflector which prevents the MSW pile from getting blocked by the thermocouple tube.

The residue from the primary chamber is passed into a two-zone carbon converter 110 which is zonally segregated by an interzonal region 112 into an upper carbon conversion zone 111 and lower slag melting zone 113. The carbon conversion zone 111 is maintained at a temperature of about 950° C. to about 1000° C. and the slag melting zone is maintained at a temperature of about 1350° C. to about 1800° C.

Referring to FIGS. 38 to 41, in the illustrated embodiment the two-zone carbon converter 110 comprises a refractory-lined vertically-oriented chamber (115) having a char input 120, gas outlet 125, a slag outlet 130, and zone-specific heating system (i.e. a system that can establish two temperature zones) comprising an air box 135 and plasma torch 140. If necessary, the char input is optionally equipped with a grinder (not shown) to homogenize the size of the inputted material.

The chamber 115 is a refractory-lined steel weldment having a substantially cylindrical shape with a roof. The diameter of the chamber is narrowed in the inter-zonal region and further tapers towards the slag outlet. The chamber is constructed in segments to facilitate the replacement of components including those within the inter-zonal region.

Referring to FIGS. 38 to 41, heated air is introduced into the carbon conversion zone via an air box 135 located proximal to the downstream end of this zone. The air feed to the air box is controllable allowing for regulation of the conversion process. Optionally, steam may be injected into the carbon conversion zone via the steam injection ports (136).

The carbon conversion zone 111 tapers to the narrowed inter-zonal region 112. The inter-zonal region comprises a physical impediment 145 to guide the flow of material from the carbon conversion zone to the slag zone. Referring to FIGS. 39A-C, the physical impediment comprises a solid pre-cast refractory dome 145 mounted in the inter-zonal region via four wedge-shaped refractory bricks 150. The refractory dome is sized to provide a gap 155 or space between the internal wall of the two-zone carbon converter and the dome thereby allowing for transfer of material between the two-zones. A plurality of alumina balls 165 between 20 to 100 mm in diameter rest on top of the refractory dome to form a bed and provide for diffusion of heated air and to promote the transfer of plasma heat to the ash to initially melt the ash into slag in the inter-zonal region. In this embodiment, as the ash melts it transits the inter-zonal region through the gap 155 between the outside edge of the dome and the inner wall of the chamber and into the slag zone.

Located downstream of the inter-zonal region is the slag zone 113. The slag zone 113 is a refractory-lined cylinder having a single conically shaped slag outlet 130.

Figure 40:
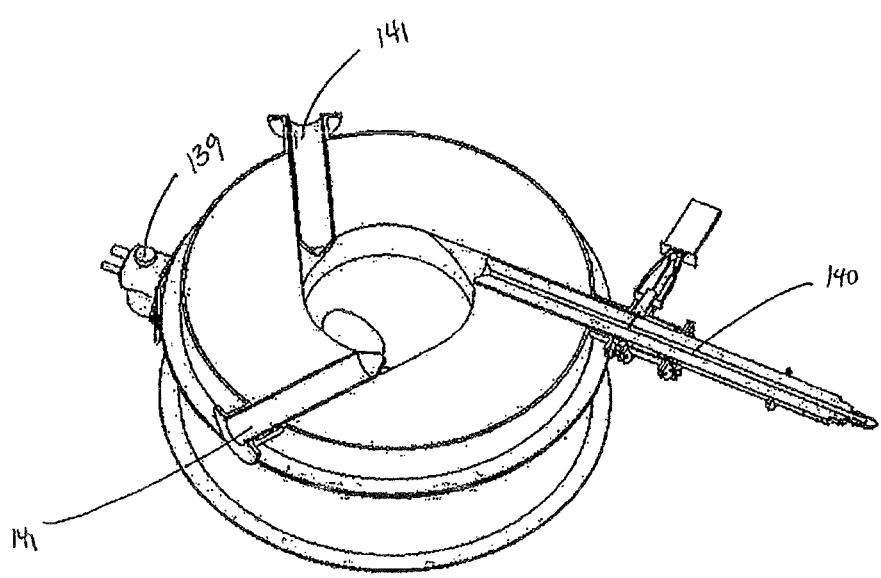
FIG. 40 is a cross-sectional view through the multi-zone carbon converter of FIG. 32 at torch level detailing the tangentially located air inputs and plasma torch.
Figure 41:
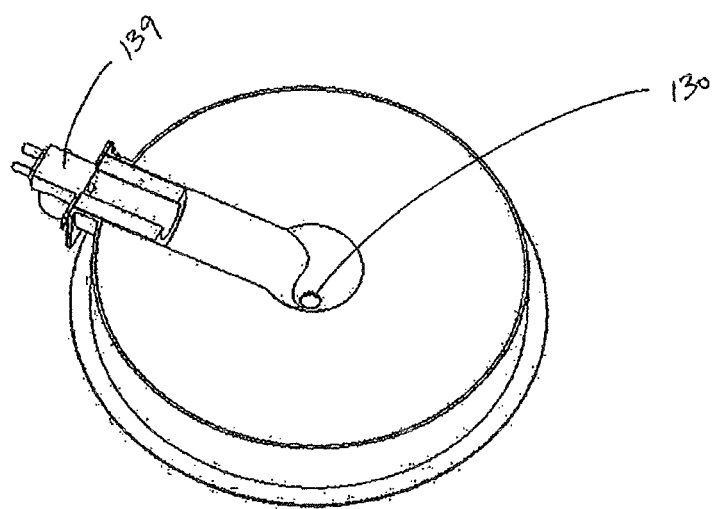
FIG. 41 is a cross-sectional view through the multi-zone carbon converter of FIG. 38 at burner level.

The slag zone comprises various ports including a plasma torch port, burner port to accommodate a burner to pre-heat the chamber, and ports for various process additives including hot air and carbon. Referring to FIG. 40, the slag melting zone is equipped with a plasma torch 140 and tangentially mount air nozzle. Optionally, carbon can be injected using carbon input.

The residue remaining after the gasification must be rendered inert and usable before disposal. This is done by extracting it from the secondary chamber into a plasma-based slag chamber (RCC) 4220, melting it and rendering it into an inert molten slag 4202, cooling and shattering the molten slag 4202 into granules using a quench tank 4240 before transfer to a slag stockpile 4204 ready for removal from the site. The final by-product is suitable for use as road fill or concrete manufacture.

When the molten slag drops into the quench tank 4240 it is cooled and shattered into granular form. A slag conveyor then removes the granular slag from the quench 4240 and places it into a stockpile 4204 for disposal or further use. The slag drop port is sealed to the environment by means of a water trap consisting of a shroud sealed to the RCC 4220 at the top and with its lower edge submerged in the quench medium. The same quench medium seals the slag conveyor from the RCC.

Gas Reformulation System

The gases produced in the primary and secondary chambers then moves into the Gas Reformulating System (GRS) 3200. The GRS 3200 is designed to satisfy a wide range of requirements: (a) provide necessary volume for the required gas reformulation residence time; (b) provide insulation for heat conservation and protection of the outer steel vessel; (c) provide inlets for addition of air and steam; (d) enable mixing of the gases; (e) process the gases at high temperature using plasma torches 3208; (f) provide instrumentation for monitoring the gas composition for process control and for enhanced performance of the plasma torch 3208; and (g) output the processed gas to a downstream heat exchanger 5200.

Figure 42:
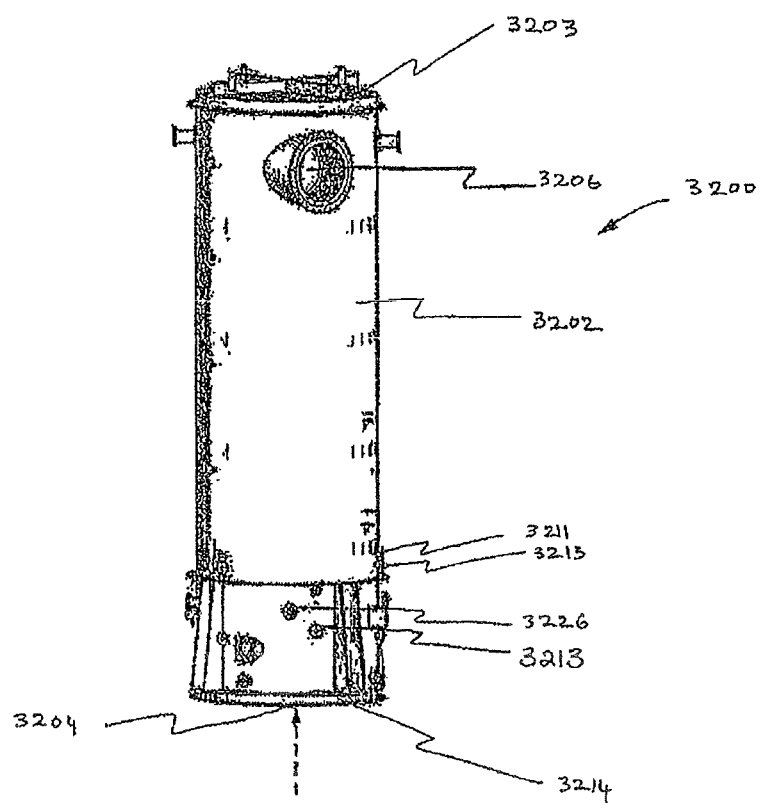
FIG. 42 is a schematic of the gas reformulating chamber.

The gas reformulating system (GRS) 3200 provides a sealed environment with mounting and connection features for process air, steam, plasma torches 3208 and torch handling mechanisms, instrumentation and exhaust of the output syngas. As shown in FIG. 42, the GRS 3200 comprises a substantially vertically mounted refractory-lined cylindrical or pipe-like reformulating chamber 3202 having a single conically shaped off-gas inlet 3204 to which the primary chamber 2200 is connected to via a mounting flange 3214. The GRS 3200 has a length-to-diameter ratio of about 3:1. The residence time within the GRS 3200 is 1.2 seconds. The GRS 3200 further comprises three levels of tangentially positioned air nozzles, two tangentially located plasma torches 3208, six thermocouple ports, two burner ports, two pressure transmitter ports and several spare ports. The high temperatures created in the GRS 3200 by the plasma torches 3208 ensure that the molecules within the off-gas disassociate into their constituent elements, and then combines together to form syngas. The hot crude syngas exits the GRS 3200 via the syngas outlet 3206.

Figure 43:
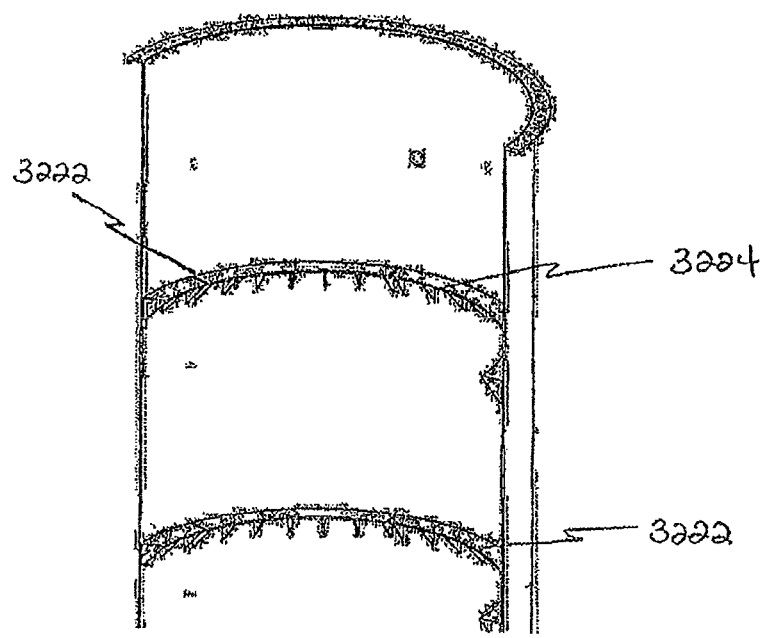
FIG. 43 is a view of the inner wall of the reformulating chamber.

Referring to FIG. 43, and as mentioned earlier, the GRS 3200 incorporates supports for refractory lining. The major support feature for the refractory is a series of shelves 3222 around the interior of the GRS 3200. During operation, these shelves 3222 will be at considerably higher temperature than the shell of the reformulating chamber 3202. Therefore, it is necessary to avoid any waste of heat by conduction to the GRS 3200, while providing allowance for differential expansion. Also, the shelves 3222 must be capable of supporting the considerable weight of the refractory. These requirements were met by making the shelves 3222 segmented with expansion gaps between segments to allow for the expansion. Also, there is a gap between the shelf 3222 and the wall to avoid heat transfer. To take the weight of the refractory, each shelf segment is supported by a number of gussets 3224 welded to the wall, as shown in FIG. 43. Expansion of the shelf 3222 along its length would create stress and possibly failure in the gussets 3224 if they were welded to the gussets 3224. However, by resting the shelf 3222 on the gussets 3224 without welding, the shelf 3222 is allowed to expand freely. To hold the segment into its correct location, it is welded to the center gussets 3224 only where the expansion is small and even then only the outer portion is welded. This minimizes any stress on the gussets 3224 and potential buckling of the shelf 3222.

The top of the reformulating chamber 3202 is capped with a refractory-lined lid 3203 thereby creating a sealed enclosure. The whole GRS 3200 is coated with a high temperature resistant membrane internally to prevent corrosion by the unrefined off-gas. It is painted on the exterior surfaces with a thermo-chromic paint to reveal hot spots due to refractory failure or other causes.

The refractory used is a multilayer design with a high density layer on the inside to resist the high temperature, erosion and corrosion that is present in the GRS 3200. Outside the high density material is a lower density material with lower resistance properties but higher insulation factor. Outside this layer, a very low density foam board material with very high insulation factor is used because it will not be exposed to abrasion of erosion. The outside layer, between the foam board and the vessel steel shell is a ceramic blanket material to provide a compliant layer to allow for differential expansion between the solid refractory and the vessel shell. Vertical expansion of the refractory is provided for by means of a compressible refractory layer separating sections of the non-compressible refractory. The compressible layer is protected from erosion by overlapping but extendible high density refractory.

Figure 44:
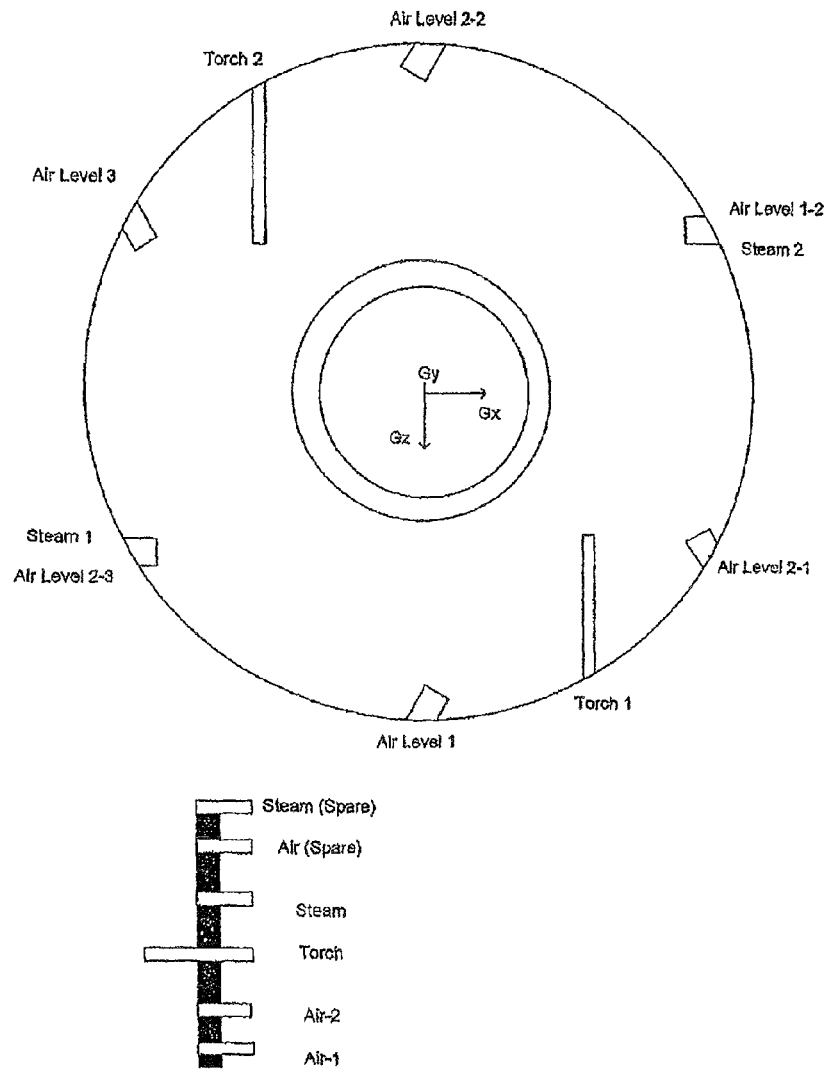
FIG. 44 is a top-down view of the reformulating chamber showing the position of the torches, and the air and steam nozzles.
Figure 45:
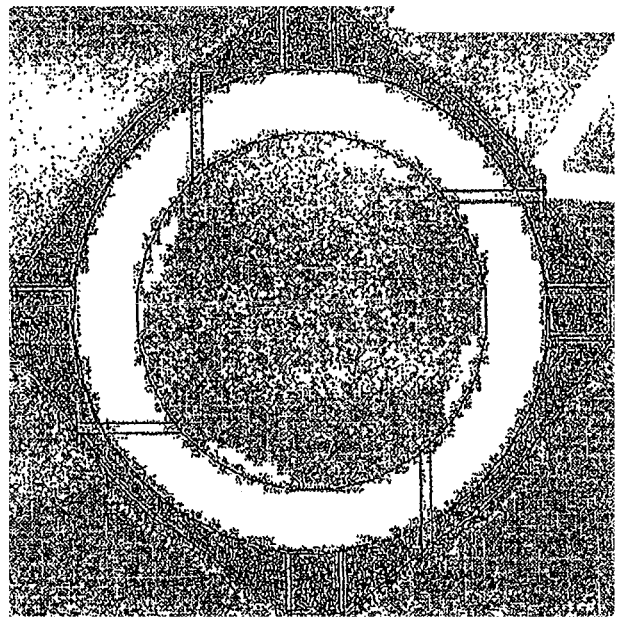
FIG. 45 shows the arrangement of the swirl inlets around the reformulating chamber.

As shown in FIGS. 44, 45 and 47, air is injected into the off-gas stream by three levels of air nozzles that include four jets at the lower level, and another six jets at upper level, in which three jets are slightly higher than other three to create cross jet mixing effects to achieve better mixing. Angular blowing of the air into the GRS 3200, achieved using deflector at the tip of the input nozzle, also results in better mixing while allowing the inlet pipes and flanges to be square with the reformulating chamber 3202. The improved mixing of the gases in the GRS 3200 improves the reformulation of the syngas. This is achieved by inducing a swirling action at the base of the reformulating chamber 3202 by making use of the process air velocity. Air is injected into the off-gas stream through swirl ports 3212 to create a swirling motion or turbulence in the off-gas stream thereby mixing the off-gas and creating a re-circulating vortex pattern within the GRS 3200.

Figure 46:
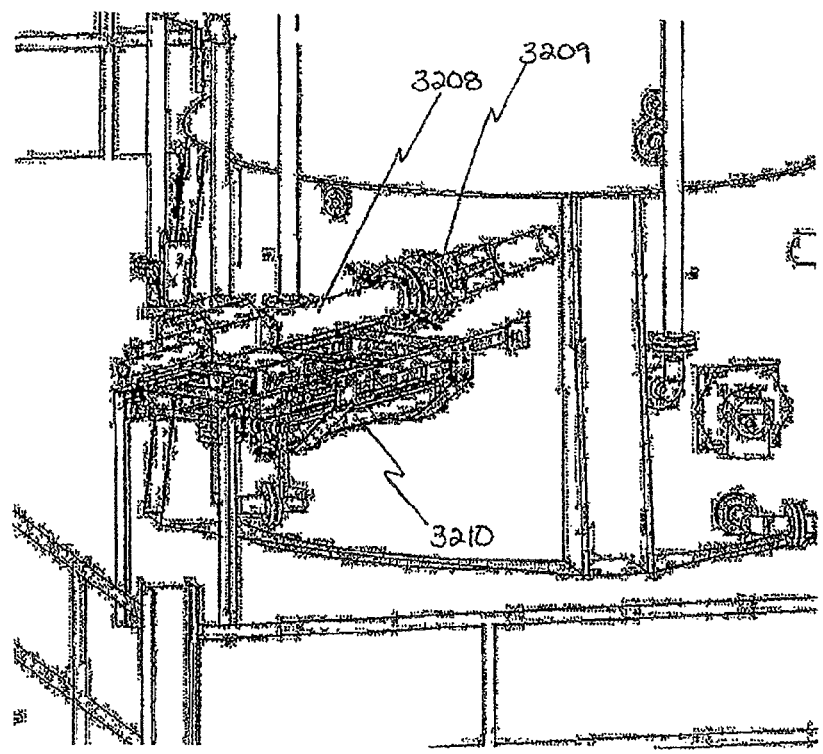
FIG. 46 shows the attachment of a plasma torch on the reformulating chamber.
Figure 48:
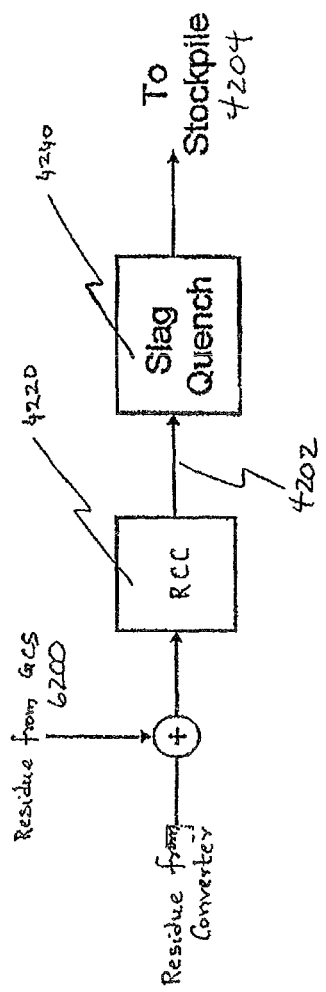
FIG. 48 is a functional block diagram of the residue conditioning system.

As mentioned earlier, the GRS 3200 also includes two tangentially mounted 300 kW, water cooled, copper electrode, NTAT, DC plasma torches 3208 mounted on a sliding mechanism, as shown in FIG. 46. The DC plasma torches 3208 are powered from a DC power supply. Thermocouples are positioned at various locations within the GRS 3200 to ensure that the temperature of the syngas is maintained at about 1000° C.

The plasma torches 3208 require periodic maintenance and it is most desirable that they are replaceable with the process still running. As mentioned earlier, this implementation uses two torches 3208 in the GRS 3200 when strictly only one is needed for operation. Removal and replacement of the plasma torches 3208 have to be done in the presence of high temperature toxic and flammable gas in the GRS 3200. In addition, the torch 3208 will also need to be removed in the event of failure of the torch cooling system to protect it from the heat in the GRS 3200.

These challenges are met by mounting the torch 3208 on a sliding mechanism that can move the torch 3208 into and out of the reformulating chamber 3202. The torch 3208 is sealed to the reformulating chamber 3202 by means of a sealing gland. This gland is sealed against a gate valve 3209, which is, in turn, mounted on and sealed to the vessel. To remove a torch 3208, it is pulled out of the reformulating chamber 3202 by the slide mechanism. Initial movement of the slide disables the high voltage torch power supply for safety purposes. The gate valve 3209 shuts automatically when the torch 3208 has retracted past the gate valve 3209 and the coolant circulation is stopped. The hoses and cable are disconnected from the torch 3208, the gland is released from the gate valve 3209 and the torch 3208 is lifted away by a hoist.

Replacement of a torch 3208 is done using the reverse of the above procedure; the slide mechanism can be adjusted to permit variation of the insertion depth of the torch 3208.

For the sake of simplicity and safety, all the above operations except for the closing of the gate valve 3209 are carried out manually. The gate valve 3209 is operated mechanically so that operation is automatic. A pneumatic actuator 3210 is used to automatically withdraw the torch in the event of cooling system failure. Compressed air for operating the pneumatic actuator 3210 is supplied from a dedicated air reservoir so that power is always available even in the event of electrical power failure. The same air reservoir provides the air for the gate valve 3209. An electrically interlocked cover is used a further safety feature by preventing access to the high voltage torch connections.

Figure 50:
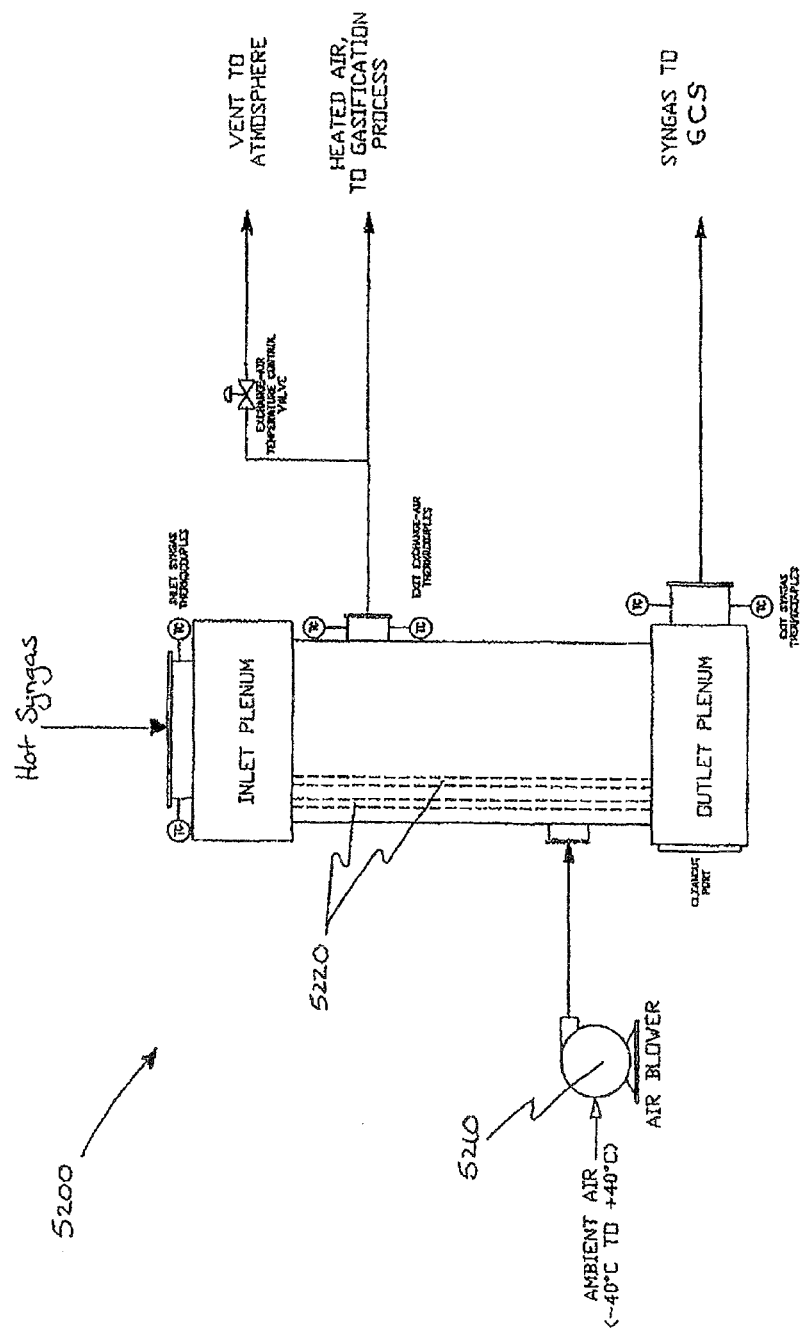
FIG. 50 is a more detailed drawing of the heat exchanger and shows the process air blower used for the control of the air input to the heat exchanger.

Referring to FIG. 50, the raw syngas exits the converter 1200 and passes through a Heat Recycling System. In this embodiment, the heat recycling system is implemented using a syngas-to-air Heat Exchanger (HX) 5200 where the heat is transferred from the syngas stream to a stream of air. Thus, the syngas is cooled while the resulting hot stream of air is fed back to the converter 1200 as process air. The cooled syngas then flows into a Gas Conditioning System (GCS) 6200, where the syngas is further cooled and cleaned of particulates, metals and acid gases sequentially. The cleaned and conditioned syngas (with desired humidity) is sent to the SRS 7200 before being fed to gas engines 9260 where electricity is generated. The functions of the major components (equipment) in the system after the converter 1200 and RCS 4200 are outlined in Table 1, in the sequence in which the syngas is processed.

TABLE 1

Steps after Converter 1200 and RCS 4200

| Subsystem or equipment | Main Function |
| --- | --- |
| Heat Exchanger 5200 | Cool down syngas and recover sensible heat |
| Evaporative Cooler 6210 | Further cooling down of syngas prior to baghouse |
| Dry Injection System 6220 | Heavy metal adsorption |
| Baghouse 6230 | Particle or dust collection |
| HCL Scrubber 6240 | HCl removal and syngas cooling/conditioning |
| Carbon Filter Bed 6260 | Further mercury removal |
| $H_2S$ Removal System 6270 | $H_2S$ removal and elemental sulfur recovery |
| RGCS 4250 | RCC off-gas cleaning and cooling |
| Syngas Storage 7230 | Syngas storage and homogenization |
| Chiller 7210; Gas/Liquid Separator 7220 | Humidity control |
| Gas Engines 9260 | Primary driver for electricity generation |
| Flare Stack 9299 | Burning syngas during start-up |

Syngas-to-Air Heat Exchanger

The output syngas leaving the GRS 3200 is at a temperature of about 900° C. to 1100° C. In order to recover the heat energy in the syn gas, the raw syngas exiting from GRS 3200 is sent to a shell-tube type syngas-to-air heat exchanger (HX) 5200. Air enters the HX 5200 at ambient temperature, i.e., from about −30 to about 40° C. The air is circulated using air blowers 5210, and enters the HX 5200 at a rate between 1000 Nm³/hr to 5150 Nm³/hr, typically at a rate of about 4300 Nm³/hr.

Referring to FIG. 50, the syngas flows vertically through the tube side and the air flows in a counter-clockwise fashion through the shell side. The syngas temperature is reduced from 1000° C. to between 500° C. and 800° C., (preferably about 740° C.) while the air temperature is increased from ambient temperature to between 500° C. and 625° C. (preferably about 600° C.). Referring to FIG. 22, the heated exchange-air is recirculated back into the converter 1200 for gasification.

The HX 5200 is designed specifically for high level of particulates in the syngas. The flow directions of the syngas and the air are designed to minimize the areas where build up or erosion from particulate matter could occur. Also, the gas velocities are designed to be high enough for self cleaning while still minimizing erosion.

Due to the significant temperature difference between the air and syngas, each tube 5220 in the HX 5200 has its individual expansion bellows. This is essential to avoid tube rupture, which can be extremely hazardous since the air will enter the syngas mixture. Possibility for tube rupture is high when a single tube becomes plugged and therefore no longer expands/contracts with the rest of the tube bundle.

Multiple temperature transmitters are placed on the gas outlet box of the gas-to-air heat-exchanger 5200. These are used to detect any possible temperature raise that occurs due to combustion in the event of an air leak into the syngas. The air blower 5210 is automatically shut down in such a case.

The material for the gas tubes in the HX 5210 has to be carefully selected to ensure that corrosion is not an issue, due to concerns about sulfur content in the syngas and its reaction at high temperatures. In our implementation, Alloy 625 was selected.

Gas Conditioning System (GCS)

In general, a gas conditioning system (GCS) 6200 refers to a series of steps which converts the crude syngas obtained after the heat exchanger 5200 into a form suitable for downstream end applications. In our implementation, the GCS 6200 can be broken down into two main stages. Stage 1 comprises of: (a) an evaporative cooler (dry quench) 6210; (b) a dry injection system 6220; and (c) a baghouse filter (used for particular matter/heavy metal removal) 6230. Stage 2 comprises of (d) a HCl scrubber 6240; (e) a syngas (process gas) blower 6250; (f) a carbon filter bed (mercury polisher) 6260; (g) a $H_2S$ (sulfur) removal system 6270; and (h) humidity control using a chiller 7210 and gas/liquid separator 7220.

The heat exchanger 5200 before the GCS 6200 is sometimes considered as part of Stage 1 of the GCS 6200. The syngas (process gas) blower 6250 typically includes a gas cooler 6252 which is sometimes mentioned separately in Stage 2 of the GCS 6200. Also, humidity control mentioned here as part of Stage 2 of the GCS 6200 is often considered part of the SRS 7200 further downstream to the GCS 6200.

Figure 49:
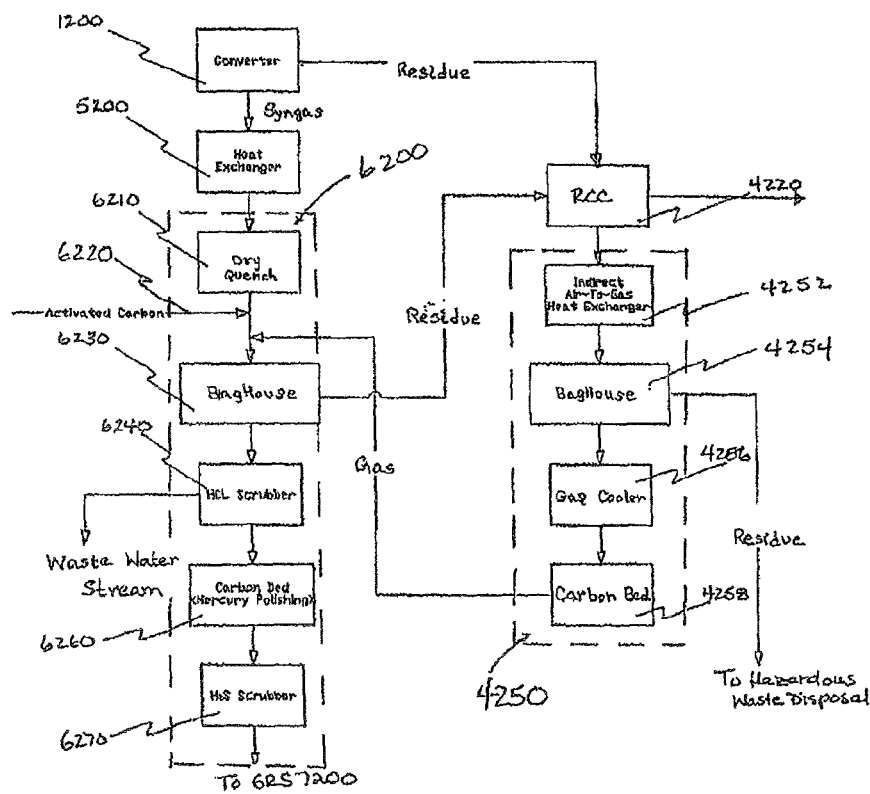
FIG. 49 depicts a process flow diagram of the entire system, and in particular the gas conditioning system (GCS).

FIG. 49 shows a block diagram of the GCS 6200 implemented in our system. This is also an example of a converging process in which the GCS 6200 is integrated with an optional residue gas conditioning system (RGCS) 4250.

After initial cooling in the heat exchanger 5200, the input syngas is further cooled by dry quenching 6210, which lowers the syngas temperature and also prevents condensation. This is achieved using an evaporative cooling tower (a.k.a 'dry quench') 6210 by direct injection of water into the gas stream in a controlled manner (adiabatic saturation). The water is atomized before it is sprayed co-currently into the syngas stream. As no liquid is present in the cooling, the process is also called dry quench. When the water is evaporated, it absorbs the sensible heat from syngas thus reducing its temperature from 740° C. to between 150° C. and 300° C. (typically about 250° C.). Controls are added to ensure that water is not present in the exiting gas. The relative humidity at the exiting gas temperature is therefore still below 100%.

Figure 51:
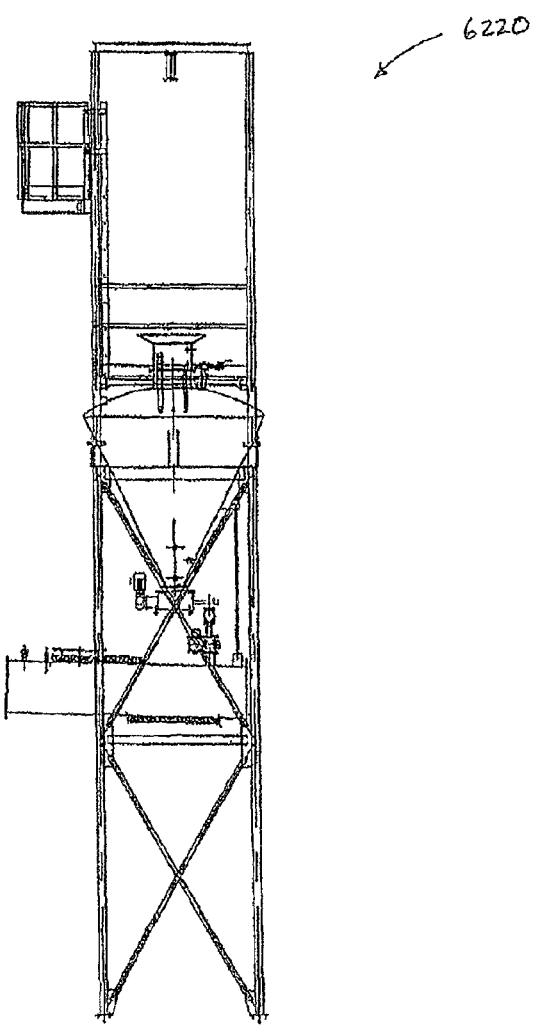
FIG. 51 depicts a dry injection system whereby activated carbon or other adsorbents is held in a storage hopper and is fed into the syngas stream by rotating screw. The syngas stream pipe is angled so that carbon not entrained in the gas stream rolls into the baghouse.
Figure 52:
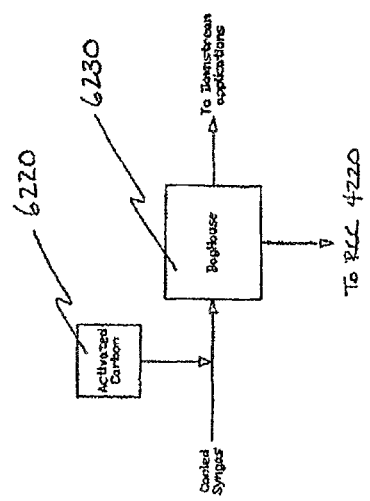
FIG. 52 presents an exemplary schematic diagram of the dry injection system in combination with the baghouse.

Referring to FIGS. 51 and 52, once the gas stream exits the evaporative cooling tower 6210, activated carbon, stored in a hopper, is pneumatically injected into the gas stream. Activated carbon has a very high porosity, a characteristic that is conducive to the surface adsorption of large molecular species such as mercury and dioxin. Therefore, most of the heavy metals (cadmium, lead, mercury etc.) and other contaminants in the gas stream are adsorbed on the activated carbon surface. The spent carbon granules are collected by the baghouse 6230 and recycled back to the RCS 4200 for further energy recovery as described in the next step. For obtaining efficient adsorption, it is necessary to ensure that the syngas has sufficient residence time in this stage. Other materials such as feldspar, lime, and other absorbents can also be used instead of, or in addition to, activated carbon in this dry injection stage 6220 to capture heavy metals and tars in the syngas stream without blocking it.

Referring to FIG. 52, particulate matter and activated carbon with heavy metal on its surface is then removed from the syngas stream in the baghouse 6230, with extremely high efficiency. The operating parameters are adjusted to avoid any water vapour condensation. All particulate matter removed from the syngas stream forms a filter cake which further enhances the efficiency of the baghouse 6230. So while new non-coated bags have a removal efficiency of 99.5%, the baghouse 6230 is typically designed for 99.9% particulate matter removal efficiency. The baghouse 6230 employs lined fiber glass bags, unlined fibre glass bags or P84 basalt bags and is operated at a temperature between 200° C. and 260° C.

When the pressure drop across the baghouse 6230 increases to a certain set limit, nitrogen pulse-jets are used to clean the bags. Nitrogen is preferred to air for safety reasons. The residue falling from the outside surface of the bags are collected in the bottom hopper and are sent to the slag chamber 4200 for further conversion or disposal. Special reagents can be used to absorb the high molecular weight hydrocarbon compounds (tars) in order to protect the baghouse 6230. FIG. 52 shows the schematic of the baghouse respectively. The baghouse uses cylindrical filters which do not require support.

A typical operational specification of the baghouse 6230 (assuming the input is fly-ash with heavy metals) is as follows:

| | |
|---|---|
| Design Gas flow rate | 9500 $Nm^3/hr$ |
| Dust loading | 7.4 $g/Nm^3$ |
| Cadmium | 2.9 $mg/Nm^3$ |
| Lead | 106.0 $mg/Nm^3$ |
| Mercury | 1.3 $mg/Nm^3$ |
| Guaranteed filtration system outlet: | |
| Particulate matter | 11 $mg/Nm^3$ (about 99.9% removal) |
| Cadmium | 15 $\mu g/Nm^3$ (about 99.65% removal) |
| Lead | 159 $\mu g/Nm^3$ (about 99.9% removal) |
| Mercury | 190 $\mu g/Nm^3$ (about 90% removal) |

The quantity of residue contaminated with heavy metals exiting the baghouse 6230 is large. Therefore, this residue is sent to the plasma-based RCC 4220 for conversion into vitreous slag 4203. Referring to FIG. 49, the secondary gas stream created in the RCC 4220 is optionally treated in a separate residue gas conditioner (RGCS) 4250 with the following Stage 1 processes: cooling in an indirect air-to-gas heat exchanger 4252 and removal of particulate matter and heavy metals in a smaller baghouse 4254. The smaller baghouse 4254 is dedicated to treating the secondary gas stream generated in the RCC 4220. As shown in FIG. 49, additional steps carried out by the RGCS 4250 include cooling the gas further using a gas cooler 4256, and removing heavy metals and particulate matter in a carbon bed 4258. Referring to FIG. 22, the processed secondary syngas stream is then diverted back to the GCS 6200 to feed back into the primary input syngas stream prior to the baghouse filter 6230.

The quantity of residue removed from the bag-house 4254 of the RGCS 4250 is significantly less compared to the baghouse 6230 in the GCS 6200. The small baghouse 4254 acts as a purge for the heavy metals. The amount of heavy metals purged out of the RGCS 4250 will vary depending on MSW feed composition. A periodic purge is required to move this material to hazardous waste disposal, when the heavy metals build-up to a specified limit.

Below is a typical design specification for the smaller RGCS baghouse 4254, once again assuming that the input is fly-ash with heavy metals:

| | |
|---|---|
| Design Gas flow rate | 150 Nm³/hr |
| Dust loading | 50 g/Nm³ |
| Cadmium | 440 mg/Nm³ |
| Lead | 16.6 mg/Nm³ |
| Mercury | 175 mg/Nm³ |
| Guaranteed filtration system outlet: | |
| Particulate matter | 10 mg/Nm³ (about 99.99% removal) |
| Cadmium | 13 μg/Nm³ (about 99.997% removal) |
| Lead | 166 μg/Nm³ (about 99.999% removal) |
| Mercury | 175 μg/Nm³ (about 99.9% removal) |

The GCS 6200 may comprise direct and indirect feedback or monitoring systems. In our implementation, both the GCS and RGCS baghouse filters have a dust sensor on the exit (direct monitoring) to notify of a bag rupture. If a bag rupture occurs, the system is shutdown for maintenance. Optionally, the water stream in the HCl scrubber 6240 can be analyzed at start-up to confirm particulate matter removal efficiency.

Figure 53:
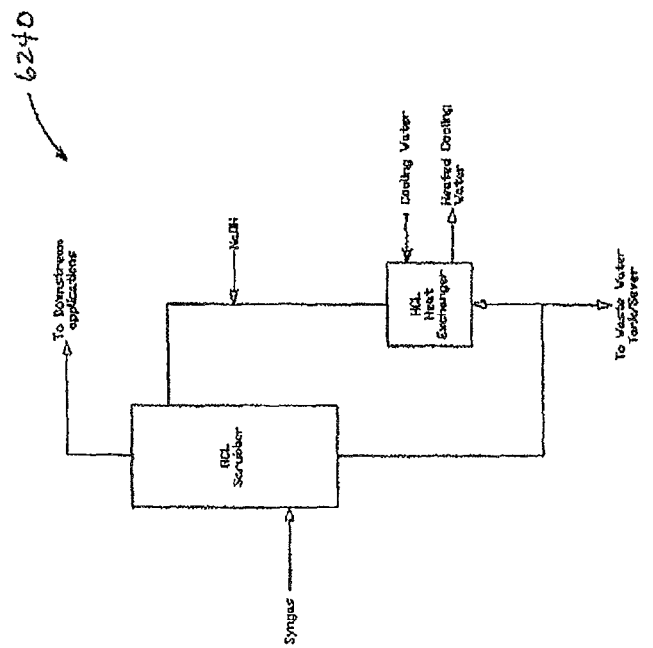
FIG. 53 presents an exemplary schematic diagram of the HCl scrubber and associated components.
Figure 54:
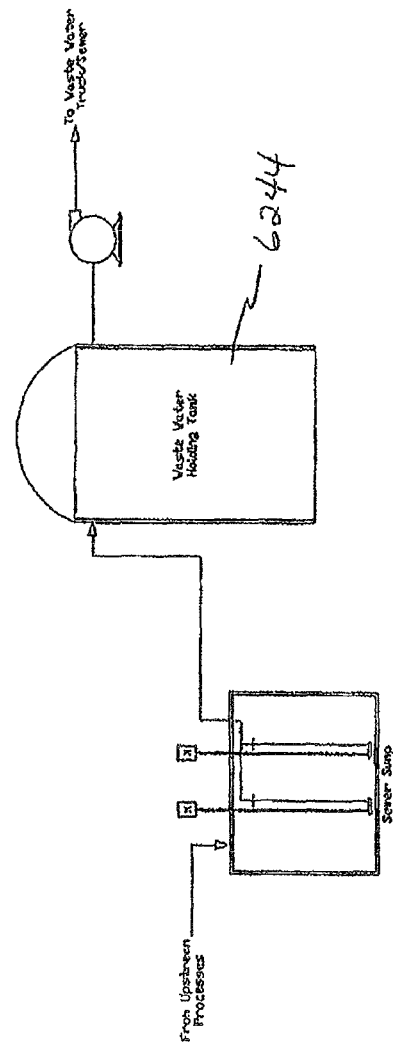
FIG. 54 shows a system for collecting and storing waste water from the gas conditioning system.

Referring to FIG. 53, the particulate-free syngas stream exiting from the baghouse 6230 is scrubbed in a packed tower using a re-circulating alkaline solution to remove any HCl present. This HCl scrubber 6240 also provides enough contact area to cool down the gas to about 35° C. A carbon bed filter 6260 is used to separate the liquid solution from potential soluble water contaminants, such as metals, HCN, ammonia etc. The HCl scrubber 6240 is designed to keep the output HCl concentration at about 5 ppm. A waste water bleed stream is sent to a waste water storage tank 6244 for disposal, as shown in FIG. 54.

For metallurgical considerations, the HCl scrubber 6240 is located upstream of the gas blower 6250. An exemplary schematic diagram of an HCl scrubber 6240 including associated components such as heat exchangers 6242 is shown in FIG. 53. FIG. 54 shows an exemplary system for collecting and storing waste water from the GCS 6200. A carbon bed is added to the water blowdown to remove tars and heavy metals from the wastewater. Typical specification for the HCl scrubber 6240 is as follows:

| | |
|---|---|
| Design Gas flow rate | 9500 Nm³/hr |
| Normal Inlet/Max HCl loading to scrubber | 0.16%/0.29% |
| HCl outlet concentration | 5 ppm |

After HCl removal, a gas blower 6250 is employed which provides the driving force for the gas through the entire system 120 from the converter 1200 to the gas engines 9260 downstream. The blower 6250 is located upstream of the mercury polisher 6260 as the latter has a better mercury removal efficiency under pressure. This also reduces the size of the mercury polisher 6260. FIG. 22 show schematic of the entire gasification system 120 including the position of the process gas blower 6250.

The blower 6250 is designed using all upstream vessel design pressure drops. It is also designed to provide the required pressure for downstream equipment pressure losses to have a final pressure of ~2.1 to 3.0 psig (typically 2.5 psig) in the HC 7230. As the gas is pressurized when passing through the blower 6250, its temperature rises to about 77° C. A built-in gas cooler 6252 is used to reduce the temperature back to 35° C., as maximum operating temperature of the H₂S removal system 6270 is about 40° C.

A carbon bed filter 6260 is used as a final polishing device for any heavy metal remaining in the syngas stream. Its efficiency is improved when the system is under pressure instead of vacuum, is at lower temperature, gas is saturated, and when the HCl is removed so that is does not deteriorate the carbon. This process is also capable of absorbing other organic contaminants, such as dioxins from the syngas stream if present. The carbon bed filter 6260 is designed for over 99% mercury removal efficiency.

The performance of this system is measured by periodically analyzing the gas for mercury. Corrections are made by modifying the carbon feed rate and monitoring the pressure drop across the polisher 6260, and by analyzing the carbon bed efficiency via sampling.

Typical specification for the carbon bed filter 6260 is as follows:

| | |
|---|---|
| Design Gas flow rate | 9500 Nm³/hr |
| Normal/Max Mercury loading | 190 μg/Nm³/1.3 mg/Nm³ |
| Carbon bed life | 3-5 years |
| Guaranteed mercury carbon bed outlet | 19 μg/Nm³ (99%) |

Figure 55:
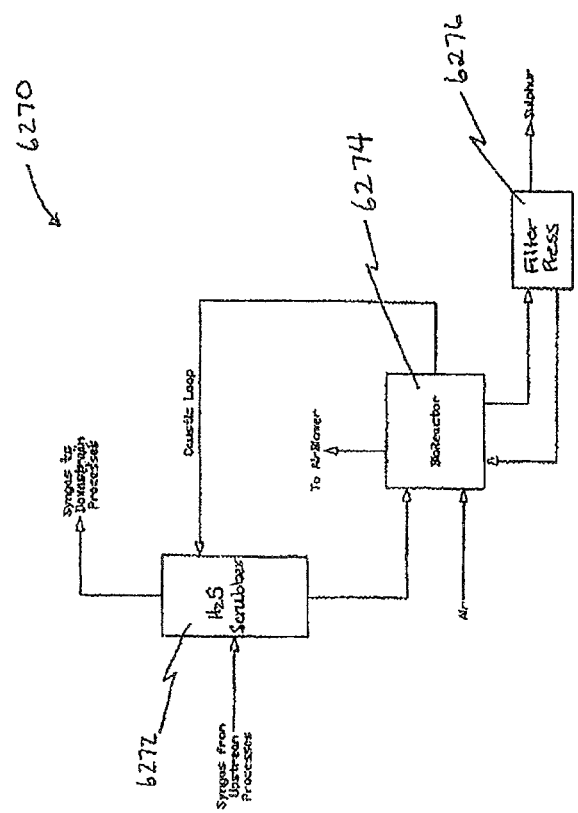
FIG. 55 depicts a process flow diagram of an $H_2S$ removal process using a Thiopaq-based bioreactor, in accordance with one embodiment of the invention.

The H₂S removal system 6270 was based on SO₂ emission limitation outlined in A7 guide lines of the Ministry of Environment, Ontario, Canada, which states that syngas being combusted in the gas engines will produce SO₂ emission below 15 ppm. The H₂S removal system 6270 was designed for an output H₂S concentration of about 20 ppm. FIG. 55 shows the details of the H₂S removal system 6270.

The Shell Paques Biological technology was selected for H₂S removal 6270. This technique consists of two steps: First, syngas from the carbon bed filter 6260 passes through a scrubber 6272 where H₂S is removed from syngas by re-circulating an alkaline solution. Next, the sulfur containing solution is sent to a bioreactor 6274 for regeneration of alkalinity, oxidation of sulfide into elemental sulfur, filtration of sulfur, sterilization of sulfur and bleed stream to meet regulatory requirements. The H₂S removal system 6270 is designed for 20 ppm H₂S outlet concentration.

Thiobacillus bacteria are used in the bioreactor 6274 to converts sulfides into elemental sulfur by oxidation with air. A control system controls the air flow rate into the bio-reactor to maintain sulfur inventory in the system. A slip stream of the bio reactor 6274 is filtered using a filter press 6276. Filtrate from filter-press 6276 is sent back to the process, a small stream from this filtrate is sent as a liquid bleed stream. There are two sources of discharge; one solid discharge—sulfur with some biomass and one liquid discharge—water with sulphate, carbonate and some biomass. Both streams are sterilized before final disposal.

Typical specification for the H₂S removal system 6270 is as follows:

| | |
|---|---|
| Design Gas flow rate | 8500 Nm3/hr |
| Normal/Max H₂S loading | 353 ppm/666 ppm |
| Guaranteed H₂S outlet for system | 20 ppm |

After the H₂S removal, a chiller 7210 is used to condense the water out of the syngas and reheat it to a temperature suitable for use in the gas engines 9260. The chiller 7210 sub-cools the gas from 35° C. to 26° C. The water condensed out from the input gas stream is removed by a gas/liquid separator 7220. This ensures that the gas has a relative humidity of 80% once reheated to 40° C. (engine requirement) after the gas storage prior to being sent to the gas engines 9260.

The following table gives the major specifications of the entire GCS 6200:

| | |
|---|---|
| Quench Tower 6210 | quench gas from 740° C. to 200° C. in 2 sec residence time |
| Dry Injection 6220 | 90% mercury removal efficiency |
| Baghouse Filter 6230 | 99.9% Particulate removal efficiency |
| | 99.65% Cadmium removal efficiency |
| | 99.9% Lead removal efficiency |
| HCl Scrubber 6240 | 99.8% HCl removal efficiency |
| Gas Blower 6250 | Zero leak seal rotary blower |
| Gas Cooler 6252 | 0.5 MBtu/hr cooling load |
| Carbon Bed Filter 6260 | 99% mercury removal efficiency |
| $H_2S$ Scrubber 6270 | $H_2S$ at scrubber outlet - 20 ppm |
| Bioreactor 6274 | Maximum regeneration efficiency with minimum blow-down |
| Filter Press 6276 | 2 days sulfur removal capacity |
| Homogenization Chamber 7230 | 2 min gas storage capacity |

As noted above, the GCS 6200 converts an input gas to an output gas of desired characteristics. FIG. 49 depicts an overview process flow diagram of this GCS system 6200 which is integrated with a gasification system 120 and downstream application. Here, the secondary gas stream generated in the RCS 4200 is fed into the GCS 6200.

The Residue Gas Conditioner (RGCS)

As mentioned earlier, the residue from the GCS baghouse 6230 which may contain activated carbon and metals is purged periodically by nitrogen and conveyed to the RCC 4220, where it is vitrified. The gas coming out of the RCC 4220 is directed through a residue gas conditioner (RGCS) 4250 baghouse 4254 to remove particulates and is cooled by a heat exchanger 4256 before entering an activated carbon bed 4258. The baghouse 4254 is also periodically purged based on pressure drop across the system. The residue collected in the RGCS baghouse 4254 is disposed by appropriate means. The combustible gas exiting from the RGCS 4250 as a secondary gas stream is sent back to the main GCS system 6200 to fully utilize the recovered energy.

SynGas Regulation System

The cleaned and cooled syngas from the GCS 6200 enters a gas regulation system. In this example, the gas regulation system is a syngas regulation system (SRS) 7200 designed to ensure that the syngas flowing to the downstream gas engines 9260 is of consistent gas quality. The SRS 7200 serves to smooth out short-term variations in gas composition (primarily its low heating value—LHV) and its pressure. While the downstream gas engines 9260 will continue to run and produce electricity even with short-term variations in the LHV or pressure of the syngas, it may deviate from its threshold emission limits due to poor combustion or poor fuel to air ratio.

Figure 56:
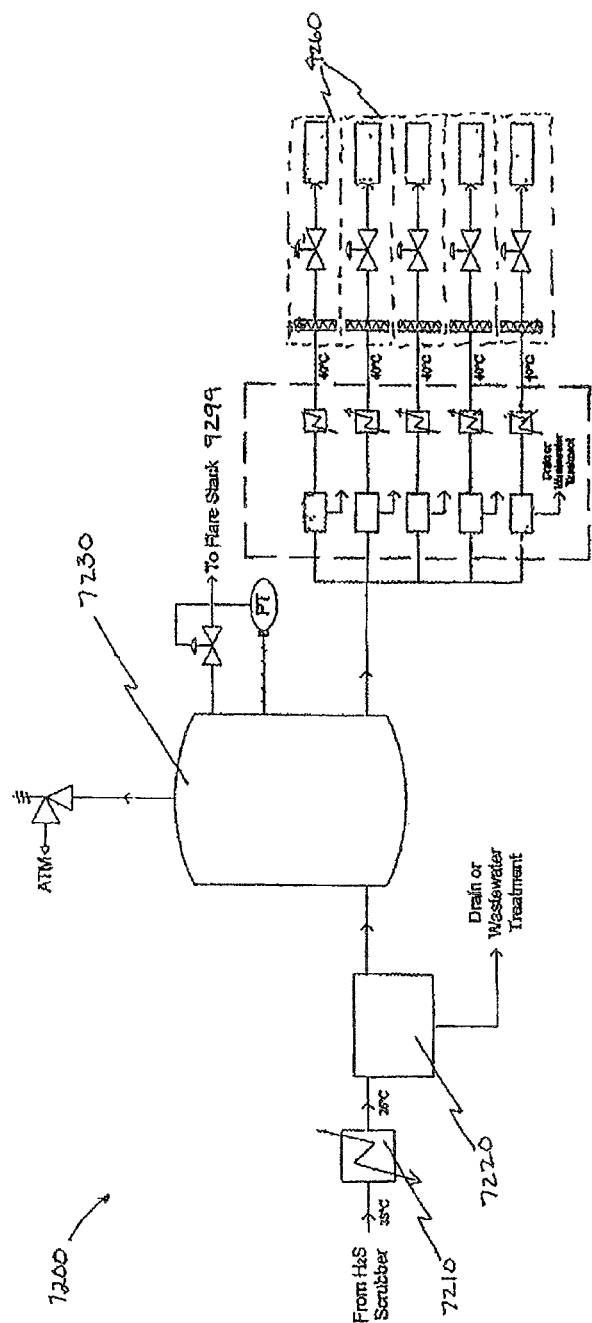
FIG. 56 is an illustration of a gas homogenization system, in accordance with one embodiment of the invention, where gas is delivered from a single source to a single homogenization chamber and then delivered to multiple engines, each engine having its own gas/liquid separator and heater.

Referring to FIG. 56, the SRS 7200 comprises a chiller 7210, a gas/liquid separator 7220 and a homogenization chamber (HC) 7230. The gas is heated on the exit of the gas storage prior to the gas engines 9260 to meet engine temperature requirements.

Two types of homogenization chambers (HC) are available: a fixed volume HC and a variable volume HC. The latter is typically more useful to reduce flow and pressure fluctuation while the former is more useful to reduce LHV fluctuations. LHV fluctuations are more prominent in our application due to the nature of the MSW feedstock. A fixed volume HC is also typically more reliable than variable volume in terms of its construction and maintenance.

Figure 57:
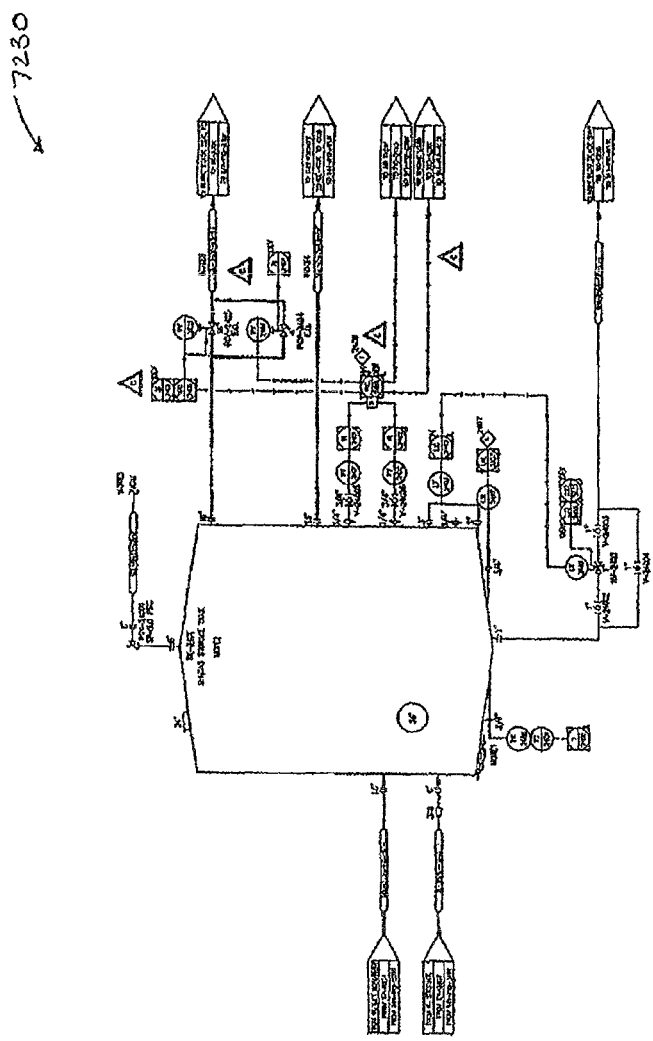
FIG. 57 is an illustration of a fixed-volume homogenization chamber, in accordance with an embodiment of the invention.

FIG. 57 shows the schematic of the homogenization chamber (HC) 7230 used in this implementation. It is designed to hold about 2 minutes of syngas flow. This hold up time meets the gas engine guaranteed norms on LHV fluctuation specifications of about 1% LHV fluctuation/30 sec. The residence time up to the gas analyzer 8130 is typically about 30 sec (including analysis and feedback). The maximum LHV fluctuation is typically about 10%. Thus, to average this out and get 3% LHV fluctuation, >1.5 min storage is needed. The 2 min storage allows for some margin.

The HC 7230 is operated at a range of 2.2 to 3.0 psig to meet the fuel specifications of the downstream gas engines 9260. The exiting gas pressure is kept constant using a pressure control valve. The HC 7230 is designed for a maximum pressure of 5 psig and a relief valve is installed to handle unusual overpressure scenarios.

The 2 min hold up time of the HC 7230 also provides enough storage to reduce pressure fluctuations. For our design, the allowable pressure fluctuation for the gas engine 9260 is 0.145 PSI/sec. In the case of a downstream failure of the gas engine 9260, a buffer may be required (depending on control system response time and 30-35 sec gas resident times) to provide time to slow down the process or to flare the excess gas.

Typical syngas flow rate into the HC 7230 is at ~8400 Nm3/hr. Therefore, for a hold up time of 2 min, the HC's volume has to be about 280 m3.

As some water will condense out of the syngas, a bottom drain nozzle is included in the design of the HC 7230. To assist in the drainage of the HC 7230, its bottom is intentionally designed to not be flat, but as a conical bottom with a skirt. Traced/insulated drain piping is used to form the drain flange. As the water within the HC 7230 has to gravity drain to the floor drain, the HC 7230 is kept slightly elevated.

The HC 7230 is designed to meet the following design requirements.

| | |
|---|---|
| Normal/Maximum Inlet Temperature | 35° C./40° C. |
| Normal/Maximum Operating Pressure | 1.2 psig/3.0 psig |
| Normal/Maximum Gas Inlet Flow Rate | 7000 $Nm^3$/hr/8400 $Nm^3$/hr |
| Normal/Maximum Gas Outlet Flow Rate | 7000 $Nm^3$/hr/8400 $Nm^3$/hr |
| Relative Humidity | 60%-100% |
| Storage Volume | 290 $m^3$ |
| Mechanical Design Temperature | −40° C. to 50° C. |
| Mechanical Design Pressure | 5.0 psig |

The material used for the HC 7230 has to take into account both the mechanical design requirements above and the typical gas composition given below. Corrosion is particularly a concern due to the presence of water, HCl, and $H_2S$.

| | |
|---|---|
| $N_2$ | 47.09% |
| $CO_2$ | 7.44% |
| $H_2S$ | 20 ppm |
| $H_2O$ | 3.43% |
| CO | 18.88% |
| $H_2$ | 21.13% |
| $CH_4$ | 0.03% |
| HCl | 5 ppm |

The gas engine 9260 design requires that the inlet gas be of a specific composition range at a specified relative humidity. Therefore, the cleaned gas that exits the $H_2S$ scrubber 6270 is sub-cooled from 35° C. to 26° C. using a chiller 7210. Any water that is formed due to the condensation of the gas stream is removed by the gas/liquid separator 7220. This ensures that the syngas has a relative humidity of 80% once reheated to 40° C., a typical requirement for gas engines 9260.

A gas blower 6250 is used to withdraw syngas from the system by providing adequate suction through all the equipment and piping as per specifications below. The blower design took heed to good engineering practice and all applicable provincial and national codes, standards and OSHA guidelines. Operation of the blower 6250 was at about 600 Volts, 3 phase, and 60 Hz.

The gas blower 6250 was designed to meet following functional requirements.

| | |
|---|---|
| Normal gas inlet temperature | 35° C. |
| Normal gas suction pressure | −1.0 psig |
| Normal gas flow rate | 7200 Nm$^3$/hr |
| Maximum gas flow rate | 9300 Nm$^3$/hr |
| Maximum gas suction temperature | 40° C. |
| Normal discharge pressure | 3.0 psig |
| Normal discharge temperature (after gas cooler) | <35° C. |
| Mechanical design pressure | 5.0 psig |
| Relative Humidity of gas at blower inlet | 100% |
| Gas Molecular Weight | 23.3 |
| Cooling water supply temperature (product gas cooler) | 29.5° C. |
| Maximum acceptable gas discharge temperature (after product gas cooler) | 40° C. |
| Turn down ratio | 10% |

The typical gas composition (wet basis) drawn is as follows:

| | |
|---|---|
| $CH_4$ | 0.03% |
| CO | 18.4% |
| $CO_2$ | 7.38% |
| $H_2$ | 20.59% |
| Normal/Max $H_2S$ | 354/666 ppm |
| $H_2O$ | 5.74% |
| Normal/Max HCl | 5 ppm/100 ppm |
| $N_2$ | 47.85% |

As the syngas is flammable and creates an explosive mixture with air, the blower 6250 is configured such that there is minimal to no air intake from the atmosphere, and minimal to no gas leak to the atmosphere. All service fluids, i.e., seal purges are done with nitrogen and a leak-free shaft seal is used. Advanced leak detection systems are employed to monitor leaks in either direction.

Since the blower 6250 works in an environment where explosive gases may be present, all instruments and electrical devices installed on syngas pipes or within about 2 meter distance are designed for the classification of Class 1, zone 2.

For ensuring reliability, proper access for inspection and maintenance is provided, as is access to isolate and correct faults quickly. While the blower 6250 can be operated continuously (24/7), frequent start/stop operation is more common during process stabilization are contemplated.

The material of construction was chosen based on design conditions and gas composition. For example, electrical circuit boards, connectors and external components were coated or otherwise protected to minimize potential problems from dirt, moisture and chemicals. Control panels and switches are of robust construction, designed to be operated by personnel with work gloves.

Generally, variable speed drive (VSD) with a flow range of 10% to 100% is employed for motor control. Over-voltage and overload protection are included. The motor status, on/off operation and change of speed are monitored and controlled remotely through the distributed control system (DCS).

Once the regulated gas exits the HC 7230, it is heated to the engine requirement and directed to the gas engines 9260.

Gas Engines

Five reciprocating GE Jenbacher gas engines 9260 with 1 MW capacity each are used to produce electricity. So, the full capacity of electricity generation is 5 MW. Optionally, any of the gas engines 9260 can be turned off depending on the overall requirements. The gas engine 9260 is capable of combusting low or medium heating value syngas with high efficiency and low emissions. However, due to the relatively low gas heating value (as compared to fuels such as natural gas) the gas engines 9260 have been de-rated to operate around 700 kW at their most efficient operating point. Optionally, the downstream application can be expanded to include another gas engines 9260 to make a total of six.

Flare Stack

An enclosed flare stack 9299 will be used to burn syngas during start-up, shut-down and process stabilization phases. Once the process has been stabilized the flare stack 9299 will be used for emergency purposes only. The flare stack 9299 is designed to achieve a destruction efficiency of about 99.99%.

Control System

In this implementation, the gasification system 120 of the present example comprises an integrated control system for controlling the gasification process implemented therein, which may include various independent and interactive local, regional and global processes. The control system may be configured to enhance, and possibly optimize the various processes for a desired front end and/or back end result.

A front-to-back control scheme could include facilitating the constant throughput of feedstock, for example in a system configured for the gasification of MSW, while meeting regulatory standards for this type of system. Such front-to-back control scheme could be optimized to achieve a given result for which the system is specifically designed and/or implemented, or designed as part of a subset or simplified version of a greater control system, for instance upon start-up or shut-down of the process or to mitigate various unusual or emergency situations.

A back-to-front control scheme could include the optimization of a product gas quality or characteristic for a selected downstream application, namely the generation of electricity via downstream gas engines 9260. While the control system could be configured to optimize such back-end result, monitoring and regulation of front-end characteristics could be provided in order to ensure proper and continuous function of the system in accordance with regulatory standards, when such standards apply.

The control system may also be configured to provide complimentary results which may be best defined as a combination of front-end and back-end results, or again as a result flowing from any point within the gasification system 120.

In this implementation, the control system is designed to operate as a front-to-back control system upon start-up of the gasification process, and then progress to a back-to-front control system when initial start-up perturbations have been sufficiently attenuated. In this particular example, the control system is used to control the gasification system 120 in order to convert feedstock into a gas suitable for a selected downstream application, namely as a gas suitable for consumption by a gas engine 9260 in order to generate electricity. In general, the control system generally comprises one or more sensing elements for sensing various characteristics of the gasification system 120, one or more computing platforms for computing one or more process control parameters conducive to maintaining a characteristic value representative of the sensed characteristic within a predetermined range of such values suitable for the downstream application, and one or more response elements for operating process devices of the gasification system 120 in accordance with these parameters.

For example, one or more sensing elements could be distributed throughout the gasification system 120 for sensing characteristics of the syngas at various points in the process. One or more computing platforms communicatively linked to these sensing elements could be configured to access characteristic values representative of the sensed characteristics, compare the characteristic values with predetermined ranges of such values defined to characterize the product gas as suitable for the selected downstream application, and compute the one or more process control parameters conducive to maintaining these characteristic values within these predetermined ranges. The plurality of response elements, operatively linked to one or more process devices and/or modules of the gasification system operable to affect the process and thereby adjust the one or more characteristics of the product gas, can be communicatively linked to the one or more computing platforms for accessing the one or more computed process control parameters, and configured to operate the one or more processing devices in accordance therewith.

The control system may also be configured to provide for an enhanced front-end result, for example, for an enhanced or constant consumption and conversion rate of the input feedstock, or again as part of start-up, shut-down and/or emergency procedure, or again, configured to implement the process of the gasification system 120 so to achieve a predetermined balance between front-end benefits and back-end benefits, for instance enabling the conversion of the feedstock to produce a product gas suitable for a selected downstream application, while maximizing throughput of feedstock through the converter. Alternative or further system enhancements could include, but are not limited to, optimising the system energy consumption, for instance to minimise an energetic impact of the system and thereby maximise energy production via the selected downstream application, or for favouring the production of additional or alternative downstream products such as consumable product gas(es), chemical compounds, residues and the like.

Figure 58:
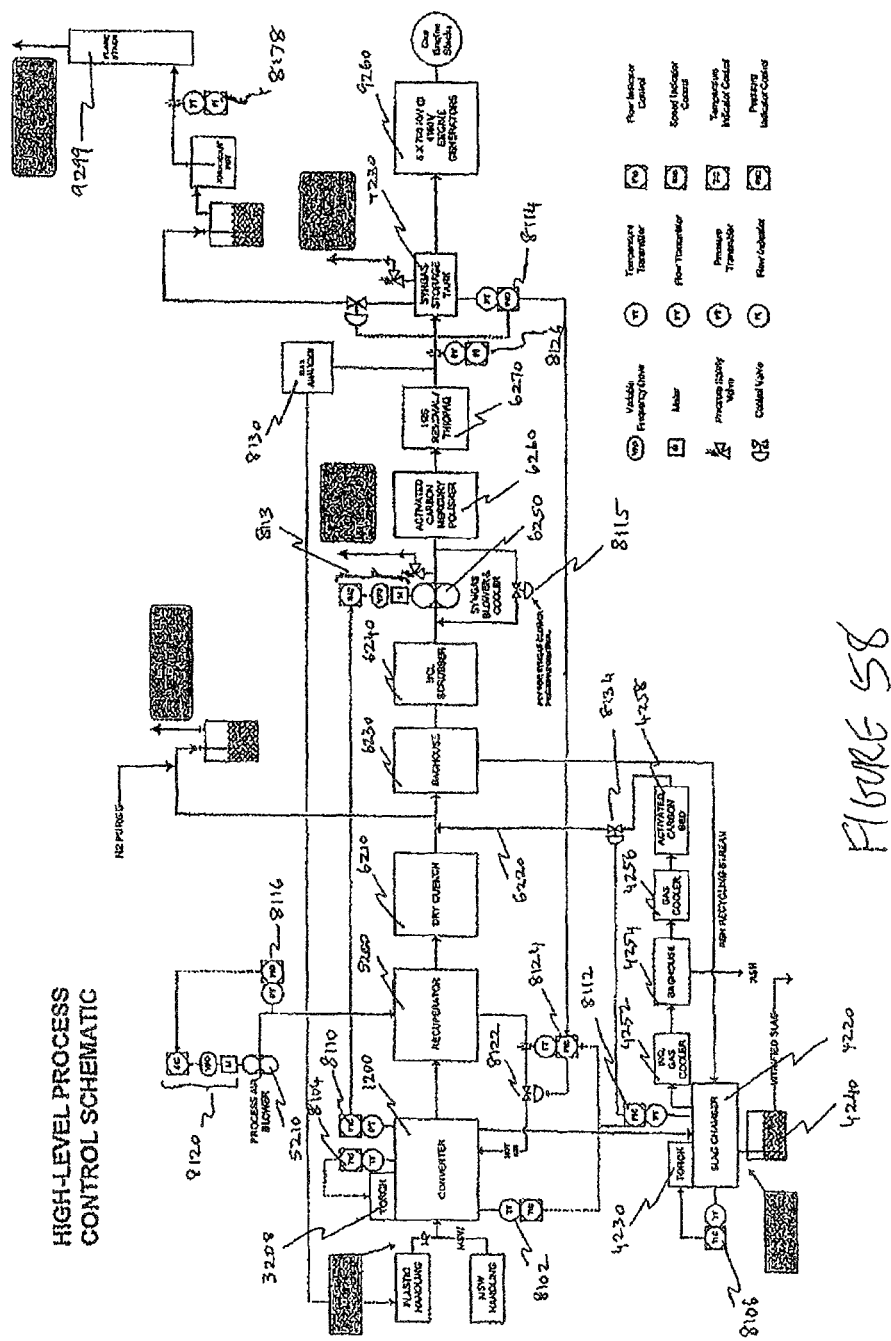
FIG. 58 is a high-level schematic diagram of a gasification system and control system thereof.
Figure 59:
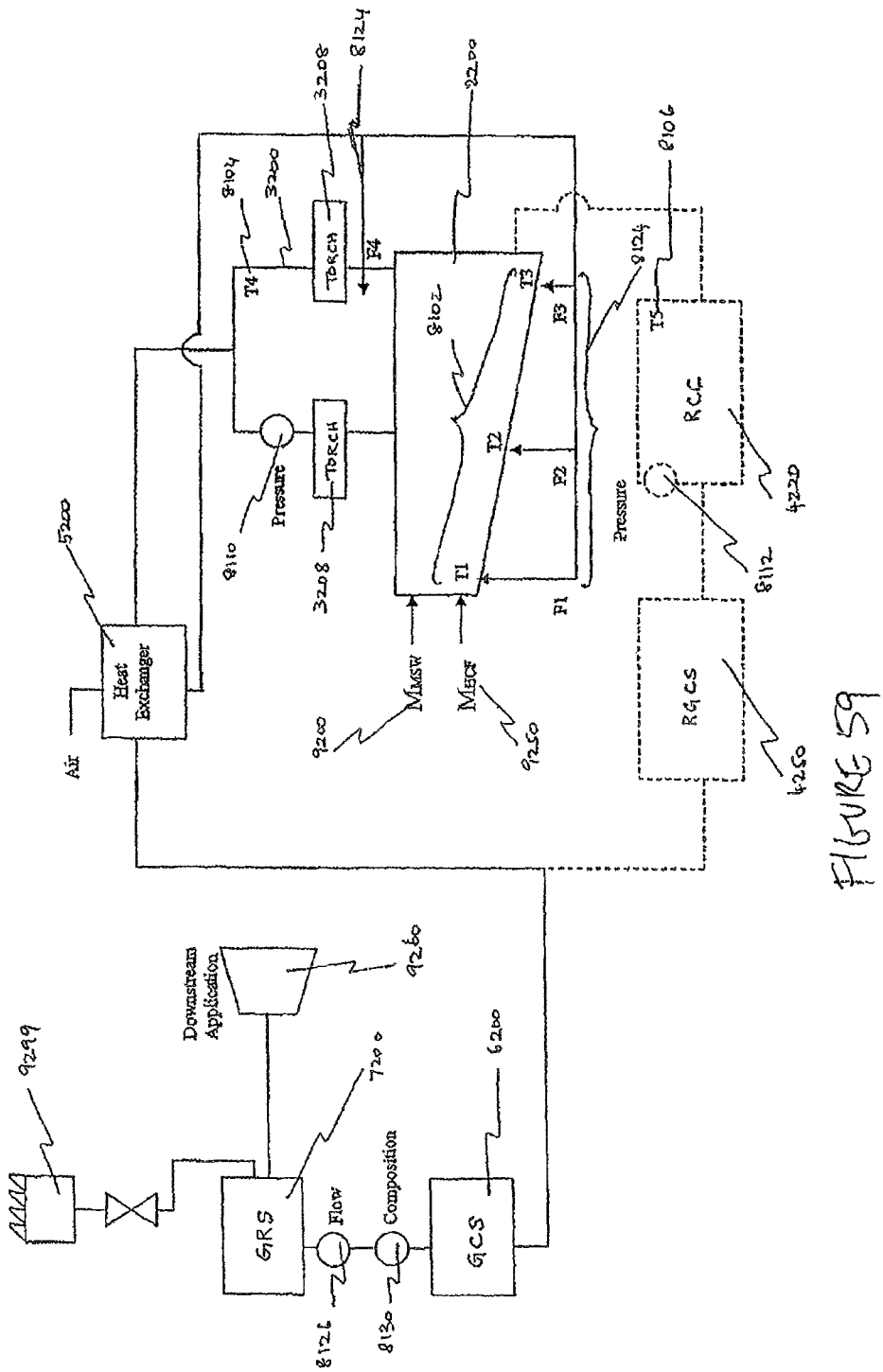
FIG. 59 is an alternative diagrammatic representation of the gasification and control systems of FIG. 58.

A high-level process control schematic is provided for this example in FIG. 58, wherein the process to be controlled is provided by the gasification system 120 described above. FIG. 59 provides an alternative depiction of the gasification system 120 and control system of FIG. 22 to identify exemplary characteristics and sensing elements associated therewith. As described above, the gasification system 120 comprises a converter 1200, comprising a primary chamber, a secondary chamber, and GRS 3200 in accordance with the present example, for converting the one or more feedstocks (e.g. MSW and plastics) into a syngas and a residue product. The system 120 further comprises a slag chamber (RCS) 4200 and a heat exchanger 5200 conducive to recuperating heat form the syngas and, in this example, using this recuperated heat for heating the air input additive used in the converter 1200. A gas conditioning system (GCS) 6200 for conditioning (e.g cooling, purifying and/or cleaning) the syngas is also provided, and a SRS 7200 used for at least partially homogenizing the syngas for downstream use. As depicted herein, residue may be provided to the RCS 4200 from both the converter 1200 and the GCS 6200, the combination of which being conditioned to yield a solid product (e.g. vitrified slag 4203) and a syngas to be conditioned and combined with the converter syngas for further conditioning, homogenization and downstream use.

In FIGS. 58 and 59, various sensing and response elements are depicted and configured to provide various levels of control for the gasification system 120. As discussed hereinabove, certain control elements may be used for local and/or regional system controls, for example in order to affect a portion of the process and/or subsystem thereof, and therefore, may have little or no effect on the overall performance of the system. For example, while the GCS 6200 may provide for the conditioning and preparation of the syngas for downstream use, its implementation, and variations absorbed thereby, may have little effect on the general performance and output productivity of the gasification system 120.

On the other hand, certain control elements may be used for regional and/or global system controls, for example in order to substantially affect the process and/or gasification system 120 as a whole. For example, variation of the feedstock input via the MSW handling system 9200 and/or plastics handling means 9250 may have a significant downstream effect on the product gas, namely affecting a change in composition and/or flow, as well as affect local processes within the converter 1200. Similarly, variation of the additive input rate, whether overall or discretely for different sections of the converter 1200, may also have a significant downstream effect on the product gas, namely to the gas composition and flow. Other controlled operations, such as reactant transfer sequences within the converter 1200, airflow distribution adjustments, plasma heat source power variations and other such elements may also effect characteristics of the product gas and may thus be used as a control to such characteristics, or again be accounted for by other means to reduce their impact on downstream application.

In FIGS. 58 and 59, various sensing elements are depicted and used in the present example to control various local, regional and global characteristics of the gasification process. For instance, the gasification system 120 comprises various temperature sensing elements for sensing a process temperature at various locations throughout the process. In FIG. 58, one or more temperature sensing elements are provided for respectively detecting temperature variations within the converter 1200, in relation to the plasma heat source 3208, and in relation to the slag melting process in RCS 4200. For example, independent sensing elements (commonly identified by temperature transmitter and indicator control 8102 of FIG. 58) may be provided for sensing temperatures T1, T2 and T3 associated with the processes taking place within Stages 1, 2 and 3 of the primary chamber 2200 (e.g. see FIG. 59). An additional temperature sensing element 8104 may be used to sense temperature T4 (e.g. see FIG. 59) associated with the reformulating process of the GRS 3200 and particularly associated with the output power of the plasma heat source 3208. In this example, a temperature sensing element 8106 is also provided for sensing a temperature within the RCC 4220 (e.g. temperature T5 of FIG. 59), wherein this temperature is at least partially associated with the output power of the slag chamber plasma heat source 4230. It will be appreciated that other temperature sensing elements may also be used at various points downstream of the converter 1200 for participating in different local, regional and/or global processes. For example, temperature sensing elements can be used in conjunction with the heat exchanger 5200 to ensure adequate heat transfer and provide a sufficiently heated air additive input to the converter 1200. Temperature monitors may also be associated with the GCS 6200 to ensure gases conditioned thereby are not too hot for a given sub-process, for example. Other such examples should be apparent to the person skilled in the art.

The gasification system 120 further comprises various pressure sensing elements operatively disposed throughout the gasification system 120. For instance, a pressure sensing element (depicted as pressure transmitter and indicator control 8110 in FIG. 58) is provided for sensing a pressure within the converter 1200 (depicted in the example of FIG. 59 as particularly associated with GRS 3200), and operatively associated with blower 6500 via speed indicator control, variable frequency drive and motor assembly 8113 for maintaining an overall pressure within the converter 1200 below atmospheric pressure; in this particular example, the pressure within the converter 1200, in one embodiment, is continuously monitored at a frequency of about 20 Hz and regulated accordingly. In another embodiment, the blower is maintained at a frequency of about 20 Hz or above in accordance with operational requirements; when blower rates are required below 20 Hz an override valve may be used temporarily. Pressure sensing element 8116, is also provided for monitoring input air pressure to the heat exchanger 5200 and is operatively linked to blower 5210 for regulating same via speed indicator control, variable frequency drive and motor assembly 8120. A pressure control valve 8115 is provided as a secondary control to override and adjust pressure within the system when the syngas blower speed 6250 falls below the blower's minimum operating frequency.

Another pressure sensing element 8114 is further provided with the SRS 7200 and operatively linked to control valve 7500 for controlled and/or emergency release of syngas via flare stack 9299 due to excess pressure, for example during start-up and/or emergency operations. This pressure sensing element 8114 is further operatively linked to control valve 8122 via flow transmitter and control indicator 8124 to increase a process additive input flow to the converter 1200 in the event that insufficient syngas is being provided to the SRS 7200 to maintain continuous operation of the gas engines 9260, for example. This is particularly relevant when the control system is operated in accordance with a back-to-front control scheme, as will be described in greater detail below. Note that in FIG. 44, the air flow sensing element 8124 and control valve 8122 are used to regulate the additive air flows to Stages 1, 2 and 3 of the primary chamber 2200, as depicted by respective flows F1, F2 and F3, and additive air flow to the GRS 3200, as depicted by flow F4, wherein relative flows are set in accordance with a pre-set ratio defined to substantially maintain pre-set temperature ranges at each of the process stages. For example, a ratio F1:F2:F3:F4 of about 36:18:6:40 can be used to maintain relative temperatures T1, T2 and T3 within ranges of about 300-600° C., 500-900° C. and 600-1000° C. respectively, or optionally within ranges of about 500-600° C., 700-800° C. and 800-900° C., respectively, particularly upon input of additional feedstock to compensate for increased combustion due to increased volume, as described below.

The system 120 also comprises various flow sensing elements operatively disposed throughout the system 120. For instance, as introduced above, a flow sensing element 8124 is associated with the air additive input to the converter 1200 and operatively linked to the control valve 8122 for adjusting this flow, for example in response to a detected pressure drop within the SRS 7200 via sensing element 8114. A flow sensing element 8126 is also provided to detect a syngas flow to the SRS 7200, values derived from which being used to regulate both an air additive input rate as a fast response to a decrease in flow, and adjust a feedstock input rate, for example in accordance with the currently defined fuel to air ratio (e.g. the (MSW+plastics):(Total additive air input) ratio currently in use), via MSW and/or plastics feeding mechanisms 9200 and 9250 respectively, for longer term stabilisation; this again is particularly useful when the system is operated in accordance with a back-to-front control scheme, as described below. In this example the air to fuel ratio is generally maintained between about 0 to 4 kg/kg, and during normal operation is generally at about 1.5 kg/kg. A flow sensing element 8128 may also be provided to monitor flow of excess gas to the flare stack 9299, for example during start-up, emergency and/or front-to-back control operation, as described below.

FIGS. 43 and 44 also depict a gas analyser 8130 for analyzing a composition of the syngas as it reaches the SRS 7200, the control system being configured to use this gas composition analysis to determine a syngas fuel value and carbon content and adjust the fuel to air ratio and MSW to plastics ratio respectively and thereby contribute to regulate respective input rates of MSW and plastics. Once again, this feature is particularly useful in the back-to-front control scheme implementation of the control system, described in greater detail below.

Not depicted in FIGS. 58 and 59, but described above with reference to an exemplary embodiment of the primary chamber 2200, is the inclusion of various sensing elements configured for detecting a height of reactant within the primary chamber 2200 at various locations, namely at steps 1, 2 and 3 2212, 2214 & 2216.

These sensing elements may be used to control the motion of the lateral transfer means, such as carrier rams 2228, 2230 & 2232 to enhance effective processing within the primary chamber 2200. In such an example, a carrier ram sequence controller would both affect computation of an actual feedstock input rate, as would variation in the desired feedstock input rate need to be communicated to the carrier ram sequence controller. Namely, the carrier ram sequence controller can be used to adjust a feedstock input rate, and the control system, in communication with the carrier ram sequence controller, may be used to compensate for variations induced by changes in the carrier ram sequence (e.g. to address issues raised due to various detected reactant distributions) in downstream processes.

FIG. 45 provides a control flow diagram depicting the various sensed characteristic values, controllers (e.g. response elements) and operating parameters used by the control system of the present example, and interactions there between conducive to promoting proper and efficient processing of the feedstock. In this figure:

1. a converter solids levels detection module 8250 is configured to cooperatively control a transfer unit controller 8252 configured to control motion of the transfer unit(s) 8254 and cooperatively control a total MSW+HCF feed rate 8256;
2. a syngas (product gas) carbon content detection module 8258 (e.g. derived from gas analyser 8130) is operatively coupled to a MSW:HCF ratio controller 8260 configured to cooperatively control an MSW/HCF splitter 8262 for controlling respective MSW and HCF feed rates 8264 and 8266 respectively;
3. a syngas (product gas) fuel value determination module 8268 (e.g. LHV=c1*[$H_2$]+c2*[CO], where c1 and c2 are constants and where [$H_2$] and [CO] are obtained from the syngas analyser 8130) is operatively coupled to a Fuel:Air ratio controller 8270 for cooperatively controlling the total MSW+HCF feed rate 8256 directed to the MSW/HCF splitter 8262 and the transfer unit controller 8252;
4. a syngas flow detection module 8272 is operatively coupled to a total airflow controller 8274 for controlling a total airflow 8276 and cooperatively control the total MSW+HCF feed rate 8256; and 5. a process temperature detection module 8278 is operatively coupled to a temperature controller(s) 8280 for controlling an airflow distribution 8282 (e.g. F1, F2, F3 and F4 of FIG. 2) and plasma heat 8284 (e.g. via PHS 1002).

In this configuration, in order to determine the amount of air additive to input into the gasification system 120 to obtain a syngas composition within an appropriate range for the downstream application, or again within a range conducive to increasing the energetic efficiency and/or consumption of product gas, the control system may be configured to compute a control parameter based on an acquired characteristic value for the LHV (e.g. from analysis of [$H_2$] and [CO] of syngas). For instance, by setting the temperature and pressure constant, or at a desired set point, a global system parameter may be defined empirically such that the air input parameter may be estimated with sufficient accuracy using a linear computation of the following format:

$$[LHV] = a[Air]$$

wherein a is an empirical constant for a particular system design and desired output characteristics. Using this method, it has been demonstrated that the gasification system 120 of the present example may be operated efficiently and continuously to meet regulatory standards while optimising for process efficiency and consistency.

FIG. 46 provides an alternative control flow diagram depicting the various sensed characteristic values, controllers (e.g. response elements) and operating parameters that can be used by a slightly modified configuration of the control system and interactions there between conducive to promoting proper and efficient processing of the feedstock.

In this figure:
1. a converter solids levels detection module 8350 is configured to cooperatively control a transfer unit controller 8352 configured to control motion of the transfer unit(s) 8354 and cooperatively control a total MSW+HCF feed rate 8356;
2. a syngas (product gas) carbon content detection module 8358 (e.g. derived from gas analyser 8130) is operatively coupled to a MSW:HCF ratio controller 8360 configured to cooperatively control an MSW/HCF splitter 8362 for controlling respective MSW and HCF feed rates 8364 and 8366 respectively;
3. a syngas (product gas) [$H_2$] content detection module 8367 (e.g. obtained from the syngas analyser 8130) is operatively coupled to a Fuel:Air ratio controller 8370 for cooperatively controlling the total MSW+HCF feed rate 8356 for cooperatively controlling the transfer unit controller, the MSW/HCF splitter 8362, the steam flow calculation and the total airflow;
4. a syngas (product gas) [CO] content detection module 8369 (e.g. obtained from the syngas analyser 8130) is operatively coupled to a Fuel:Steam ratio controller 8371 for cooperatively controlling the steam flow calculation for controlling the steam addition rate (note: steam additive input mechanism may be operatively coupled to the converter 1200 (not shown in FIGS. 1 and 2) and provided to compliment air additive and participate in refining the chemical composition of the syngas);
5. a syngas flow detection module 8372 is operatively coupled to a total airflow controller 8374 for cooperatively controlling a total airflow 8376 and cooperatively controlling the total MSW+HCF feed rate 8356; and
6. a process temperature detection module 8378 is operatively coupled to a temperature controller 8380 for controlling an airflow distribution 8382 (e.g. F1, F2, F3 and F4 of FIG. 44) and plasma heat 8384 (e.g. via PHS 1002).

In this configuration, in order to determine the amount of air additive and steam additive to input into the gasification system 120 to obtain a syngas composition within an appropriate range for the downstream application, or again within a range conducive to increasing the energetic efficiency and/or consumption of product gas, the control system may be configured to compute control parameters based on acquired characteristic values for [$H_2$] and [CO]. For instance, by setting the temperature and pressure constant, or at a desired set point, global system parameters may be defined empirically such that the air and steam input parameters may be estimated with sufficient accuracy using a linear computation of the following format:

$$\begin{bmatrix} H_2 \\ CO \end{bmatrix} = \begin{bmatrix} a & b \\ c & d \end{bmatrix} \begin{bmatrix} Air \\ Steam \end{bmatrix}$$

wherein a, b, c and d are empirical constants for a particular system design and desired output characteristics. The person of skill in the art will appreciate that although simplified to a linear system, the above example may be extended to include additional characteristic values, and thereby provide for the linear computation of additional control parameters. Higher order computations may also be considered to refine computation of control parameters as needed to further restrict process fluctuations for more stringent downstream applications. Using the above, however, it has been demonstrated that the gasification system 120 of the present example may be operated efficiently and continuously to meet regulatory standards while optimizing for process efficiency and consistency.

It will be appreciated that the various controllers of the control system generally operate in parallel to adjust their respective values, which can include both absolute (e.g. total air flow) and relative values (e.g. feed to air ratio), although it is also possible for some or all of the controllers to operate sequentially.

As discussed above, a front-to-back (or supply-driven) control strategy is used in the present example during start-up operation of the system 120 where the converter 1200 is run at a fixed feed rate of MSW. Using this control scheme, the gasification system 120 allows for process variations to be absorbed by the downstream equipment such as gas engines 9260 and flare stack 9299. A small buffer of excess syngas is produced, and a small continuous flare is hence used. Any extra syngas production beyond this normal amount can be sent to the flare, increasing the amount flared. Any deficiency in syngas production first eats into the buffer, and may eventually require generator power output to be reduced (generators can be operated from 50-100% power output via an adjustable power set point) or further system adjustments to be implemented by the control system, as described below. This control scheme is particularly amenable to start-up and commissioning phases.

The main process control goals of this front-to-back control scheme comprise stabilizing the pressure in the HC 7230, stabilizing the composition of the syngas being generated, controlling pile height of material in the primary chamber 2202, stabilizing temperatures in the chamber 2202, controlling temperatures in the reformulating chamber 3202, and controlling converter process pressure.

When using GE/Jenbacher gas engines 9260, the minimum pressure of product gas is about 150 mbar (2.18 psig), the maximum pressure is about 200 mbar (2.90 psig), the allowed fluctuation of fuel gas pressure is about +/−10% (+/−17.5 mbar, +/−0.25 psi) while the maximum rate of product gas pressure fluctuation is about 10 mbar/s (0.145 psi/s). The gas engines 9260 have an inlet regulator that can handle small disturbances in supply pressure, and the holdup in the piping and HC act somewhat to deaden these changes. The control system however still uses a fast acting control loop to act to maintain suitable pressure levels. As mentioned above, the converter 1200 in this control scheme is run at sufficient MSW feed rate to generate a small buffer of excess syngas production, which is flared continuously. Therefore the HC 7230 pressure control becomes a simple pressure control loop where the pressure control valves in the line from HC 7230 to the flare stack 9299 are modulated as required to keep the HC pressure within a suitable range.

The control system generally acts to stabilize the composition of the syngas being generated. The gas engines 9260 can operate over a wide range of fuel values, provided that the rate of change is not excessive. The allowable rate of change for Lower Heating Value (LHV) relevant in this example is less than 1% fluctuation in syngas LHV per 30 second. For hydrogen based fuels, the fuel gas is adequate with as little as 15% hydrogen by itself, and the LHV can be as low as 50 btu/scf (1.86 MJ/Nm3). The system volume and HC 7230 aid in stabilizing the rate of change of LHV by providing about 2 minutes of syngas production.

In this control scheme, the product gas composition can be measured by the gas analyzer 8130 installed at the inlet of the HC 7230, or proximal thereto. Based on this measurement, the control system can adjust the fuel-to-air ratio (i.e. slightly increase/decrease MSW feed rate relative to air additive input air) in order to stabilize the gas fuel value. Increasing either the MSW or plastics feed relative to the air addition increases the fuel value of the gas. It will be appreciated, however, that this control action may have a relatively long response time depending on the overall implementation of the gasification system 120, and as such, may be tuned to prevent long-term drift rather than respond to short-term variation.

While the plastics feed is by itself a much richer fuel source (e.g. LHV of about twice that of MSW), it is typically added in a ratio of about 1:20 (0 to 14%) with the MSW, and therefore, in accordance with this example, it is not the dominant player in terms of fuel being added to the system. Since it can be uneconomical to add too much plastics to the gasification system 120, the plastics feed may be used as a trim rather than as a primary control. In general, the plastics feed is ratioed to the total feed with the ratio optionally adjusted to stabilize the total carbon exiting the gasification system 120 in the syngas, as measured by the gas analyzer 8130. This may thus have for affect to dampen fluctuations in MSW fuel value.

In addition, a reactant pile level control system may be used to aid in maintaining a stable pile height inside the converter 1200. Stable level control may prevent fluidization of the material from process air injection which could occur at low level and to prevent poor temperature distribution through the pile owing to restricted airflow that would occur at high level. Maintaining a stable level may also help maintain consistent converter residence time. A series of level switches in the primary chamber 2202 may be used, for example, to measure pile depth. The level switches in this example could include, but are not limited to, microwave devices with an emitter on one side of the converter and a receiver on the other side, which detects either presence or absence of material at that point inside the converter 1200. The inventory in the primary chamber 2200 is generally a function of feed rate and carrier ram motion (e.g. carrier ram motion), and to a lesser degree, the conversion efficiency.

In this example, the Stage 3 carrier ram(s) sets the converter throughput by moving at a fixed stroke length and frequency to discharge char from the primary chamber 2200. The Stage 2 carrier ram(s) follows and moves as far as necessary to push material onto Stage 3 and change the Stage 3 start-of-stage level switch state to "full". The Stage 1 carrier ram(s) follows and moves as far as necessary to push material onto Stage 2 and change the Stage 2 start-of-stage level switch state to "full". All carrier rams are then withdrawn simultaneously, and a scheduled delay is executed before the entire sequence is repeated. Additional configuration may be used to limit the change in consecutive stroke lengths to less than that called for by the level switches to avoid excess carrier ram-induced disturbances. The carrier rams may be moved fairly frequently in order to prevent over-temperature conditions at the bottom of the converter. In addition, full extension carrier ram strokes to the end of each stage may be programmed to occur occasionally to prevent stagnant material from building up and agglomerating near the end of the stage. It will be apparent to the person skilled in the art that other carrier ram sequences may be considered herein without departing from the general scope and nature of the present disclosure.

In order to optimize conversion efficiency, in accordance with one embodiment of the present invention, the material is maintained at as high a temperature as possible, for as long as possible. Upper temperature limits are set to avoid the material beginning to melt and agglomerate (e.g. form clinkers), which reduces the available surface area and hence the conversion efficiency, causes the airflow in the pile to divert around the chunks of agglomeration, aggravating the temperature issues and accelerating the formation of agglomeration, interferes with the normal operation of the carrier rams, and potentially causes a system shut down due to jamming of the residue removal screw 2209. The temperature distribution through the pile may also be controlled to prevent a second kind of agglomeration from forming; in this case, plastic melts and acts as a binder for the rest of the material.

In one embodiment, temperature control within the pile is achieved by changing the flow of process air into a given stage (ie. more or less combustion). For instance, the process air flow provided to each stage in the bottom chamber may be adjusted by the control system to stabilize temperatures in each stage. Temperature control utilizing extra carrier ram strokes may also be used to break up hot spots. In one embodiment, the air flow at each stage is pre-set to maintain substantially constant temperatures and temperature ratios between stages. For example, about 36% of the total air flow may be directed to stage 1, about 18% to Stage 2, and about 6% to Stage 3, the remainder being directed to the GRS (e.g. 40% of total air flow). Alternatively, air input ratios may be varied dynamically to adjust temperatures and processes occurring within each stage of the primary and secondary chambers and/or GRS 3200.

Plasma heat source power (e.g. plasma torch power) may also be adjusted to stabilize exit temperatures of the GRS 3200 (e.g. reformulating chamber output) at the design set point of about 1000 degrees C. This may be used to ensure that the tars and soot formed in the primary chamber 2202 are fully decomposed. Addition of process air into the reformulating chamber 3202 may also bear a part of the heat load by releasing heat energy with combustion of the syngas. Accordingly, the control system may be configured to adjust the flow rate of process air to keep torch power in a good operating range.

Furthermore, converter pressure may be stabilized by adjusting the syngas blower's 6250 speed, depicted proximal to the homogenization subsystem input. At speeds below the blower's minimum operating frequency, a secondary control may override and adjust a recirculation valve instead. Once the recirculation valve returns to fully closed, the primary control re-engages. In general, a pressure sensor 8110 is operatively coupled to the blower 6250 via the control system, which is configured to monitor pressure within the system, for example at a frequency of about 20 Hz, and adjust the blower speed via an appropriate response element 8113 operatively coupled thereto to maintain the system pressure within a desired range of values.

A residue melting operation is also performed in a continuous operation in a slag chamber which is directly connected to the outlet of the secondary chamber. A small stream of particulate from the bag house 6230 may also be injected into the slag chamber via the air nozzles or through a dedicated port for further processing.

The RCS 4200 is a small, refractory-lined slag melting chamber (RCC) 4220 mounted with a 300 kW plasma torch 4230 and a molten slag outlet 4226. In this example, the residue drops directly into the RCC 4220 where it is melted by close contact with the plasma torch plume 4230.

In controlling the residue processing, the power of the plasma torch 4230 may be adjusted as needed to maintain temperatures adequate for the melting operation. The RCC 4220 temperature instrumentation (e.g. temperature sensing element 8106) may include, for example, two optical thermometers (OT's) which measure the surface temperature of the surface upon which they are aimed, 3 vapour space thermocouples mounted in ceramic thermo wells above the melt pool, and 5 external skin mounted thermocouples mounted on the outer metal shell. The RCC 4220 may also include a pressure transmitter for measuring process pressure (e.g. pressure sensing element 8112) inside the RCC 4220.

One melt temperature control strategy contemplated herein is to measure the OT temperatures directly. A set point in the range of 1400-1800° C., known to be above the melting temperature of most MSW components is entered into the controller. Torch power is then adjusted as required to meet this set point.

In general, the level is not measured directly, but is inferred by both OT temperature and vapour space thermocouples. If the temperature falls below the temperature set point, this is an indication of un-melted material and interlocks will be used to momentarily slow the feed rate of residue, or to shut down the RCS 4200 as a last resort. The rate of material flow may be controlled by adjusting the RCC feed screw conveyor speed via drive motor variable frequency drives (VFD's), for example. The feed rate may be adjusted as required to ensure acceptable temperature control, within capability of melting rate of plasma torches 4230, and to prevent high levels in the RCC 4220 due to un-melted material. In general, there may be some hold-up capacity for residue in the secondary chamber, but sustained operation will depend on the RCC 4220 having adequate melting capacity matching the steady-state production of residue.

The pressure in the RCC 4220 may be monitored by a pressure transmitter tapped into the vapour space of the vessel (e.g. element 8112). In general, the operating pressure of the RCC 4220 is somewhat matched to that of the secondary chamber such that there is minimal driving force for flow of gas through the screw conveyors in either direction (flow of solid residue particles only). A control valve 8134 is provided in the gas outlet line which can restrict the flow of gas that is being removed by the downstream vacuum producer (syngas blower). A DCS PID controller calculates the valve position needed to achieve the desired operating pressure.

Beyond the start-up phase, a back-to-front control, or demand-driven control can be used where the gas engines 9260 at the back-end of the gasification system 120 drive the process. The gas engines 9260 consume a certain volume/hr of fuel depending on the energy content of the fuel gas (i.e. product gas) and the electrical power being generated. Therefore the high level goal of this control system is to ensure that adequate MSW/plastics feed enters the gasification system 120 and is converted to syngas of adequate energy content to run the generators at full power at all times, while adequately matching syngas production to syngas consumption such that flaring of syngas is reduced, or even eliminated, and the electrical power produced per ton of MSW consumed is enhanced, and preferably optimized.

In general, the front-to-back control scheme described above comprises a sub-set of the back-to-front control scheme. For instance, most if not all process control goals listed in the above scheme are substantially maintained, however the control system is further refined to reduce flaring of syngas while increasing the amount of electrical power produced per ton of MSW, or other such feedstock, consumed. In order to provide enhanced control of the process and achieve increased process efficiency and utility for a downstream application, the flow of syngas being produced is substantially matched to the fuel being consumed by the gas engines 9260; this thus reduces reduce flaring or otherwise disposition of excess product gas from the gasification system 120, and reduces the likelihood of insufficient gas production to maintain operation of the downstream application. Conceptually, the control system therefore becomes a back-to-front control (or demand-driven control) implemented such that the downstream application (e.g. gas engines/generators) drive the process.

In general, in order to stabilize syngas flow out of the converter 1200 in the short term, the air additive input flow into the converter 1200 may be adjusted, providing a rapid response to fluctuations in gas flow, which are generally attributed to variations in feedstock quality variations (e.g. variation in feedstock humidity and/or heating value). In general, effects induced by an adjustment of airflow will generally propagate within the system at the speed of sound. Contrarily, though adjustment of the MSW and/or plastics feed rate may also significantly affect system output (e.g. syngas flow), the feedstock having a relatively long residence time within the converter 1200 (e.g. up to 45 minutes or more for this particular example), system response times associated with such adjustment will generally range at about 10 to 15 minutes, which on the short term, may not be sufficient to effect the product gas in a timely manner to avoid unwanted operating conditions (e.g. flared excess gas, insufficient gas supply for optimal operation, insufficient gas supply for continuous operation, etc.). While still having a slower response than an increase in airflow, an increase in MSW feed rate may result in a faster response than an increase in plastics feed because the moisture content of MSW may produce steam in about 2 to 3 minutes.

Accordingly, adjusting total airflow generally provides the fastest possible acting loop to control pressure and thereby satisfy input flow requirements for the downstream application. In addition, due to the large inventory of material in the converter 1200, adding more air, or other such additive, to the bottom chamber does not necessarily dilute the gas proportionately. The additional air penetrates further into the pile, and reacts with material higher up. Conversely, adding less air will immediately enrich the gas, but eventually causes temperatures to drop and reaction rates/syngas flow to decrease.

Figure 60:
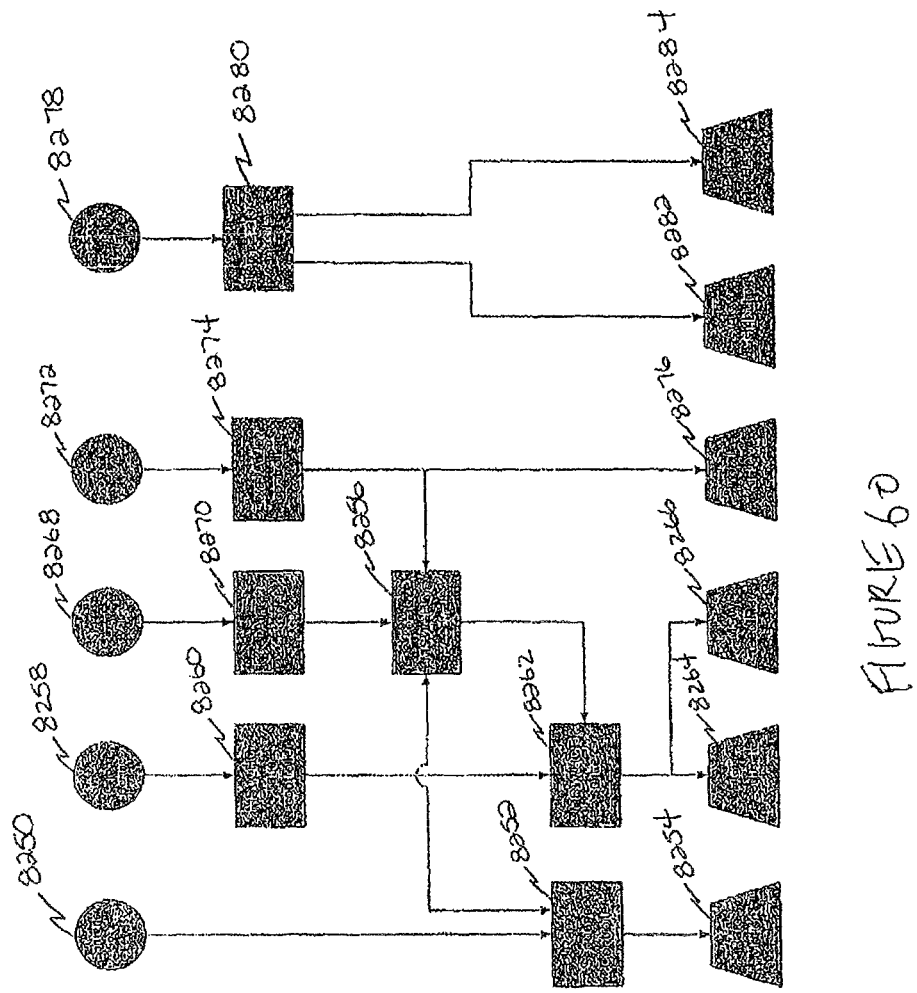
FIG. 60 is a flow diagram of a control scheme for controlling the gasification system of FIGS. 58 and 59.
Figure 61:
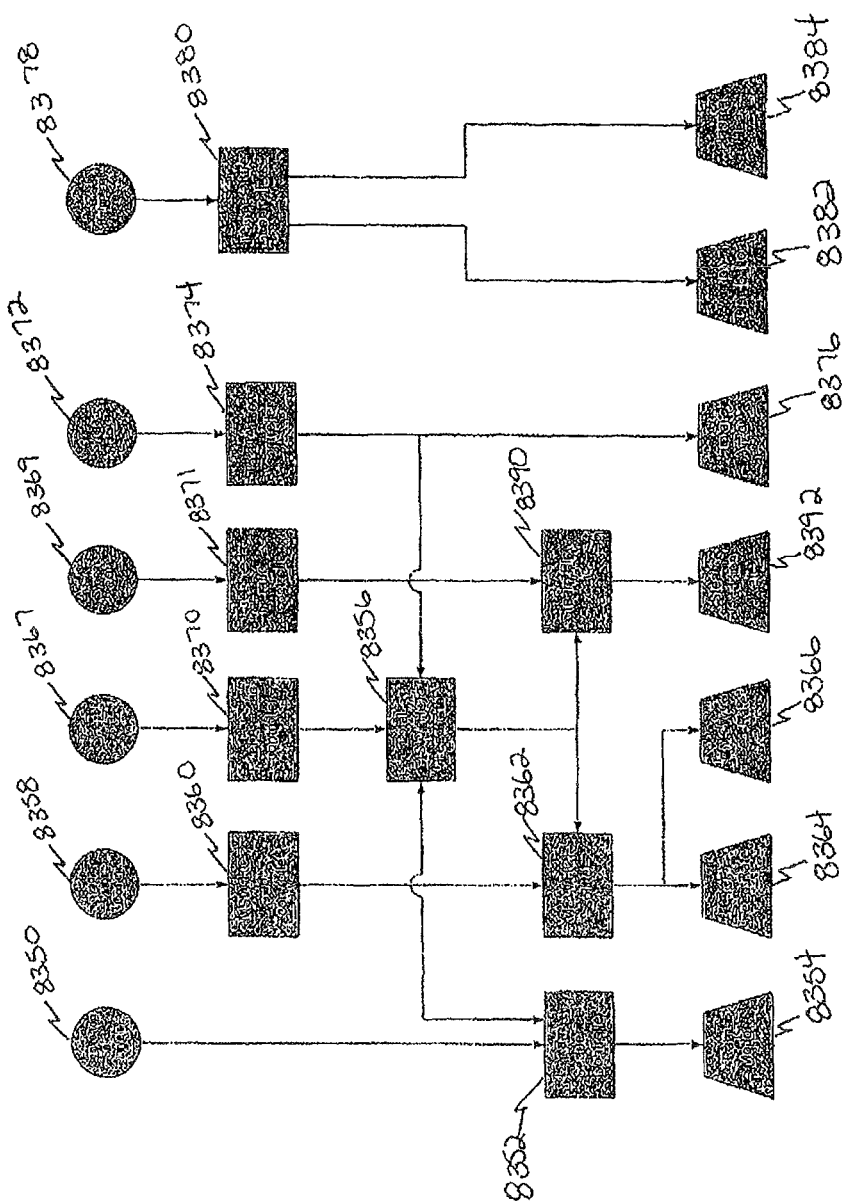
FIG. 61 is a flow diagram of an alternative control scheme for controlling the gasification system of FIGS. 58 and 59, wherein this system is further adapted for using process additive steam in a gasification process thereof.

Therefore, total airflow is generally ratioed to material feed rate (MSW+plastics) as presented in FIG. 60, whereby an increase in additive input will engender an increase in feedstock input rate. Accordingly, the control system is tuned such that the effect of increased air is seen immediately, whereas the effect of the additional feed is eventually observed to provide a longer term solution to stabilizing syngas flow. Temporarily reducing generator power output may also be considered depending on system dynamics to bridge the dead time between increasing the MSW/plastics feed rate and seeing increased syngas flow, however, this may not be necessary or expected unless faced with unusual feedstock conditions. While adjustments to airflow (the fastest acting control loop) and adjustments to the fuel to air ratio and the total fuel rate (both longer term responses) are preferred in this example to maintain suitable gas characteristics for the downstream application, the MSW to plastics feed ratio control is not necessary, but may act as an additional control used to help smooth out long term variability.

In this example, MSW moisture content generally varies between 0 and 80%, and heating values vary between about 3000 and 33000 kJ/kg, and the HC has a 2 minute residency time and generally a pressure of about 210 mbar. A variation of about +/−60 mbar is possible without exceeding the minimum supply pressure for the engine of about 150 mbar. Without the control system, the pressure can vary by up to about 1000 mbar, hence the long term flow fluctuations are actively reduced by the control system by up to 4 times (or 75%) in order to run the gas engine 9260 at constant load as desired. Furthermore, pressure fluctuations of the converter gas can reach about 25 mbar/s without the control system, which is about 2.5 times the maximum of about 10 mbar/s for the engine of this example (or about 60%). Hence, the control system of the present invention may reduce short time process variability by at least 2.5 times (60%) and long term process variability by about 4 times (75%). Use of the HC 7230 in this example can help reduce the short term variations.

EXAMPLE 2

The structure and design of the gasification facility are as described above, in that the Municipal Solid Waste (MSW) Handling System, Plastic Handling System, Gas Reformulating System (GRS), Syngas-to-air Heat Exchanger, Gas Conditioning System (GCS), Syngas Regulation System, Gas Engines and Flare Stack are substantially the same as described in Example 1.

Figure 62:
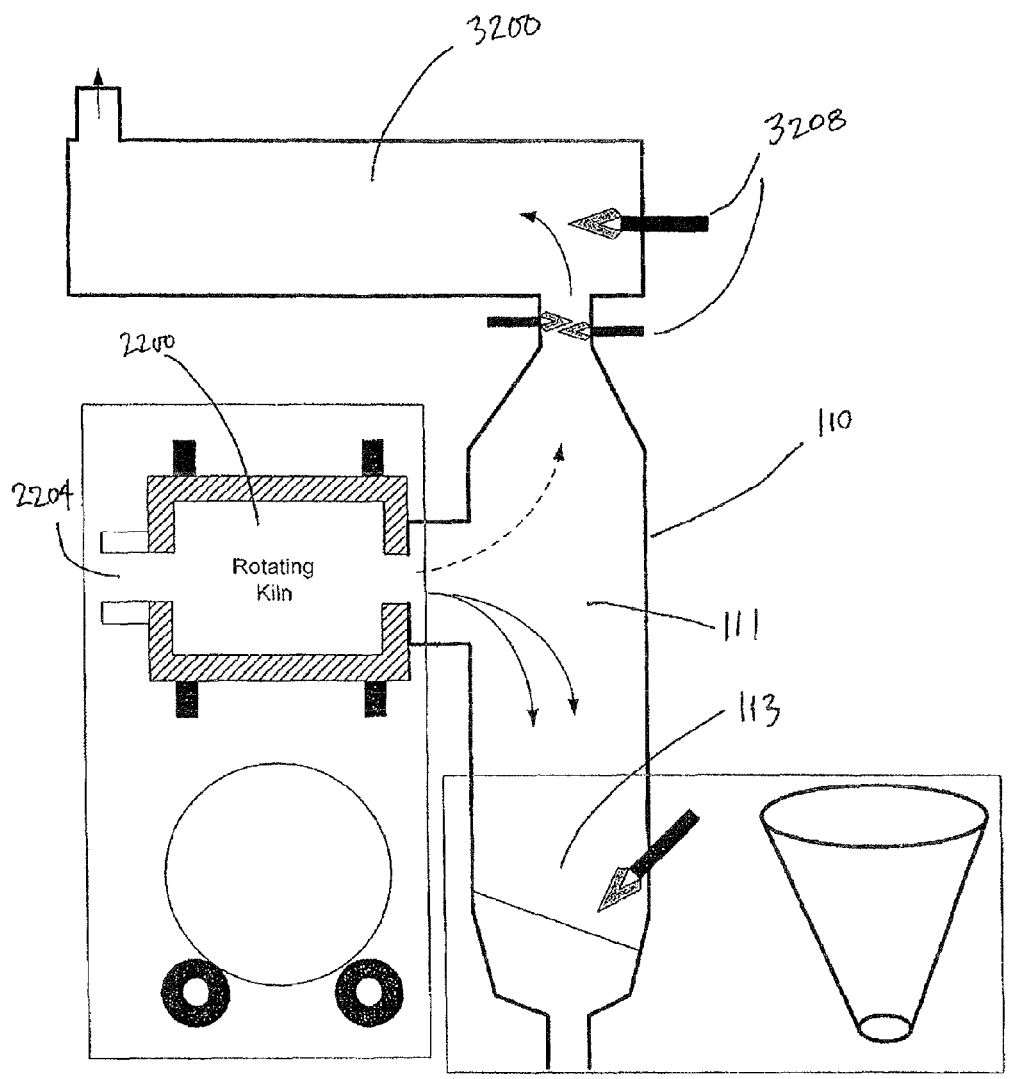
FIG. 62 is a schematic representation of the upstream elements described in Example 2.

Referring to FIG. 62, the MSW and plastics are fed into the rotating kiln primary chamber (as is known in the art) 2200 which has a feedstock input 2204 and an output which is in communication with a two-zone carbon conversion system. Processed feedstock (e.g. char) and the product gas exits the rotating kiln and enters the two-zone carbon conversion system. Unreacted carbon in the char is converted in the carbon conversion zone 111 of the carbon conversion system into a gaseous product and combines with the gas produced the rotating kiln primary chamber. The combined gases exit the two-zone carbon conversion system through the gas outlet and transits a conduit, optionally equipped with one or more plasma heat sources 3208, prior to entering the Gas Reformulating System (GRS) 3200 (as described above). The substantially carbon-free solid residue (i.e. ash) is subjected to plasma heat within the slag zone 113 of the two-zone carbon converter and is melted prior to exiting the converter.

EXAMPLE 3

The structure and design of the gasification facility are as in Example 1, except for the gasifier which is as described below.

Figure 63:
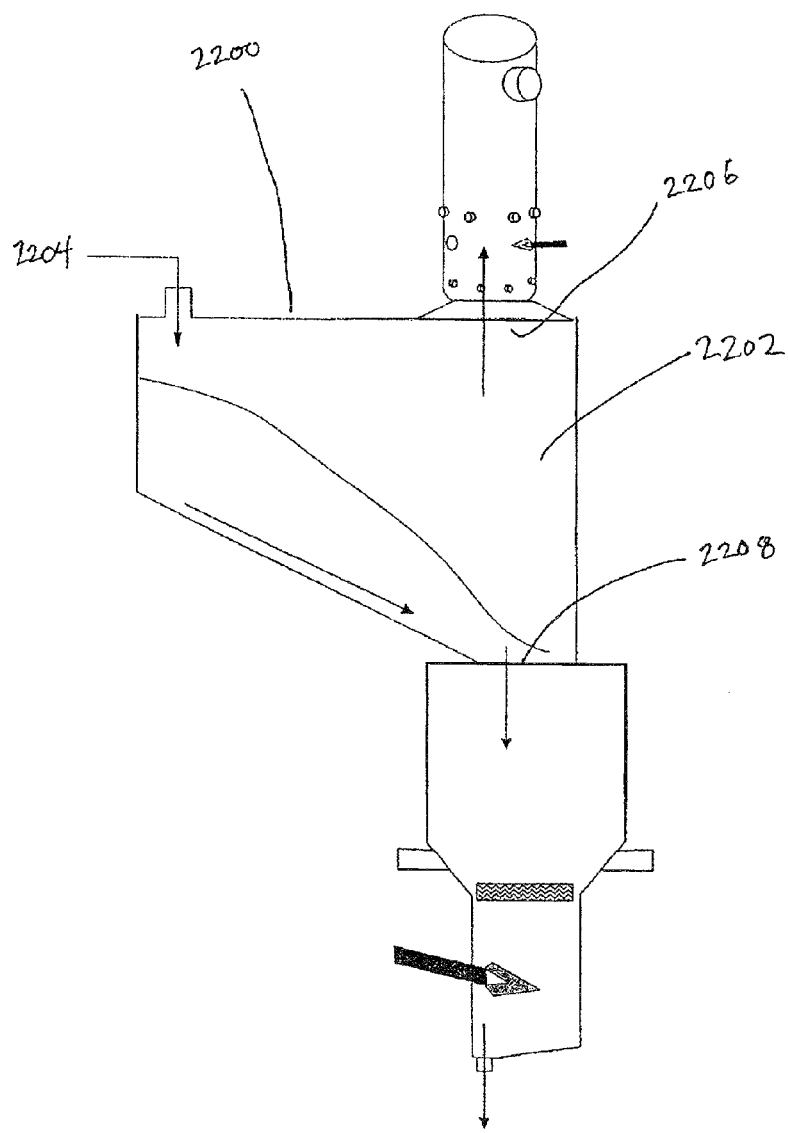
FIG. 63 is a schematic representation of the upstream elements described in Example 3.

Referring to FIG. 63, the primary chamber 2200 comprises a refractory-lined horizontally-oriented chamber 2202 having a feedstock input 2204, gas outlet 2206, a char outlet 2208, and various service 2220 and access ports 2222. The primary chamber 2202 is a refractory-lined steel weldment having a sloped floor.

The char outlet is equipped with a char extractor comprising an extractor screw 2209 which will pull the char out of the primary chamber and feed it directly into the two-zone carbon conversion system.

The refractory is a multilayer design with a high density chromia layer on the inside to resist the high temperature, abrasion, erosion and corrosion, a middle, high density alumina layer with medium temperature resistance and insulation factor and an outer very low density insboard material with very high insulation factor that can be used because it will not be exposed to abrasion of erosion. The refractory lines the metal shell of the chamber.

The floor is partially perforated 2270 through which heated air is introduced. To avoid blockage of the air holes during processing, the air hole size is selected such that it creates a restriction and thus a pressure drop across each hole. This pressure drop is sufficient to prevent waste particles from entering the holes. The holes are tapered outwards towards the upper face to preclude particles becoming stuck in a hole. In addition, the movement of the lateral transfer units may dislodge any material blocking the holes.

Movement of material along the floor is facilitated by lateral transfer. A system for lateral transfer may comprise a drag chain or conveyor system. Power for moving the drag chain or conveyor system is provided by an external mounted electric motors which drive the ram via a gearbox and roller chain system (as described in Example 1). The motor is controlled by the overall control system which can command start and stop position, speed of movement and frequency of movement.

The invention claimed is:

1. A multi-chamber system for converting carbonaceous feedstock to syngas and slag, comprising:
    one or more primary chambers for conversion of carbonaceous feedstock to a processed feedstock/char and a primary chamber gas, wherein each primary chamber comprises a feedstock inlet, a first air input means, an optional process additive input, a primary chamber gas outlet, and a processed feedstock/char outlet;
    one or more secondary chambers for conversion of processed feedstock/char to a residue and a secondary chamber gas, wherein each secondary chamber comprises a processed feedstock/char inlet for receiving processed feedstock/char from at least one of said primary chambers, a second air input means, an optional process additive input, a secondary chamber gas outlet, a residue outlet and an impedance mechanism configured to partially or intermittently occlude the residue outlet, thereby limiting or regulating the flow of material out of the secondary chamber;
    one or more gas reformulating chambers each comprising a gas reformulating zone, in fluid communication with at least one of said primary chamber and secondary chamber gas outlets for conversion of said primary chamber gas and/or said secondary chamber gas received therefrom to a processed syngas, comprising an optional process additive input, a syngas outlet, and one or more sources of reformulating heat;

one or more melting chambers for converting the residue from said secondary chambers to slag, wherein each said melting chamber comprises a residue inlet in communication with the residue outlet of said secondary chambers, one or more sources of melting heat, and a slag outlet; and a control system to regulate the operation of the system.

2. The system of claim 1, wherein the impedance mechanism is a dome shaped barrier.

3. The system of claim 1, wherein at least one of said sources of reformulating heat is a plasma system.

4. The system of claim 1, wherein at least one of said sources of reformulating heat is a hydrogen burner.

5. The system of claim 1, wherein said feedstock inlet comprises a primary and secondary feedstock inlet, wherein the secondary feedstock inlet is used for input of feedstock additives.

6. The system of claim 1, wherein at least one of said first input means and second air input means receive heated air from a syngas-to-air heat exchanger.

7. The system of claim 1, wherein the first air input means and the second air input means are heated air inlets.

8. The system of claim 1, wherein at least one of said primary and secondary chambers further comprises means for controlling the residence time thereof, wherein the means for controlling the residence time comprises a controllable solids removal means selected from the group consisting of a rotating arm, a pusher ram, and a set of screws.

9. The system of claim 1, wherein at least one of said sources of melting heat is a plasma system, a gas burner or a Joule heating element.

10. The system according to claim 1, wherein at least one of said primary chambers comprise one or more lateral transfer units for use as a controllable solids removal means.

11. The system according to claim 1, wherein the control system comprises:
one or more sensing elements for monitoring of and obtaining data regarding operating parameters within the system; and
one or more response elements for adjusting operating conditions within the system; wherein the sensing elements and the response elements are integrated within the system, and wherein the response elements adjust the operating conditions within the system according to the data obtained from the sensing elements.

12. A process for converting a carbonaceous feedstock to a processed syngas using the system of claim 1, comprising the steps of:
inputting carbonaceous feedstock into one or more primary chambers;
inputting heated air and optionally a process additive into the one or more primary chambers to convert the carbonaceous feedstock to processed feedstock and a primary chamber gas;
transferring the processed feedstock to one or more secondary chambers;
inputting heated air and optionally a process additive into the one or more secondary chambers to convert the processed feedstock to a secondary chamber gas;
transferring the primary chamber gas from the one or more primary chambers and the secondary chamber gas from the one or more secondary chambers into the gas reformulating zone;
applying heat from one or more sources of reformulating heat to convert the primary and/or secondary chamber(s) gas to the processed syngas.

* * * * *